US012332223B2

(12) United States Patent
Organ et al.

(10) Patent No.: US 12,332,223 B2
(45) Date of Patent: Jun. 17, 2025

(54) APPARATUS AND METHODS FOR MULTIDIMENSIONAL CHROMATOGRAPHY ANALYSIS

(71) Applicants: Michael Organ, Ottawa (CA); Debasis Mallik, Ottawa (CA); Jee Seong Kwak, Ottawa (CA); Wenyao Zhang, East Gwillimbury (CA)

(72) Inventors: Michael Organ, Ottawa (CA); Debasis Mallik, Ottawa (CA); Jee Seong Kwak, Ottawa (CA); Wenyao Zhang, East Gwillimbury (CA)

( * ) Notice: Subject to any disclaimer, the term of this patent is extended or adjusted under 35 U.S.C. 154(b) by 836 days.

(21) Appl. No.: 17/355,467

(22) Filed: Jun. 23, 2021

(65) Prior Publication Data

US 2021/0404998 A1 Dec. 30, 2021

Related U.S. Application Data

(60) Provisional application No. 63/045,388, filed on Jun. 29, 2020.

(51) Int. Cl.
*G01N 30/30* (2006.01)
*G01N 30/16* (2006.01)
(Continued)

(52) U.S. Cl.
CPC ............ *G01N 30/38* (2013.01); *G01N 30/16* (2013.01); *G01N 30/8624* (2013.01); *G01N 2030/027* (2013.01); *G01N 2030/385* (2013.01)

(58) Field of Classification Search
None
See application file for complete search history.

(56) References Cited

U.S. PATENT DOCUMENTS

| 8,101,422 B2 * | 1/2012 | Srinivasan | G01N 30/96 |
| | | | 210/659 |
| 10,585,071 B2 * | 3/2020 | Organ | G01N 30/463 |
| | (Continued) | | |

FOREIGN PATENT DOCUMENTS

| JP | H07311188 A | * | 11/1995 | |
| WO | WO-2009084235 A1 | * | 7/2009 | G01N 30/32 |

*Primary Examiner* — Daniel S Larkin

(57) ABSTRACT

A multidimensional chromatographic assembly includes a chromatographic medium selector module, which receives a sample from an injector module and moves the sample through one of at least two chromatographic media of a chromatographic medium module using at least one eluent from at least one fluid moving module. At least a portion of the sample is re-circulated through the same or the second chromatographic medium using a multi-configuration fluid diverting module, which isolates a selected portion of the chromatographed eluent containing at least a portion of the sample in at least one fluid holding compartment and later moves the isolated portion through one of the chromatographic media in an iterative manner until all attributes of the isolated portion in question are analyzed. A detector module, which is located between the chromatographic medium selector module and the fluid diverting module, acquires data each time a portion of the sample passes through the detector module and provides data for a multi-dimensional chromatogram. The configurable portion (the rotor) of the fluid diverting module comprises movable flow-paths with two termini, which lie on a circular perimeter, concentric to the axis of rotation of the rotor, on the interfacial plane where the rotor meets the stationary portion of the fluid diverting module (the stator), and a connecting coplanar groove, spatial disposition of which is either concave or convex to the circular perimeter with only the termini intercepting the perimeter. The entire assembly is controlled by a controller, which receives data from the (Continued)

detector module and sends instructions to all modules during the multidimensional analysis with or without human intervention.

27 Claims, 47 Drawing Sheets

(51) Int. Cl.
*G01N 30/38* (2006.01)
*G01N 30/86* (2006.01)
*G01N 30/02* (2006.01)

(56) References Cited

U.S. PATENT DOCUMENTS

2020/0406165 A1* 12/2020 Dlugasch .......... B01D 15/1878
2021/0349060 A1* 11/2021 Fogwill ................ G01N 30/468

* cited by examiner

APPARATUS AND METHODS FOR MULTIDIMENSIONAL CHROMATOGRAPHY ANALYSIS

FIELD

The disclosure relates to a multidimensional chromatographic assembly, such as the one used in chromatographic heart-cut experiments. More specifically, the disclosure relates to a multidimensional chromatographic assembly that isolates (heart-cuts) at least a portion of a sample comprising at least one analyte in at least one fluid holding compartment during a chromatographic experiment, recirculates the isolated portion through one of two available flow-paths consisting of at least one chromatographic medium each using a chromatographic medium selector module and a fluids diverting module, and moves the chromatographed portions through a detector module, which gives a measurement of a quality attribute (for example, composition of matter, optical purity or radioactivity) of the chromatographed portions each time the portion passes through the detector module. The sample is recirculated iteratively either through the same chromatographic medium for the purpose of comparing the amplitudes of the measured quality attribute from each iteration or through different chromatographic media for the purpose multiple quality attribute measurements from a single injection. The chromatographic assembly is capable of identifying if a change in the structural or compositional integrity of the injected sample has taken place during analysis (in other words, if a chromatographic artefact could affect the outcome of the experiment), and also collecting chromatographic outputs based on the measurements in the detector module. The disclosure is specifically intended for applications wherein the knowledge of the presence of chromatographic artefacts is critical (for example, in the study of on-column degradation of analytes, during the measurements of optical and chromatographic purity of chiral molecules, or during the purity measurements of radio-chemically labeled substances) from an analytical or a purification perspective. The fluid diverting module of the assembly uses uniquely designed configurable flow-paths that are etched non-concentric to the axis of rotation on the movable portion (rotor) of the diverting module.

BACKGROUND

U.S. Pat. No. 10,585,071 (Organ and Mallik) reports a multi-dimensional chromatography assembly that uses a single pump to recirculate a selected portion of the eluent through a ten-port heart-cut valve comprising of five concentric configurable flow-paths on its rotor. The heart-cut valve is equipped two heart-cutting loops, either one of which is capable of storing a selected portion of the eluent (sample) for recirculation purposes. The method of storing the selected portion involves rotating the heart-cut valve by 36 degrees clockwise or counter-clockwise to move the selected portion into one of the two heart-cutting loops (a first) and rotating the valve back to its original position so that the remaining portion of the eluent of the ongoing (current) chromatographic run can move to waste through the second heart-cutting loop. The sample, which is in the first heart-cutting loop, is re-injected back into one of the LC columns of the multidimensional chromatographic assembly for a recirculatory run. The process of disengaging the pump from the sample when the sample is in the first heart-cutting loop (in other words, the process of rotating the valve back to its original position) sets the sample in fluid communication with the pump, which immediately begins the recirculation of the sample for the recirculatory chromatographic run. The invention provides a means to conduct multiple chromatographic recirculation runs as long as the recirculated sample remains behind the sample from a preceding chromatographic run. In other words, the heart-cut valve design lacks in the ability to store a sample in one of the two heart-cutting loops for an indefinite period of time.

U.S. Pat. No. 8,101,422 (Srinivasan and Lin) reports a two-dimensional chromatography assembly that uses a pump (a first) to inject a sample into an LC column (a first) and move the chromatographed sample through a detector using at least one eluent. A selected portion of the eluent(s) bearing at least a portion of the sample is then moved to a six-port heart-cutting valve comprising a heart-cutting loop. The valve is rotated by 60 degrees clockwise or counter-clockwise to move the sample into the loop and rotated back to its original position to leave the sample in the loop. By design, the sample, which is to remain isolated in the loop, is in fluid communication with a second pump and a second LC column and is vulnerable for diffusion during storage. In other words, U.S. Pat. No. 8,101,422 does not provide a means to store the sample in the heart-cutting loop for an indefinite period of time.

U.S. Pat. No. 10,585,071 (Organ and Mallik) uses three LC columns in its multidimensional chromatographic assembly. A sample first passes through an LC column (a first), which is located upstream of a column-selector valve. A selected portion of the eluent containing the chromatographed sample then travels to one the two remaining LC columns for recirculatory multidimensional chromatography. The described assembly has limitations that do not allow recirculation of a selected portion of the eluent through the first LC column. When an application warrants investigation into the stability of a sample in the first LC column, an identical LC column is needed as the second LC column. Not all LC columns age at an identical rate as the columns are subjected to a variety of chromatographic conditions overtime. Consequently, comparison of chromatographic responses from two discrete LC columns adds uncertainty in measurements.

What is needed is a heart-cut chromatographic assembly that allows for the storage of a selected portion of the eluent containing a target analyte in a heart-cut loop for an unrestricted amount of time. The chromatographic assembly also needs to allow recirculation of the target analyte always through the same LC column instead of an identical LC column. The apparatus of U.S. Pat. No. 10,585,071 allows recirculatory iterative analysis only with the second and the third LC columns leaving the first LC column for a single (one-time) chromatographic run.

SUMMARY

According to one aspect of the present invention, various modules of a multidimensional chromatographic assembly are provided for recirculating any portion of a chromatographed eluent carrying a sample for any number of times through a detector module. The assembly is used to analyze at least one quality attribute of the recirculated sample and to collect a portion of the sample based on the analysis.

The present invention includes an injector module which receives samples from a sample source. In some embodiments, the sample source receives chemical, radio-chemical or biological entities from a flowed format (for example, a flow reactor).

In some embodiments, the injector module is connected to the sample source through at least one connecting flow-path. In some other embodiments, the injector module is not physically in fluid communication with the sample source. Analytes are transported from the sample source by humans or by a robotic means in those embodiments.

In all embodiments, the injector module includes a fluid holding compartment, which is mounted on a two-configuration injection device. Specifically, the fluid holding compartment of the injector module receives a sample from the load configuration of the injection device. When the injection device establishes fluid communication between a fluid moving module and the fluid holding compartment, the sample in the fluid holding compartment moves downstream of the present invention by at least one eluent from the fluid moving module. This is the inject configuration of the injection device. The load and the inject configuration of the injection device sets the load and the inject configuration of the injector module, respectively.

The present invention also includes a chromatographic medium module and a chromatographic medium selector module. In some embodiments, the chromatographic medium module comprises two chromatographic media. The chromatographic medium selector module sends an eluent carrying a sample to one of the two chromatographic media of the chromatographic medium module.

In some embodiments, the chromatographic medium selector module comprises two separate modules; an inlet module, wherein the eluent moves the sample from the fluid moving module to the chromatographic medium module, and an outlet module, wherein the eluent moves the sample downstream from the chromatographic medium module. In some other embodiments, the inlet and the outlet modules are on a singular physical embodiment of the chromatographic medium selector module.

The present invention also includes a multi-configuration fluid diverting module. In some embodiments, the fluid diverting module is a multi-position rotary valve that is equipped with two additional fluid holding compartments (a second and a third). The fluid diverting module comprises two main parts: the part that remains stationary during the positional (configurational) movements of the fluid diverting module is called a stator and the part that is configurable (movable) is called a rotor.

In all embodiments, the rotor comprises configurable flow-paths responsible for establishing fluid communication among stationary flow-paths in the stator. Each configurable flow-path comprises two termini and a connecting coplanar groove. The entire portions of the groove and the termini are located on the interfacial plane where the rotor meets the stator. In some embodiments, the flow-paths are etched on the two-dimensional surface of the rotor; when the rotor is sealed against the stator, a tunnel, which is the connecting coplanar groove, forms. In some other embodiments, the flow-paths are etched on the two-dimensional surface of the stator and the connecting coplanar groove forms when the rotor is sealed against the stator.

In all embodiments, the termini of each flow-path are located on a circle on the interfacial plane where the rotor meets the stator; the center of the circle is located on the axis of rotation of the rotor; the body of the groove is spaced outside the circle on which the termini are situated. The spatial disposition of the flow-path on the rotor is curved. In some embodiments, the spatial disposition of the groove approximately resembles the letter 'U' of the English alphabet. In other words, two termini of the flow-path are located on the circle and the spatial disposition of the groove falls outside the circle.

In some embodiments, the curved portions of some flow-paths (some grooves) are outside the area of the circle (in other words, convex with respect to the center of the circle). The rest of the grooves of the rotor are curved inside the area of the circle (in other words, concave with respect to the center of the circle).

In some embodiments, the rotor of the present invention comprises eight configurable flow-paths. Specifically, the rotor has five convex flow-paths with the grooves outside the circle and three concave flow-paths with grooves inside the circle. In some other embodiment, the rotor has three convex flow-paths with the grooves outside the circle and five concave flow-paths with grooves inside the circle. In some other embodiments, the rotor of the present invention comprises nine configurable flow-paths. Specifically, the rotor has five convex flow-paths with the grooves outside the circle and four concave flow-paths with grooves inside the circle. In some other embodiment, the rotor has four convex flow-paths with the grooves outside the circle and five concave flow-paths with grooves inside the circle.

In some embodiments, the footprint of the termini is same as that of the groove. In those embodiments, the flow-path of the rotor is exclusively represented by the groove. In some other embodiments, the footprint of the termini is larger than that of the groove. It is important to note that, during the positional (configurational) movements of the rotor, the termini of the flow-paths on the rotor completely disengage from the entryway to the stationary flow-paths (ports) of the stator. When the termini re-establish fluid communication with the same or another set of ports, the overlap of the footprints between a terminus and a port must occur. The larger footprint of the termini increases the tolerance for positional (configurational) inaccuracy during the movement of the rotor. In other words, when the footprint of a terminus is large, there are multiple number of positions wherein the groove establishes fluid communication to a port of the stator. In an example of a rotary valve as the multi-configuration fluid diverting module, these positions are only a fraction of a degree apart from one another about the axis of rotation of the valve. In some embodiments, the dimension of the groove is modulated to reduce the swept volume of the flow-path on the rotor.

In some embodiments, both termini of at least one flow-path include elongated portions. The elongated portions are spaced along the circle of the aforementioned circle where the termini lie. In some embodiments, both elongated portions of the termini are spaced either in a clockwise or counter-clockwise manner. In other words, the flow-path is unsymmetrical with respect to the central angle formed by the termini in question.

The present invention also includes a detector module and a collection module.

In all embodiments, the detector module, which includes a flow-through detection flow-path (a flow-cell), acquires signals from the response of an analyte present in the flow-cell. The method of detection does not impact the structural or compositional (chemical) integrity of the sample. In other words, the detector module takes measurements without altering the structural or compositional integrity of the sample. The eluent carrying the sample moves from the detector module to the fluid diverting module. The fluid diverting module sends the sample to one of the two chromatographic media using one of six configurations of the fluid diverting module. The remaining portion of the chromatographed eluent is sent to the collection module.

In some embodiments, the collection module is waste. In some other embodiments, the collection module includes at least one fluid holding container wherein at least a portion of the fluid from the present invention is archived. In some embodiments, the fluidic content of at least one fluid container is re-injected into the present invention through the injector module for additional analysis using a robotic means.

In some embodiments, the collection module is equipped with a closed chamber, wherein the fluid from the present invention is archived in the fluid holding container(s) under a modulated condition. In some embodiments, the modulated condition includes a controlled temperature environment.

In some embodiments, the present invention also includes a controller, which is connected to all modules of the multidimensional chromatographic assembly via information carrying pathways. Signals or commands for the positional movements of the modules are transmitted through the information carrying pathways. In some other embodiments, signals or commands are transmitted from the controller to the respective modules wirelessly.

In some embodiments, the fluid diverting module and the chromatographic medium selector module are rotary valves. A movement of the rotor (in other words, rotation) relative to the stator of a valve gives rise to a specific valve position. For example, the fluid diverting module is said to be in a specific valve position when the rotor of the fluid diverting valve is rotated relative to the stator by a certain number of degrees. The fluid diverting valve of the present invention comprises a multiple number of such valve positions. A configuration of the multidimensional chromatography assembly is derived from the individual positions of the valves. It is possible that, in some embodiments, a specific configuration of the multidimensional chromatography assembly is derivable from more than one positions of the respective valves. In other words, in some embodiments, more than one degenerate combinations of the valve positions are available for a specific configuration of the multidimensional chromatography assembly, which is the present invention.

In some embodiments, the fluid diverting valve adopts at least six configurations, wherein a specific set of fluid communication between the stator and the rotor is made. These configurations are asynchronous. In other words, the fluid diverting valve is not capable of assuming more than one configuration at any given time. The configurations of the fluid diverting valve are defined by the types of fluid communications the present invention establishes among the fluid moving valve, the chromatographic media (the first and the second) of the chromatographic medium valve, and the fluid holding compartments (the second and the third) of the fluid diverting valve. These configurations are derived from specific positions of the fluid diverting valve and the chromatographic medium selector valve. In this configuration, at least one eluent carrying a sample moves from the first chromatographic medium to the second fluid holding compartment without establishing fluid communication between the fluid moving module and the third fluid holding compartment. In the second configuration, at least one eluent carrying a sample moves from the first chromatographic medium to the third fluid holding compartment without establishing fluid communication between the fluid moving module and the second fluid holding compartment. In the third configuration, at least one eluent carrying a sample moves from the first chromatographic medium to the third fluid holding compartment while maintaining fluid communication between the fluid moving module and the second fluid holding compartment. In the fourth configuration, at least one eluent carrying a sample moves from the second chromatographic medium to the third fluid holding compartment without establishing fluid communication between the fluid moving module and the second fluid holding compartment. In the fifth configuration, at least one eluent carrying a sample moves from the second chromatographic medium to the third fluid holding compartment without establishing fluid communication between the fluid moving module and the second fluid holding compartment. In the sixth configuration, at least one eluent carrying a sample moves from the second chromatographic medium to the second fluid holding compartment while maintaining fluid communication between the fluid moving module and the third fluid holding compartment.

In some embodiments, the configurational change of the fluid diverting valve is achieved by a single change in the valve position of the fluid diverting valve. In some other embodiments, the configurational change of the fluid diverting valve requires multiple changes in the positions of the fluid diverting and the chromatographic medium selector valves. In some cases, these positional changes occur asynchronously.

In some embodiments, the detector module comprises a plurality of detectors each measuring some dependent or independent properties of an analyte in question. The detectors are placed in series or in parallel with a central inlet and a central outlet flow-paths connecting the array between the fluid diverting module and chromatographic medium selector module. In some embodiments, the detectors are not immediately connected to each other in series, but located at various locations of the chromatographic assembly with at least one detector between the fluid diverting module and chromatographic medium selector module.

According to another aspect of the present invention, methods of using a multidimensional chromatographic assembly are provided for recirculating any portion of a chromatographed eluent carrying a sample for any number of times through at least one detector module. The data acquired when the sample passes through the detector module each time gives rise to a discrete chromatographic dimension. The combined data from the entire recycling experiment provides the information needed for a multidimensional chromatographic analysis. The data obtained from the multidimensional analysis is used for univariate (for example, monitoring trends of a single variable under different chromatographic conditions) or for multivariate analyses. In some methods, multivariate analysis includes quantification of chromatographic (chemical) and optical (enantiomeric) purities of an optically active analyte.

In some methods, a sample (analyte) is transported from a sample source to a fluid holding compartment, which is mounted on an injector module, through a physically present flow-path that connects the sample source to the injector module. During this time, the injection device of the injector module is kept at the load configuration. In some methods, wherein the sample is supplied from a flowed format (for example, a flow reactor), the amount of time the injection device spends at the load configuration is modulated based on the volume of the sample required for a multidimensional analysis. In some methods, the volume of the sample required for a multidimensional analysis is modulated based on the response obtained from the detector module of the multidimensional chromatographic assembly.

In some methods, a chromatographic medium selector module, which is also a part of the present invention, is configured in a manner so that a fluid moving module moves at least an eluent through one of at least two chromatographic media without interruption.

In some methods, wherein the chromatographic medium selector module includes separate inlet and the outlet modules, the positional movements of the inlet and the outlet modules are done synchronously so that the fluid moving module moves eluent without interruption. In some other methods, the positional movements of the inlet and the outlet modules are done asynchronously to arrest pressure ripples in the eluent between the inlet and the outlet modules. Specifically, when the chromatographic medium selector module diverts eluent from one chromatographic medium to another (a second), the positional movement of the outlet module is delayed. During the delay period, the fluid moving module advances or retracts the eluent against the dead-ended outlet module to adjust the pressure in the eluent and mitigates the impact in the multidimensional analysis from pressure fluctuations.

In some methods, at least one eluent carrying a sample moves from one chromatographic medium (a first) to a second fluid holding compartment, which is mounted on the fluid diverting module, without establishing fluid communication between the fluid moving module and a third fluid holding compartment, which is also mounted on the same fluid diverting module.

In some methods, at least one eluent carrying a sample moves from the first chromatographic medium to the third fluid holding compartment without establishing fluid communication between the fluid moving module and the second fluid holding compartment.

In some methods, at least one eluent carrying a sample moves from the first chromatographic medium to the third fluid holding compartment while maintaining fluid communication between the fluid moving module and the second fluid holding compartment.

In some methods, at least one eluent carrying a sample moves from the second chromatographic medium to the second fluid holding compartment without establishing fluid communication between the fluid moving module and the third fluid holding compartment.

In some methods, at least one eluent carrying a sample moves from the second chromatographic medium to the third fluid holding compartment without establishing fluid communication between the fluid moving module and the second fluid holding compartment.

In some methods, at least one eluent carrying a sample moves from the second chromatographic medium to the second fluid holding compartment while maintaining fluid communication between the fluid moving module and the third fluid holding compartment.

In some methods, wherein both termini of at least one flow-path on the rotor are equipped with unsymmetrical elongated portions, the rotor is configured in a manner so that the flow-path connecting the fluid moving module to the second or the third fluid holding compartment encounters a dead-end and the eluent in the respective fluid holding compartment experiences additional back-pressure from the dead-end. The movement of the fluid moving module is modulated during this time to adjust the pressure inside the eluent trapped in the fluid holding compartment in question. In other words, the fluid moving module advances or retracts the eluent against the dead-end to adjust the pressure in the fluidic content of the fluid holding compartment in accordance with the anticipated back-pressure from downstream flow-paths following the removal of the dead-end. The fluid moving module thus mitigates the impact in the multidimensional analysis from pressure fluctuations.

In some methods, the fluid diverting module and the chromatographic medium selector module are configured in a manner so that the eluent representing a chromatographic peak is eluted through one chromatographic medium during a preceding chromatographic dimension run and recycled through a second chromatographic medium during the current chromatographic dimension run.

In some methods, the fluid diverting module and the chromatographic medium selector module are configured in a manner so that the eluent representing a chromatographic peak is eluted through one chromatographic medium during a preceding chromatographic dimension run and recycled through the same chromatographic medium during the current chromatographic dimension run.

In some methods, the sample comprises multiple individual portions of eluents each representing individual chromatographic peaks from a chromatographic dimension run. In some methods, the last peak of the said chromatographic dimension run is isolated in one of the two fluid holding compartments of the fluid diverting module for a subsequent chromatographic dimension run. In some other methods, a peak that is not the last peak in the preceding chromatographic dimension run is isolated in one of the two fluid holding compartments of the fluid diverting module for a subsequent chromatographic dimension run.

In some methods, the fluid diverting module is configured in a manner so that the eluent representing a chromatographic peak is isolated in a fluid holding compartment and held stationary for an unspecified amount of time; in some methods, the peak in the fluid holding compartment is held until all other chromatographic peaks from the ongoing (current) chromatographic dimension run are archived in a collection module or eluted out of the present invention. In some other methods, the eluent representing a chromatographic peak is released immediately after it is isolated in the fluid holding compartment without a delay.

In some methods, the method of detection at the detector module is changed every time a portion of the eluent representing a specific entity passes the detector module. Specifically, in some methods, wherein the detector module is an ultraviolet spectrophotometer, the wavelength at which the measurement of ultraviolet absorption is made is changed from one dimension run to another dimension run.

In some methods, at least a portion of the eluent carrying at least a portion of a chromatographed analyte is sent to at least one fluid holding container inside a downstream collection module. The physical or chemical state of the analyte inside the fluid holding container is modulated. At least a portion of the fluidic matter of the fluid holding container is re-analyzed by the present invention for monitoring trends (on-column or time-dependent impacts) of the impacting physical or chemical stress on the said analyte. In some examples, modulation of temperature is an example of such a physical stress test.

In some methods, a chromatographic peak is analyzed at least twice using a single chromatographic medium to monitor chromatographic artefacts arising due to the instability of an analyte toward the stationary phase (chromatographing phase) of the chromatographic medium.

In some methods, an analyte is moved through at least two or more chromatographic media one medium at a time from a single injection to find an optimal chromatographic medium for analysis.

According to another aspect of the present invention, the methods of using a multidimensional chromatographic assembly are provided for injecting a sample containing at least one optically active analyte in a fluid holding compartment (first) of an injector module, recirculating at least one eluent carrying at least a portion of the optically active analyte, and analyzing chromatographic purity (LC purity) of the analyte using one of two available flow-paths consisting of at least one chromatographic medium each (a first and a second). One of the two chromatographic media separates the optically active analyte from other entities of the sample and allows for the measurement of the LC purity of the optically active analyte. The second chromatographic medium, on the other hand, separates both enantiomers of the optically active analyte and allows for the measurement of the optical purity of the same. Every time a portion of the eluent carrying a portion of the analyte passes through a downstream detector module, a measurement is made by the detector module. Each dataset gives rise to a chromatographic dimension. For example, when a portion of the eluent carrying a portion of the sample is detected by the detector module for the first time, the dataset from the first set of measurements gives rise to the first dimension of the multidimensional analysis. Similarly, the dataset from the second set of measurements, which originates from the measurement of at least a portion of the first dimension output, gives rise to the second dimension, and so on.

In some methods, a portion of the eluent carrying a sample (output) is held stationary in one (a second) of two fluid holding compartments (the second and a third) of a fluid diverting module until the remaining portion of the ongoing (current) dimension output exits the present invention. In some embodiments, the eluent carrying a portion with the sample is sent to waste. In some other embodiments, the eluent is archived in a collection module.

In some methods, the eluent in the second fluid holding compartment is sent to the detector module via the first chromatographic medium for a second time. The dataset recorded by the detector module is used to generate the second dimension portion of the multidimensional chromatogram. In some methods, the dataset of the second dimension chromatogram is used as a qualifier for the first dimension analysis. Specifically, when the fluid diverting module sends a portion of the eluent carrying a portion of the sample which is responsible for only a single chromatographic peak in the first dimension chromatogram to the detector module for a second time, the detector module is expected to register a single chromatographic peak during the re-run. When the detector module registers more than one chromatographic peak in the second dimension chromatogram (in other words, during the re-run), the eluent is sent back to the second fluid holding compartment for isolating a portion of the eluent that represents a single chromatographic peak. The remaining portion of the eluent is sent to waste. The isolated portion is sent back to the first chromatographic medium to optimize the method of chromatography for a single peak isolation in the first fluid holding compartment.

In some methods, the eluent isolated in the first fluid holding compartment during the second dimension analysis carries a sample that is optically active. The second dimension output carrying the optically active entity is isolated in the third fluid holding compartment of the fluid diverting module. The second dimension eluent carrying the optically active entity is held stationary in the third fluid holding compartment until the remaining portion of the second dimension eluent exits the present invention.

In some methods, wherein the second chromatographic medium of the chromatographic medium module is capable of separating optically active entities to corresponding enantiomers, the second dimension output carrying the optically active entity is recirculated through the second chromatographic medium. The chromatographic peaks, which represent individual enantiomers, are recorded by the detector module in the third dimension chromatogram.

In some methods, the third dimension output carrying at least a portion of one of the two enantiomers of the optically active entity is isolated again in the third fluid holding compartment and recirculated through the second chromatographic medium to give the fourth dimension chromatogram.

In some methods, the positional movements of the chromatographic medium selector module and the fluid diverting module are performed based on live response from the detector module. In some other methods, the detector module first transmits necessary information live to a controller. The controller calculates the timing of actuation of the chromatographic medium selector module and the fluid diverting module based on the information from the detector module.

In some methods, the first dimension chromatogram gives a measurement of chemical purity (LC purity) of an optically active analyte. The second dimension chromatogram verifies if there is any chromatographic artefact (for example, on-column degradation) from the first chromatographic medium during the measurement of the chemical purity from the first dimension chromatogram. The third dimension chromatogram gives a measurement of optical purity of the same analyte. The fourth dimension chromatogram verifies if there is any chromatographic artefact (for example, on-column racemization) from the second chromatographic medium during the measurement of the optical purity from the third dimension chromatogram.

In some methods, the odd-numbered chromatographic dimensions are used for the measurements of quality attributes of chemical or biological entities and the even-numbered chromatographic dimensions are used for the verification of the chromatographic artefact(s) during the preceding chromatographic dimension analysis.

In some methods, the odd-numbered chromatographic dimensions are used for the measurements of quality attributes and the even-numbered chromatographic dimensions are used for the verification of the purity of the injectables entering the proceeding dimension runs.

In some methods, wherein the verification of the purity of the injectables from an even-numbered chromatographic dimension reveals that the injectable carrying eluents from more than one chromatographic peaks, the injectable is recirculated through the same chromatographic medium and the parameters controlling the movement of the chromatographic medium selector module and the fluid diverting module are modulated for the purification of the injectable.

In some methods, the swept volume of the first fluid holding compartment and the concentration of the sample (analyte) are modulated to inject a larger mass of the optically active compound of interest. The first dimension (achiral dimension) of the multidimensional analysis is used to separate the optically active compound of interest from the rest of the entities present in the injected sample. A second dimension (chiral dimension) is used to separate both enantiomers. The eluent portions containing respective enantiomers are collected. In some methods, the possibility of on-column degradation is examined by recirculating the eluent portion bearing the optically active compound of interest through the chromatographic medium used in the first dimension. In those methods, the enantiomeric separation represents the third dimension of the multidimensional analysis. In some methods, the possibility of on-column degradation (epimerization, racemization) is examined by recirculating the eluent portion bearing one of the two enantiomers through the chromatographic medium used in the chiral dimension. In some methods, wherein the on-column racemization (in other words, one (parent) enantiomer forming the other (daughter) enantiomer) is observed, the eluent portion bearing the daughter enantiomer is collected and that bearing the parent enantiomer is recirculated until all appreciable quantity of the parent enantiomer is converted into the daughter enantiomer and all eluent portions representing the daughter enantiomer is collected.

BRIEF DESCRIPTION OF THE DRAWINGS

The drawings included herewith are for illustrating various examples of, modules, assemblies, devices, and methods of the present specification and are not intended to limit the scope of what is taught in any way.

DETAILED DESCRIPTION OF THE DRAWINGS

Various modules, devices and methods will be described below to provide an example of an embodiment of a multidimensional chromatography assembly, which is the present invention. No embodiment described below limits any claimed invention and any claimed invention may cover modules, devices or methods that differ from those described below. The claimed invention is not limited to modules, devices or methods having all of the features of any one module, device or method described below or to features of any one module, device or method described below or to features common to multiple or all modules, devices or methods described below. It is possible that a module, device or method described below is not an embodiment of any exclusive right granted by the issuance of this patent application. Any invention disclosed in a module, device or method described below and for which an exclusive right is not granted by the issuance of this patent application may be the subject matter of another protective instrument, for example, a continuing patent application, and the applicants, inventors or owners do not intend to abandon, disclaim or dedicate to the public any such invention by its disclosure in this document.

Figure 1:
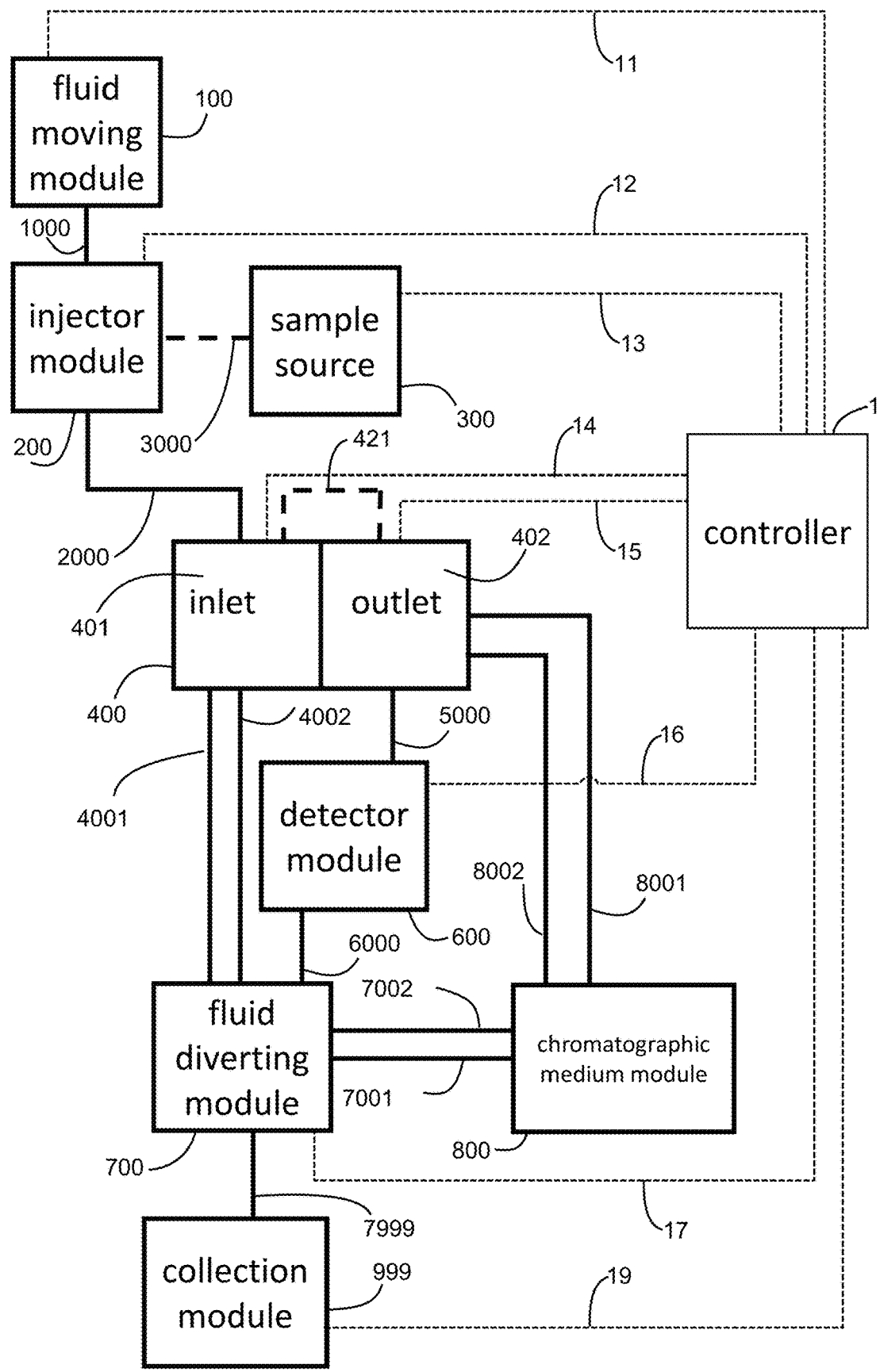
FIG. 1, which is the present invention, is a flow diagram of a multidimensional chromatographic assembly comprising a sample source, a fluid moving module, a two-configuration injector module, a chromatographic medium module, a multi-position chromatographic medium selector module, a detector module, a multi-configuration fluid diverting module, a collection module, and a controller.

Referring to FIG. 1, a flow diagram of a multidimensional chromatographic assembly, which is the present invention, is shown. The multidimensional chromatographic assembly comprises a fluid moving module (100), a two-configuration injector module (200), a sample source (300), a multi-position chromatographic medium selector module (400), a detector module (600), a multi-configuration fluid diverting module (700), a chromatographic medium module (800), a collection module (999), and a controller (1).

Referring still to FIG. 1, injector module 200 receives samples (analytes) from sample source 300. In some representation, sample source 300 is connected to injector module 200 via flow-path 3000. In some other representation, sample source 300 is not directly connected to injector module 200; samples are transported from sample source 300 to injector module 200 by alternative means, which includes human interventions or a robotic transportation mechanism. Flow-path 3000 is shown as dashed lines to indicate that the connection between the injector module and the sample source is optional.

Referring still to FIG. 1, fluid moving module 100 is connected to injector module 200 via flow-path 1000. Injector module 200 is connected to chromatographic medium selector module 400 via flow-path 2000. Chromatographic medium selector module 400 comprises two configurable modules: an inlet (401) and an outlet (402). Specifically, the injector module 200 is connected to inlet module 401 of the chromatographic medium selector module via flow-path 2000.

Referring still to FIG. 1, in some representation, the inlet and the outlet module of chromatographic medium selector module 400 are located on a singular physical embodiment. In some other representation, the inlet and the outlet modules are separate embodiments.

Referring still to FIG. 1, inlet module 401, which is configurable, is connected to fluid diverting module 700 via flow-paths 4001 and 4002. Fluid from the fluid moving module moves downstream via flow-paths 4001 or 4002 depending on the configuration of the inlet module.

Referring still to FIG. 1, fluid diverting module 700 is connected to chromatographic medium module 800, which comprises at least two chromatographic media. The chromatographic media are individually connected to fluid diverting module 700 via flow-paths 7001 and 7002. Chromatographic media are also connected to outlet module 402, which is also configurable, via flow-paths 8001 and 8002. Fluid from the fluid moving module moves through one of the chromatographic media of chromatographic medium module 800 either using flow-paths 4001, 7001 and 8001 or flow-paths 4002, 7002 and 8002. In other words, the first chromatographic medium of chromatographic medium module 800 maintains fluid communication between the inlet and the outlet modules of chromatographic medium selector module 400 via flow-path 4001, 7001, and 8001. Similarly, the second chromatographic medium of chromatographic medium module 800 maintains fluid communication between the inlet and the outlet modules of chromatographic medium selector module 400 via flow-path 4002, 7002, and 8002. In some representation, inlet module 401 and outlet module 402 are connected via at least one other direct flow-path (421).

Referring still to FIG. 1, detector module 600 is connected to outlet module 402 and fluid diverting module 700 via flow-paths 5000 and 6000, respectively.

Referring still to FIG. 1, in all configurations, fluid flows from fluid diverting module 700 to detector module 600 via a set of flow-paths and modules; they are: flow-path 7001 or 7002, chromatographic medium module 800, flow-path 8001 or 8002, outlet module 402, and flow-path 5000 in the said order. On the other hand, fluid flows from the detector module to the fluid diverting module via flow-path 6000. The said flow-paths and modules form a recirculatory loop between fluid diverting module 700 and detector module 600 wherein fluid circulates repetitively through the present invention for any number of times.

Referring still to FIG. 1, fluid diverting module 700 is also connected to collection module 999 via flow-path 7999.

Referring still to FIG. 1, in some representation, collection module 999 is waste; the portion of the fluid that enters collection module 999 exits the present invention. Introduction of the same portion back into the present invention is possible by re-injecting a portion of the fluid into injector module 200 by a means.

Referring still to FIG. 1, in some representation, collection module 999 is equipped with a robotic device that delivers the fluid exiting the recirculatory loop to at least one fluid holding container.

Referring still to FIG. 1, controller 1 communicates with fluid moving module 100, injector module 200, sample source 300, inlet module 401, outlet module 402, detector module 600, fluid diverting module 700, and collection module 999 via communication pathways 11, 12, 13, 14, 15, 16, 17, and 19 (shown as dotted lines), respectively. In some representation, the communication pathways comprise of cables capable of receiving and sending signals or commands to and from the source and modules. In some other representation, the communication pathways comprise wireless communication.

Figure 2:
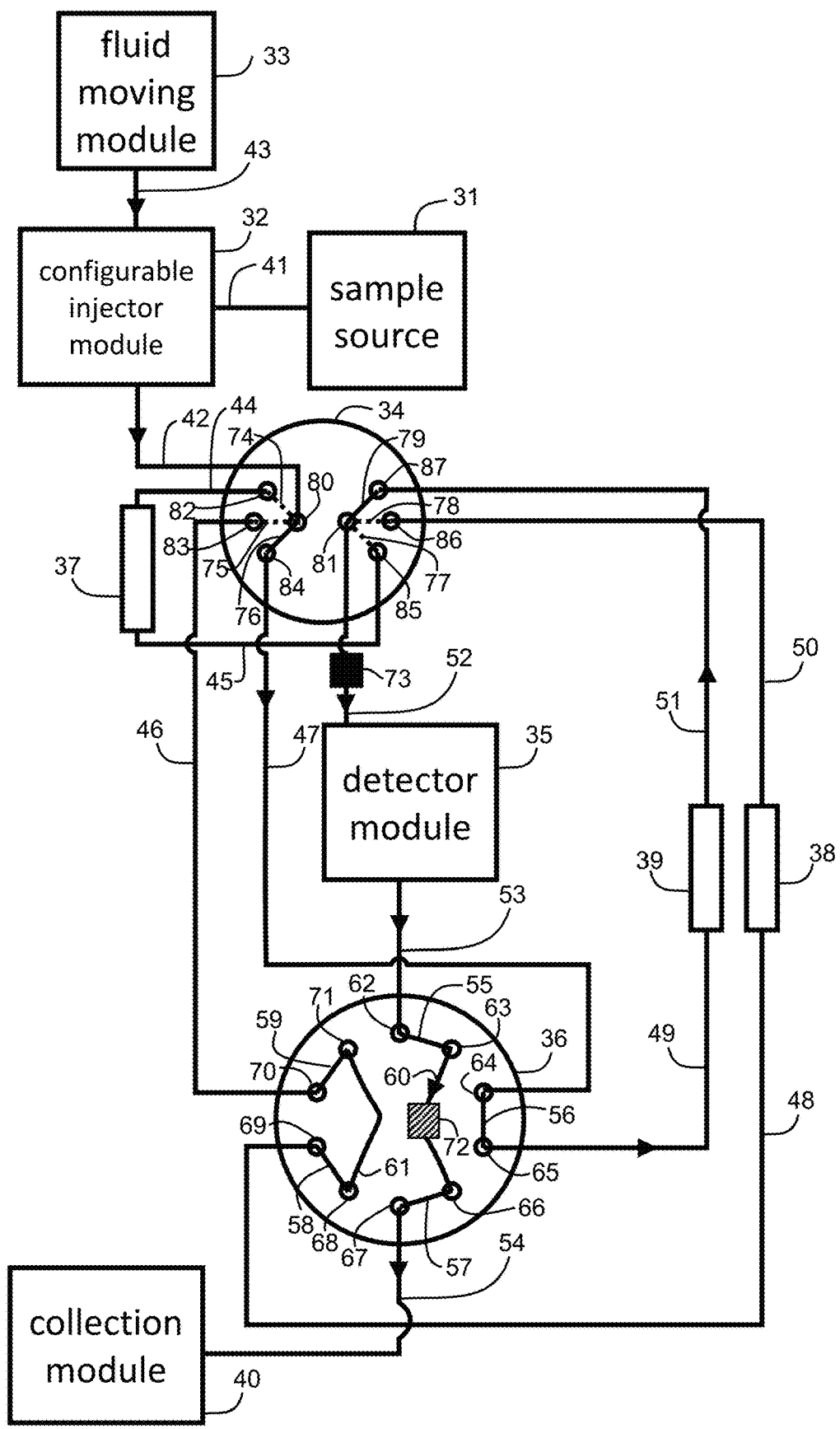
FIG. 2, which is prior art, is a flow diagram of a multidimensional chromatographic assembly that allows recycling of a chromatographic peak during a multidimensional chromatographic run; a portion of an eluent carrying a portion of a sample (shown as a striped black box) is shown to enter one of two fluid holding compartments; a second portion of the sample (shown as a solid black box) is upstream of a detector module; both portions are in motion during chromatography.

Referring to FIG. 2, a flow diagram of prior-art multidimensional chromatographic assembly is shown. The chromatographic assembly comprises a sample source (31), a configurable injector module (32), a fluid moving module (33), a configurable chromatographic medium selector module (34), a detector module (35), a configurable fluid diverting module (36), three chromatographic media (37, 38, and 39), and a collection module (40).

Referring still to FIG. 2, injector module 32 is connected to sample source 31 by flow-path 41. Injector module 32 is also connected to fluid moving module 33 upstream and configurable chromatographic medium selector module 34 downstream via flow-paths 43 and 42, respectively. Configurable chromatographic medium selector module 34, which comprises an inlet and an outlet, receives fluid from the fluid moving module via the inlet and sends the fluid to one of the three chromatographic media (37, 38, and 39). The outlet of the chromatographic medium selector module receives the fluid from one of the chromatographic media and sends the fluid to detector module 35. The configurable portion of the chromatographic medium selector module comprises flow-paths that establish fluid communications among entryways (ports) to the stationary portion of the chromatographic medium selector module. Flow-paths 74, 75, and 76 connect ports 82, 83, and 84, respectively, to inlet port 80 of the stationary portion. On the other hand, flow-paths 77, 78, and 79 connect ports 85, 86, and 87, respectively, to outlet port 81 of the stationary portion. Chromatographic medium selector module 34 is connected to injector module 32 and detector module 35 at ports 80 and 81 via flow-paths 42 and 52, respectively. Chromatographic medium 37 is connected to chromatographic medium selector module 34 between ports 82 and 85. Multi-configuration fluid diverting module 36, which is located downstream of chromatographic medium selector module 34, comprises two portions: a movable (the rotor) and a stationary (the stator) portions. The rotor includes flow-paths 55, 56, 57, 58, and 59, which are responsible for establishing fluid communications among ports 62 and 63, 64 and 65, 66 and 67, 68 and 69, and 70 and 71, respectively, of the stator. A fluid holding compartment (60) is connected between ports 63 and 66 of fluid diverting module 36. A second fluid holding compartment (61) is connected between ports 68 and 71 of fluid diverting module 36. Ports 83 and 84 of chromatographic medium selector module 34 are connected to ports 70 and 64 of fluid diverting module 36 via flow-path 46 and 47, respectively. Chromatographic medium 38 is connected between port 69 of fluid diverting module 36 and port 86 of chromatographic medium selector module 34 via flow-paths 48 and 50, respectively. Similarly, chromatographic medium 39 is connected between port 65 of fluid diverting module 36 and port 87 of chromatographic medium selector module 34 via flow-paths 49 and 51, respectively. Detector module 35 is connected at port 62 of fluid diverting module 36 via flow-path 53. Port 67 of fluid diverting module 36 is connected to collection module 40 via flow-path 54.

Referring still to FIG. 2, fluid moving module 33 moves a sample, which ultimately originates from sample source 31, from injector module 32 using at least one eluent via flow-path 41. Chromatographic medium selector module 34 diverts the eluent(s) and the sample (collectively, the fluid)

to chromatographic medium 37. The chromatographed fluid is re-circulated between the fluid diverting module and the detector module using either chromatographic medium 38 or 39.

Referring still to FIG. 2, in this configuration, a portion of the chromatographed fluid is re-circulated between the fluid diverting module and the detector module using chromatographic medium 39. Furthermore, in this configuration, chromatographic medium 39 resolved the sample into two fluidic segments (72 and 73). Fluidic segment 72 elutes first from chromatographic medium 39 and is shown to be in fluid holding compartment 60. Fluidic segment 73 elutes second from the chromatographic medium and is shown to be in flow-path 52 between the detector module and the fluid diverting module. In this configuration, chromatographic medium selector module 34 and fluid diverting module 36 are configured to further analyze at least one fluidic segment. Fluidic segments 72 and 73 are referred to be as analyte 72 and analyte 73 hereon. In this configuration, both analytes are in motion.

Figure 3:
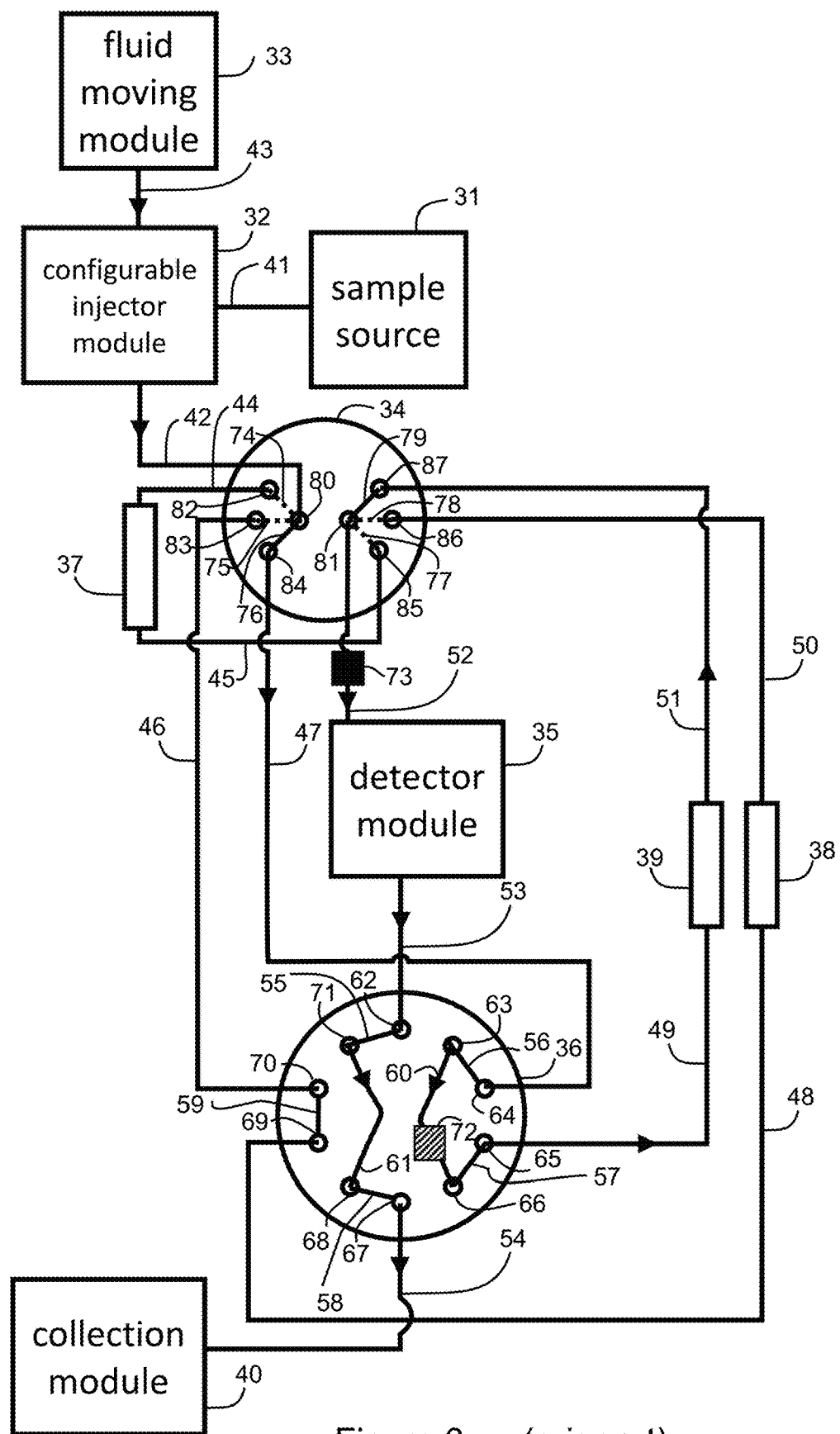
FIG. 3, which is prior art, is a flow diagram of the multidimensional chromatographic assembly of FIG. 2; the first portion (the solid black box) is in motion and about to exit the fluid holding compartment; the second portion is still upstream of the detector module.

Referring to FIG. 3, a second configuration of prior-art multidimensional chromatographic assembly of FIG. 2 is shown. In this configuration, fluid diverting module 36 is moved (specifically, rotated counter-clockwise by 36 degrees) after analyte 72 enters fluid holding compartment 60. Specifically, flow-paths 55, 56, 57, 58, and 59 connect adjacent ports 62 and 71, 63 and 64, 65 and 66, 67 and 68, and 69 and 70, respectively.

Referring to FIGS. 2 and 3, analyte 72 is in fluid holding compartment 60 in both configurations. In the first configuration (FIG. 2), detector module 35 is in fluid communication with fluid holding compartment 60 downstream. In the second configuration (FIG. 3), detector module 35 is in fluid communication with fluid holding compartment 61 downstream. Physical locations of analyte 72 inside fluid holding compartment 60 is not shown to scale. It is understood that analyte 72 advanced in the forward direction (in other words, in the direction of from fluid moving module 33 to collection module 40) from FIG. 2 and FIG. 3.

Referring still to FIGS. 2 and 3, fluid moving module 33 maintains fluid communication with fluid holding compartment 60 downstream of detector module 35 in FIG. 2 and upstream of the detector module in FIG. 3. In other words, the fluid moving module does not disengage from fluid holding compartment 60 in either of the two configurations (FIG. 2 or 3). Consequently, analyte 72 fails to remain stationary in fluid holding compartment 60 irrespective of whether analyte 73 exits prior-art assembly of FIG. 2 prior to the second analysis of analyte 72.

Referring still to FIGS. 2 and 3, in some instances, analyte 73 moves through chromatographic medium 39 significantly slower than analyte 72; both fluidic segments (specifically, analyte 73 and recirculated portion of analyte 72) reach detector 35 at the same time or in close time proximity causing overlaps of corresponding chromatographic responses (peaks). The overlap of peaks leads to ambiguity in identification of analyte(s) and quantification of its properties.

Referring still to FIGS. 2 and 3, prior-art assembly is not suited for recycling of any peak(s) of a chromatogram. Specifically, when a peak that is recirculated for a second time moves significantly faster than at least one other peak that has not exited prior-art assembly before the entrapment of the faster eluting peak in a fluid holding compartment, the overlap of peaks from multiple chromatographic dimensions is possible. In other words, prior-art assembly of FIG. 2 is only guaranteed to work when only the last peak of a chromatographic dimension run is re-circulated for further analysis.

Figure 4A:
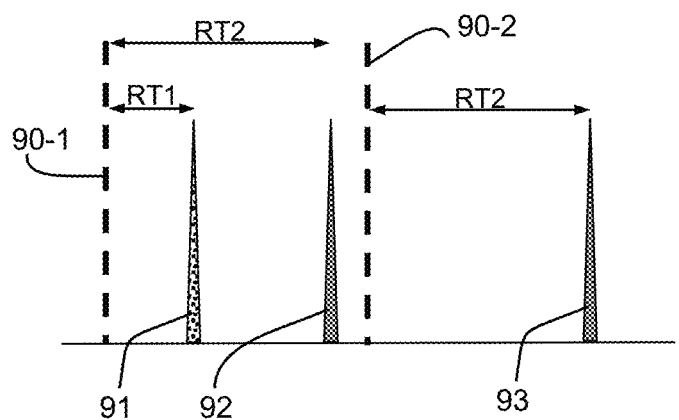
FIG. 4A is an example of a two-peak two-dimensional chromatogram, wherein the second peak (the last) of the first dimension portion of the two-dimensional chromatogram is recycled to give a single-peak in the second dimension portion of the two-dimensional chromatogram using prior-art assembly of FIG. 2; individual peaks are shown as dotted and solid black in both dimensions. In this example, no overlap of peaks occurs because the chromatography for the second dimension portion of the two-dimension chromatogram does not begin before the completion of the first dimension portion of the two-dimensional chromatography.

Referring to FIG. 4A, an example of a two-dimensional chromatogram with two chromatographic peaks (91 and 92) in the first dimension and a single peak (93) in the second dimension is shown.

Referring still to FIG. 4A, retention time, which is a measure of time differential between the time of injection for the first dimension run (90-1) and the time when peak 91 reaches the detector module of prior-art assembly of FIG. 2, is labeled as RT1. Similarly, retention time of peak 92 is labeled as RT2. The chromatographic eluent that carries peak 92 in the first dimension portion of the chromatogram is re-circulated through the same chromatographic medium to give peak 93 using prior-art assembly of FIG. 2.

Referring still to FIG. 4A, the second dimension run (90-2) starts only after peaks 91 and 92 of the first dimension run are eluted out of prior-art assembly of FIG. 2. In other words, re-circulation of peak 92 occurs only after the completion of the entire first dimension run. Hence no overlap of peaks between dimensions is possible. In other words, peak 91 or 92 does not overlap with peak 93.

Figure 4B:
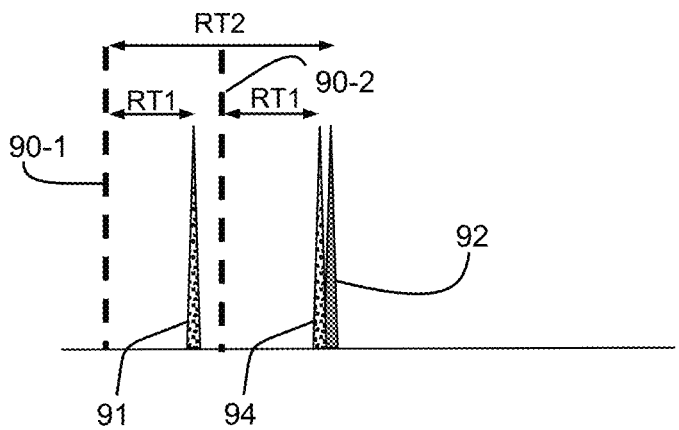
FIG. 4B is an example of a two-peak, two-dimensional chromatogram, wherein the first peak of a first dimension portion of the two-dimensional chromatogram is recycled to give a single-peak in the second dimension portion of the two-dimensional chromatogram using prior-art assembly of FIG. 2. In this example, the second peak (solid black) of the first dimension portion of the two-dimensional chromatogram overlaps with the recycled peak in the second dimension portion of the two-dimensional chromatogram.

Referring to FIG. 4B, another example of a two-dimensional chromatogram with two chromatographic peaks (91 and 92) in the first dimension and a single peak (94) in the second dimension is shown. In this example, peak 91 (the first peak) of the first dimension run is re-circulated through the same chromatographic medium to give peak 94; in other words, peak 94 in the second dimension portion of the chromatogram is originated from the recycling of the chromatographic eluent carrying peak 91 from the first dimension portion of the chromatogram.

Referring still to FIG. 4B, in some instances, RT1, which is the retention time of peak 91, is approximately half of that of peak 92 (RT2). Prior-art assembly of FIG. 2 does not have provisions to isolate and hold (in other words, delay) the elution of peak 91 during the second dimension run; recycling of peak 91 (in other words, the movement of peak 91 toward the detector module) begins almost immediately after it moves into fluid holding compartment 60 of FIG. 2. Peak 92 (the second peak) of the first dimension portion of the chromatogram overlaps with peak 94 in the second dimension portion of the chromatogram. Consequently, identification and quantification of the overlapped peaks become ambiguous.

Figure 4C:
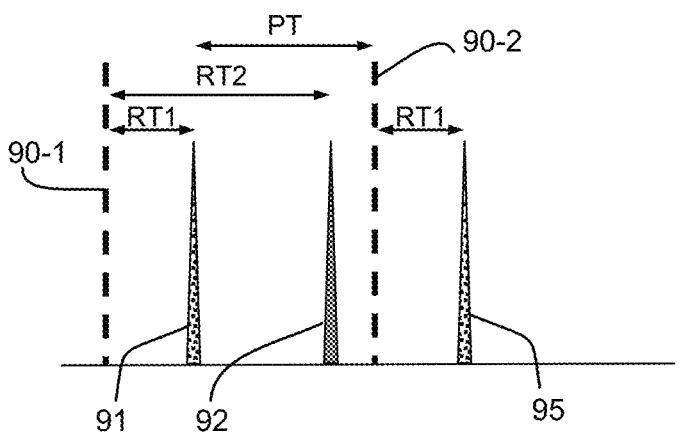
FIG. 4C is an example of a two-peak, two-dimensional chromatogram, wherein the first peak of a first dimension portion of the two-dimensional chromatogram is recycled to give a single-peak in the second dimension portion of the two-dimensional chromatogram using the present invention. In this example, the second peak (the last) of the first dimension portion of the two-dimensional chromatogram does not overlap with the recycled peak in the second dimension portion of the two-dimensional chromatogram because the recycled peak is parked until the chromatography for the first dimension portion of the two-dimension chromatography is complete.

Referring to FIG. 4C, an example of a two-dimensional chromatogram, wherein peak 91 of the first dimension run is recycled using the present invention, is shown. The present invention has provisions to isolate and hold (in other words, delay) any peak, which is scheduled to be re-circulated. In this example, re-circulation of peak 91 is delayed until peak 92 of the first dimension run exits the present invention. The delay time (parking time) is labeled as PT. Upon elution of peak 92 out of the present invention, peak 91 is released from isolation to give peak 95 in the second dimension portion of the chromatogram.

Referring to FIGS. 4A, 4B, and 4C, the time differential between the time when a peak is recorded by a detector module and the time when the chromatographic eluent carrying the peak reaches an intended fluid holding compartment is shown as negligible. It is possible that in some other instances, the time differential is significant. The present invention does not put any restriction on PT. Hence the overlap of peaks between dimensions is not possible. Therefore, the present invention is suitable for recycling any chromatographic peak from any chromatogram between any two dimensions of chromatographic runs.

Figure 5:
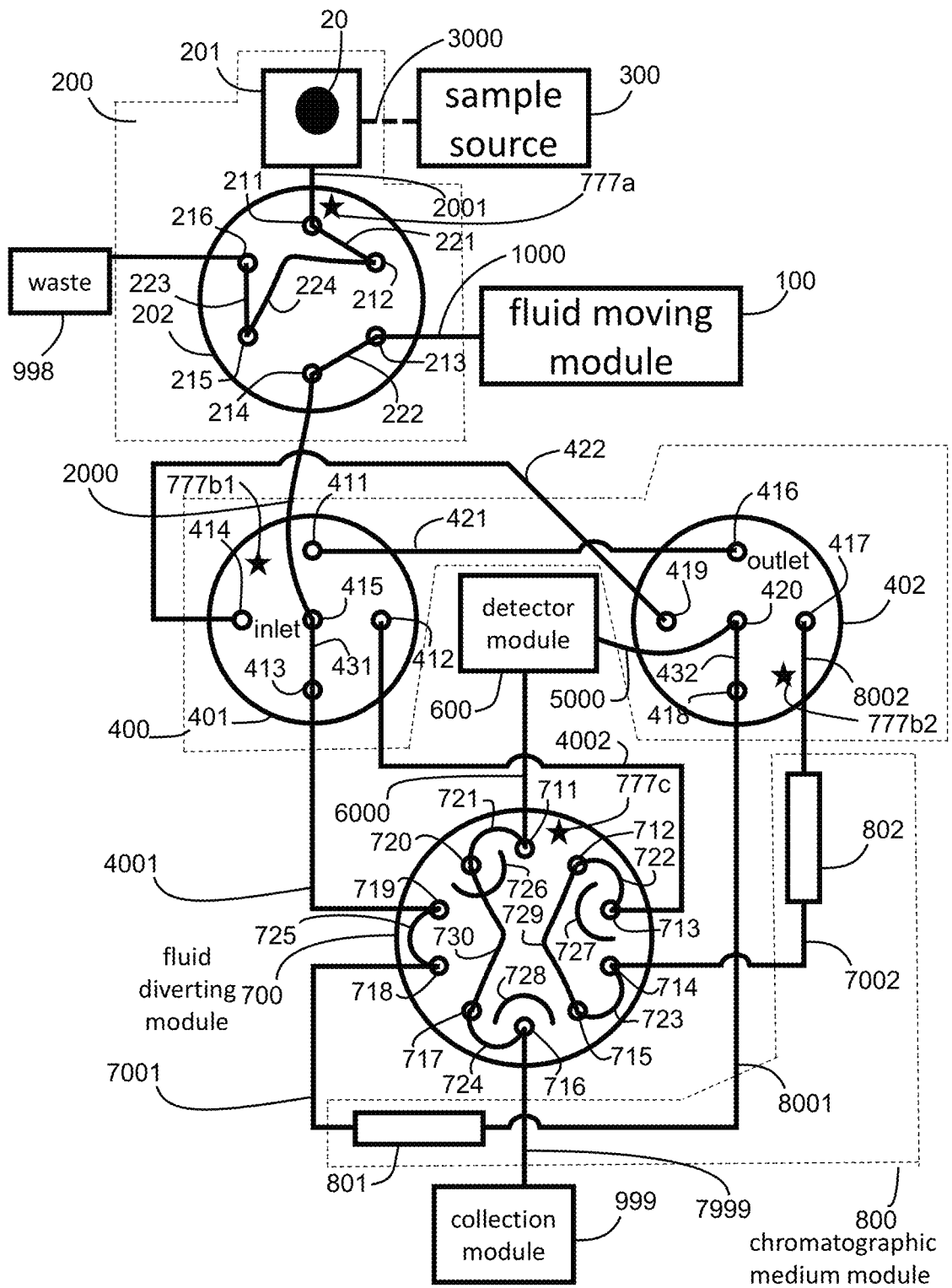
FIG. 5 is a flow diagram of the multidimensional chromatographic assembly of FIG. 1; the injector module includes a configurable injection device, which is equipped with an injection introduction device and a fluid holding compartment; the injector module is in the load configuration; a sample (analyte), which is shown as a solid black circle, is in the injection introduction device; the chromatographic medium module, which comprises two flow-paths each consisting of a chromatographic medium, is shown; the chromatographic medium selector module, which comprises two portions (an inlet and an outlet), establishes fluid communication between the first chromatographic medium of the chromatographic medium module and the fluid moving module; the configuration of the configurable modules (the injector module, the inlet and the outlet modules of chromatographic medium selector module, and the fluid diverting module) are indicated by asterisk labels on the respective configurable modules.

Referring to FIG. 5, a flow diagram of the multidimensional chromatographic assembly of FIG. 1, which is the present invention, is shown. The multidimensional chromatographic assembly includes a fluid moving module (100), a two-configuration injection module (200), a sample source (300), a chromatographic medium selector module (400), a detector module (600), a multi-configuration fluid diverting module (700), a chromatographic medium module (800), and a collection module (999).

Referring still to FIG. 5, injector module 200 includes a two-configuration six-port injection device (202), which is equipped with an injection introduction device 201, which is connected at port 211 of the injection device, and a fluid holding compartment 224, which is connected between ports 212 and 215 of the injection device. Port 216 is connected to waste 998.

Referring still to FIG. 5, injection introduction device 201 receives a sample (20; shown as solid black circle) from sample source 300. In some representation, sample source 300 is physically connected to injection introduction device 201 via flow-path 3000. In some other representation, sample 20 is transported from sample source 300 to injection introduction device 201 by alternative means. Flow-path 3000 is shown by dashed lines to indicate both options. Alternative means include human intervention and transportation of the sample by a robotic device.

Referring still to FIG. 5, injection device 202 comprises two portions: a stationary portion (the stator) and a movable portion (the rotor). Movable flow-paths (221, 222, and 223), which are located on the rotor, connect stationary flow-paths (ports) of the stator (211 and 212, 213 and 214, and 215 and 216, respectively). In this configuration, injection device 202 is in a configuration wherein the injection introduction device 201 is in fluid communication with fluid holding compartment 224. This is the load configuration of injection device 202. In this configuration, sample 20 is introduced into fluid holding compartment 224 via injection introduction device 201 either through flow-path 3000 or by the alternative means.

Referring still to FIG. 5, in some representation, collection module 999 is waste.

Referring still to FIG. 5, chromatographic medium selector module 400 includes a configurable inlet module (401) and a configurable outlet module (402). The stationary portion of inlet module 401 includes one inlet port (415) and four outlet ports (411, 412, 413, and 414). On the other hand, the movable portion of inlet module 401 includes a movable flow-path (431), which connects port 415 to one of the four ports (411, 412, 413, or 414) from one of the four available configurations of the inlet module. In the current configuration, ports 413 and 415 are in fluid communication.

Referring still to FIG. 5, the stationary portion of outlet module 402 includes one outlet port (420) and four inlet ports (416, 417, 418, and 419). On the other hand, the movable portion of outlet module 402 includes a movable flow-path (432), which connects port 420 to one of the four ports (416, 417, 418, or 419) from one of the four available configurations of the outlet module. In current configuration, ports 418 and 420 are in fluid communication.

Referring still to FIG. 5, ports 411 and 414 of inlet module 401 are connected to ports 416 and 419 of outlet module 402 via flow-paths 421 and 422, respectively. In some representations, only ports 411 and 416 are connected by flow-path 421. In those representations, ports 414 and 419 are closed (dead-ended). In some other representation, both flow-paths 421 and 422 are absent and ports 411, 414, 416, and 419 are closed (dead-ended).

Referring still to FIG. 5, port 214 of injection device 202 is connected at port 415 of inlet module 401 via flow-path 2000. On the other hand, detector module 600 is connected at port 420 of outlet module 402 via flow-path 5000.

Referring still to FIG. 5, multi-configuration fluid diverting module 700 is connected to detector module 600 via flow-paths 6000. Fluid diverting module 700 and inlet module 401 are connected via two other flow-paths (4001 and 4002). Flow-path 4001 spans between ports 413 and 719 and flow-path 4002 spans between 412 and 713. On the other hand, fluid diverting module 700 and outlet module 402 are connected by two other flow-paths via chromatographic medium module 800, which comprises two chromatographic media (801 and 802). Chromatographic medium 801 is connected to the fluid diverting module (at port 718) and outlet module 402 (at port 418) via flow-paths 7001 and 8001, respectively. Similarly, chromatographic medium 802 is connected to the fluid diverting module (at port 714) and outlet module 402 (at port 417) via flow-paths 7002 and 8002, respectively.

Referring still to FIG. 5, the fluid diverting module comprises of two portions: a stationary portion (the stator) and a movable portion (the rotor). The rotor of fluid diverting module 700 comprises eight movable flow-paths (721, 722, 723, 724, 725, 726, 727, and 728). Each flow-path comprises two termini and a connecting coplanar groove. The entire portion of the individual flow-paths (the termini and the groove) are located on the interfacial plane where the rotor meets the stator. The termini of each flow-path are located on a circle; the center of the circle is located on the axis of rotation of the rotor; the body of the groove is spaced outside the circle on which the termini are located. In other words, the spatial disposition of the grooves is curved. When the rotor is moved appropriately, the terminus of the flow-path meets a port of the stator. The terminus of the flow-path establishes fluid communication between the port and the groove of the flow-path. When the terminus of the flow-path is rotated away from a port, the groove completely loses fluid communication with the port until the terminus bearing the groove reaches another port. In other words, during a configurational change of the fluid diverting module, all of the eight movable flow-paths momentarily lose fluid communications with the ports of the stator.

Referring still to FIG. 5, in some representation, the curved portions of some flow-paths (the grooves) are curved outside the area of the circle on which the termini lie; the grooves of the rest of the flow-paths reside inside the area of the aforementioned circle. Specifically, the rotor has five flow-paths (721, 722, 723, 724, and 725) with the grooves outside the circle and three flow-paths (726, 727, and 728) with grooves inside the circle.

Referring still to FIG. 5, the relative orientation of the stator and the rotor is referred to as position of the fluid diverting module hereon. There are five positions wherein five of the eight movable flow-paths (specifically, 721, 722, 723, 724, and 725) establish fluid communications with the ports of the stator. There are five other positions wherein the remaining three configurable flow-paths (specifically, 726, 727, and 728) establish fluid communication with a specific set of ports of the stator. It is important to note here that positions wherein configurable flow-paths 721, 722, 723, 724, and 725 connect the ports of the stator, configurable flow-paths 726, 727, and 728 do not make any contact with any port of the stator. On the other hand, positions wherein configurable flow-paths 726, 727, and 728 connect the ports of the stator, configurable flow-paths 721, 722, 723, 724, and 725 do not make any contact with any port of the stator.

Referring still to FIG. 5, a specific set of connectivity among peripheral modules (for example, the inlet and the outlet modules of the chromatographic medium selector module, the detector module, and the collection module) gives rise to a specific configuration of fluid diverting module 700. A specific relative position of the fluid diverting module gives rise to a specific configuration of the present invention. It is possible that there are more than one positions of the fluid diverting module that gives rise to a specific configuration of the fluid diverting module.

Referring still to FIG. 5, fluid diverting module 700 adopts several configurations based on connectivity among peripheral modules from a specific position of the fluid diverting module.

Referring still to FIG. 5, the position of fluid diverting module 700 wherein flow-paths 721, 722, 723, 724, and 725 connect adjacent ports (711 and 720, 712 and 713, 714 and 715, 716 and 717, and 718 and 719, respectively) of the stator is shown. In this position, flow-paths 726, 727, and 728 do not connect any port of the stator. This particular configuration of the present invention is referred to as this configuration hereon. For clarity, asterisk labels 777a, 777b1, 777b2, and 777c are used to indicate relative positions of the rotor with respect to the stator of injector module 200, inlet module 401 of chromatographic medium selector module 400, and outlet module 402 of chromatographic medium selector module 400, and fluid diverting module 700, respectively.

Referring still to FIG. 5, fluid diverting module 700 includes two fluid holding compartments. The first fluid holding compartment (729) is connected between ports 712 and 715 of the fluid diverting module. The second fluid holding compartment (730) is connected between ports 717 and 720 of the fluid diverting module.

Referring still to FIG. 5, fluid diverting module 700 is also connected to collection module 999 via flow-path 7999 at port 716. In some representation, collection module 999 is waste. In some other representation, the collection module includes an array of fluid containers wherein at least a portion of the fluid from the chromatographic assembly is archived. In some instances, the fluidic content of at least one fluid container is reinjected into the present invention for additional analysis.

Referring still to FIG. 5, sample 20 is in injection introduction device 201. Fluid moving module 100 is in fluid communication with detector module 600 via chromatographic medium 801. Detector module 600 is in fluid communication with collection module 999 via fluid holding compartment 730.

Referring still to FIG. 5, fluid carrying at least a portion of the sample (sample 20) flows from the injector module to detector module 600 via inlet module 401, fluid diverting module 700, chromatographic medium 801, and outlet module 402. The fluid re-enters fluid diverting module 700 from detector module 600. Fluid diverting module 700, which is configurable, either sends the fluid to the collection module or re-circulates the fluid through inlet module 401, chromatographic medium 801, outlet module 402, and detector module 600. Every time the fluid passes through the detector module, the detector module acquires data and measures properties of sample 20 within the fluid. Each data set represents a chromatographic dimension.

Referring still to FIG. 5, in this configuration, fluid moving module 100 moves eluent(s) from chromatographic medium 801 to fluid holding compartment 730. There is no fluid communication between fluid moving module 100 and fluid holding compartment 729. This is the first configuration of the multidimensional chromatographic assembly.

Figure 6:
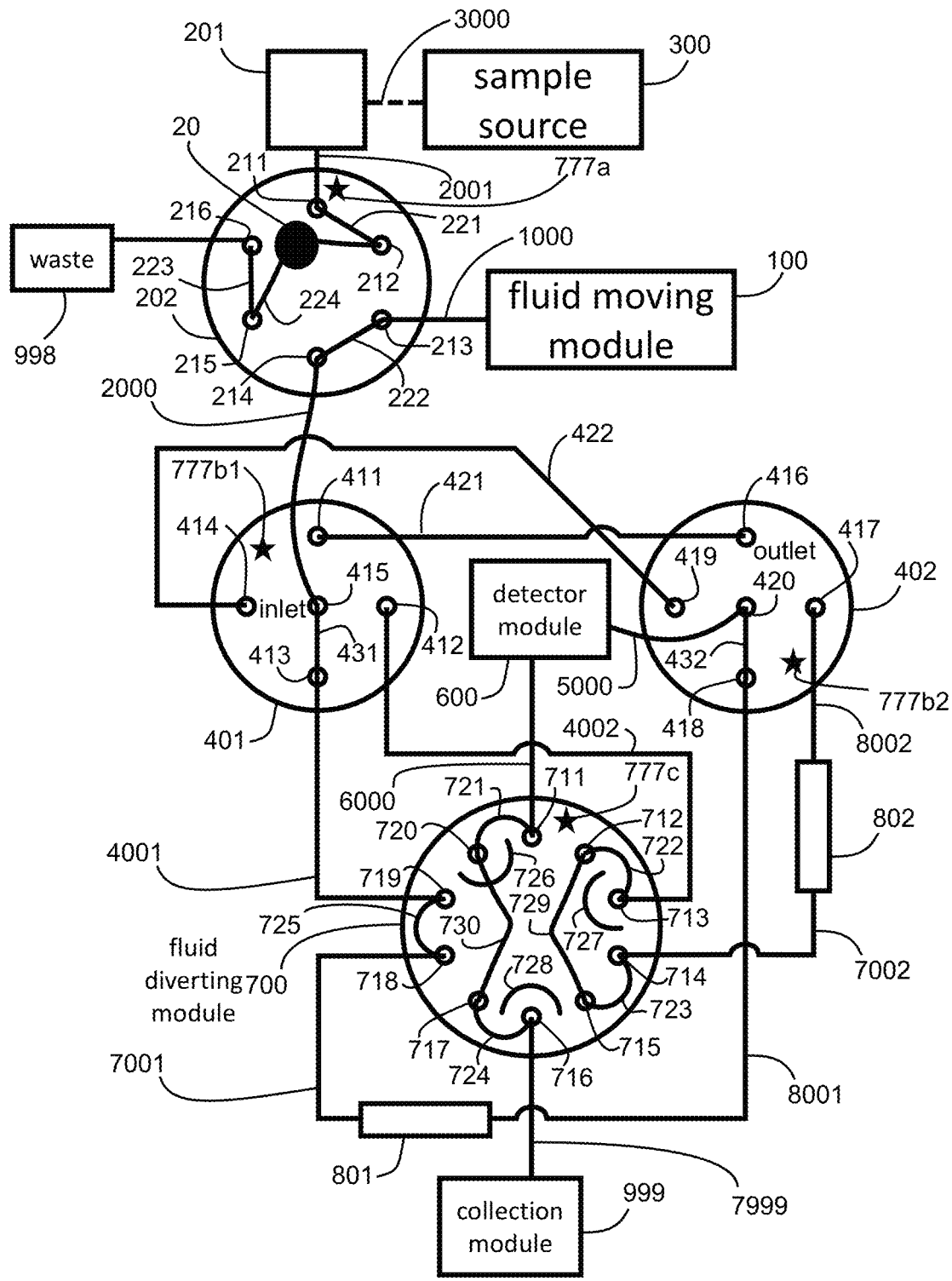
FIG. 6 is a flow diagram of the multidimensional chromatographic assembly of FIG. 1; the injector module is still in the load configuration; the sample is inside the fluid holding compartment of the injector module.

Referring to FIG. 6, a flow diagram of the multidimensional chromatographic assembly of FIG. 1 is shown.

Referring still to FIG. 6, in this configuration, injection device 202 is in the load configuration. Sample 20 is moved from injection introduction device 201 to fluid holding compartment 224 via flow-paths 2001 (stationary) and 221 (movable).

In some representation, sample source 300 and injection introduction device 201 are not physically connected. Samples are moved from the sample source to the injection introduction device by human. In some representation, a robotic means transports samples from the sample source to the injection introduction device.

Referring still to FIG. 6, in some representation, only a portion of fluid holding compartment 224 is populated by sample 20. In some other representation, sample 20 populates the entire swept volume of the fluid holding compartment and overflows into collection module 999. The positions of all modules are unchanged from the configuration of FIG. 5.

Figure 7:
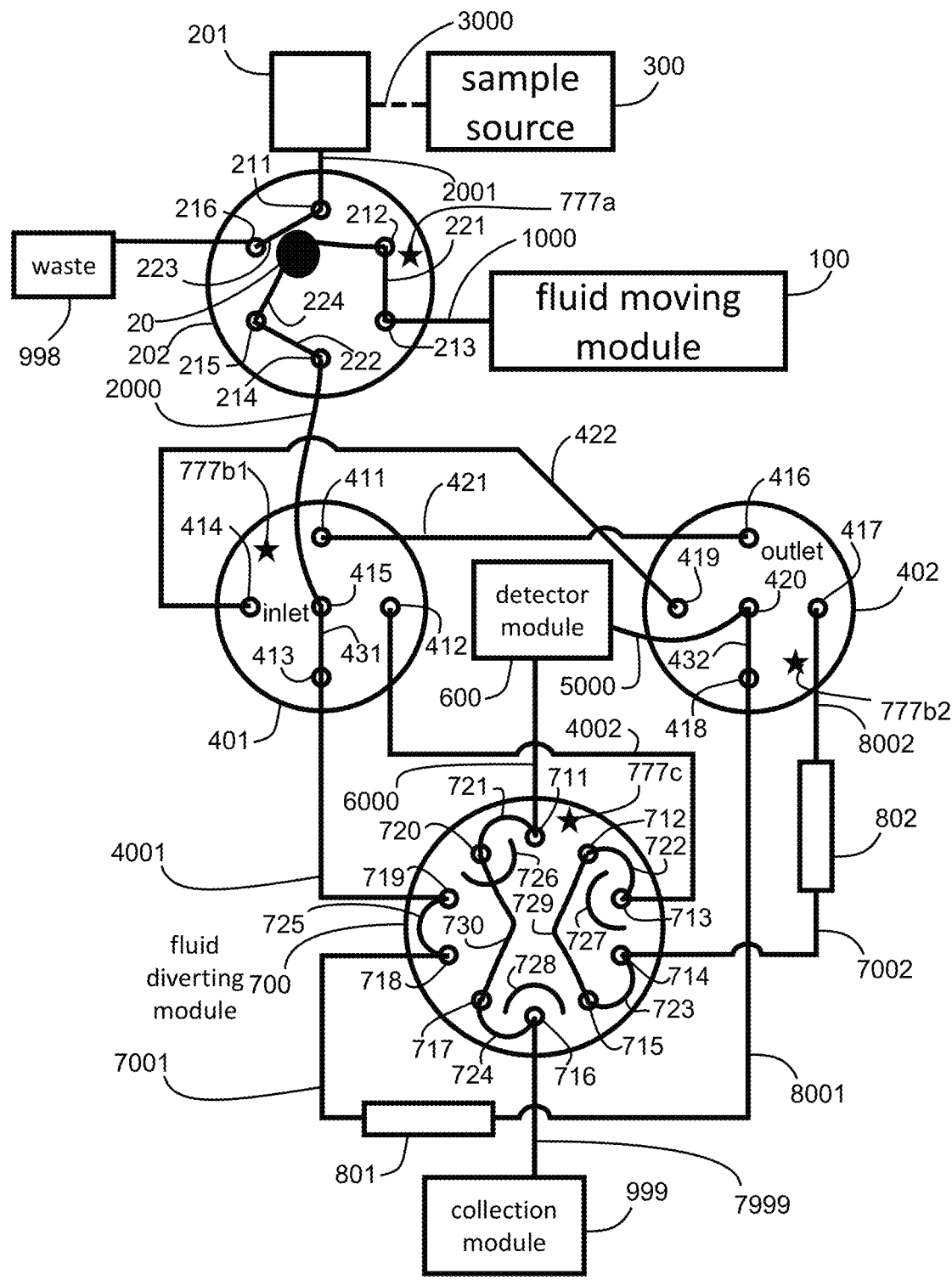
FIG. 7 is a flow diagram of the multidimensional chromatographic assembly of FIG. 1; the injector module is in the inject configuration; the sample is still inside the fluid holding compartment, which is in fluid communication with the fluid moving module and the first chromatographic medium of the chromatographic medium module.

Referring to FIG. 7, a flow diagram of the multidimensional chromatographic assembly of FIG. 1 is shown.

Referring still to FIG. 7, injection device 202 is moved from the load configuration to the inject configuration; sample 20 is in fluid communication with fluid moving module 100 and chromatographic medium 801 via chromatographic medium selector module 400 and fluid diverting module 700; chromatographic medium 801 is in fluid communication with detector module 600. The positions of all other modules are unchanged from the configuration of FIG. 6.

Figure 8:
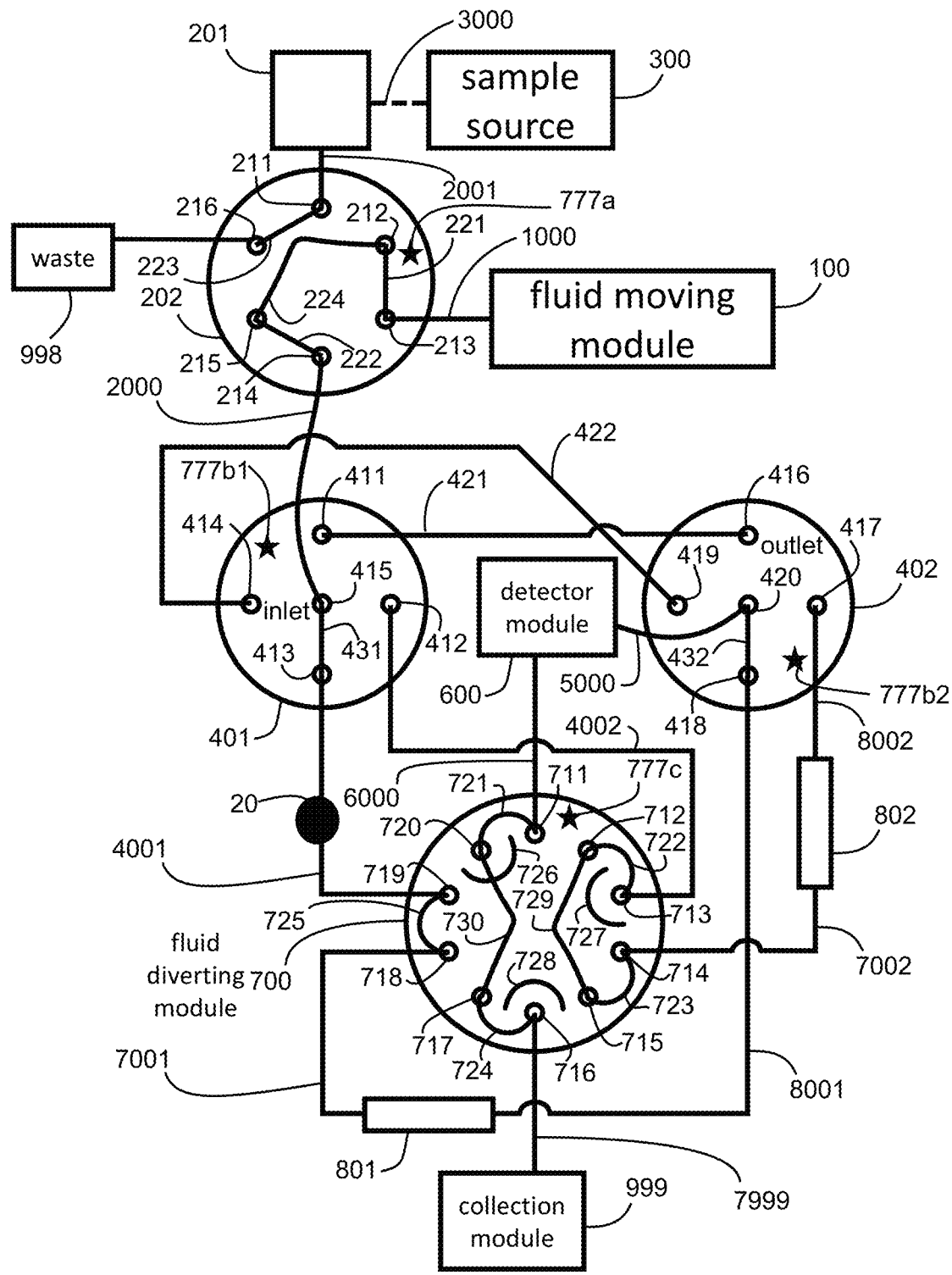
FIG. 8 is a flow diagram of the multidimensional chromatographic assembly of FIG. 1; the sample, which is in motion, is shown in a flow-path downstream of the inlet module of the chromatographic medium selector module and upstream of the fluid diverting module.

Referring to FIG. 8, a flow diagram of the multidimensional chromatographic assembly FIG. 1 is shown.

Referring still to FIG. 8, sample 20 is moved toward fluid diverting module 700; sample 20, which is in motion, is in flow-path 4001. Configurations of the modules are unchanged from the configuration of FIG. 7.

Figure 9:
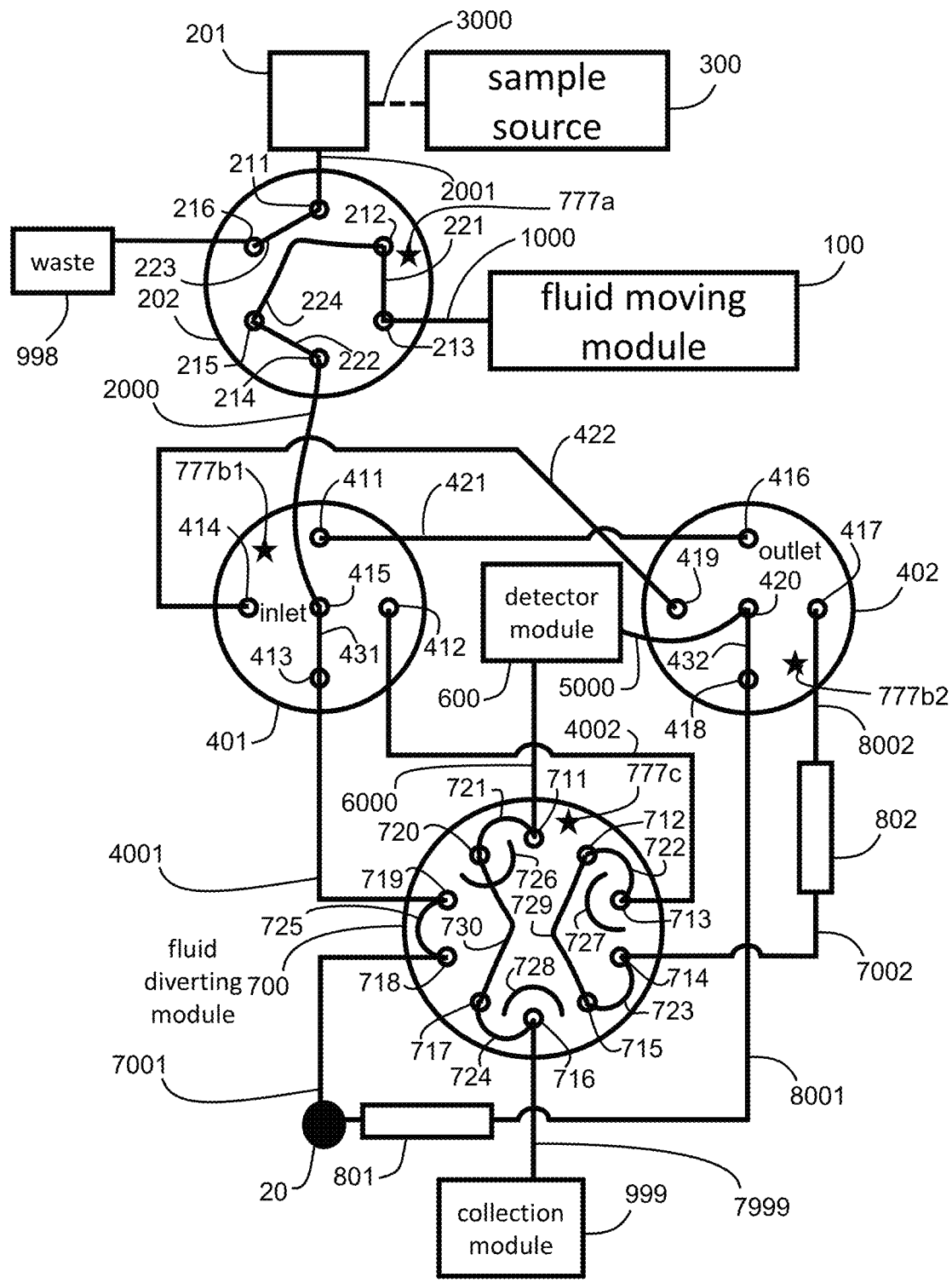
FIG. 9 is a flow diagram of the multidimensional chromatographic assembly of FIG. 1; the sample, which is in motion, is shown in a flow-path downstream of the fluid diverting module and upstream of the first chromatographic medium.

Referring to FIG. 9, a flow diagram of the multidimensional chromatographic assembly of FIG. 1 is shown.

Referring still to FIG. 9, sample 20, which is in flow-path 7001 and in motion, moves toward chromatographic medium 801 through ports 718 and 719 using flow-path 725. The positions of all modules are unchanged from the configuration of FIG. 8.

Figure 10:
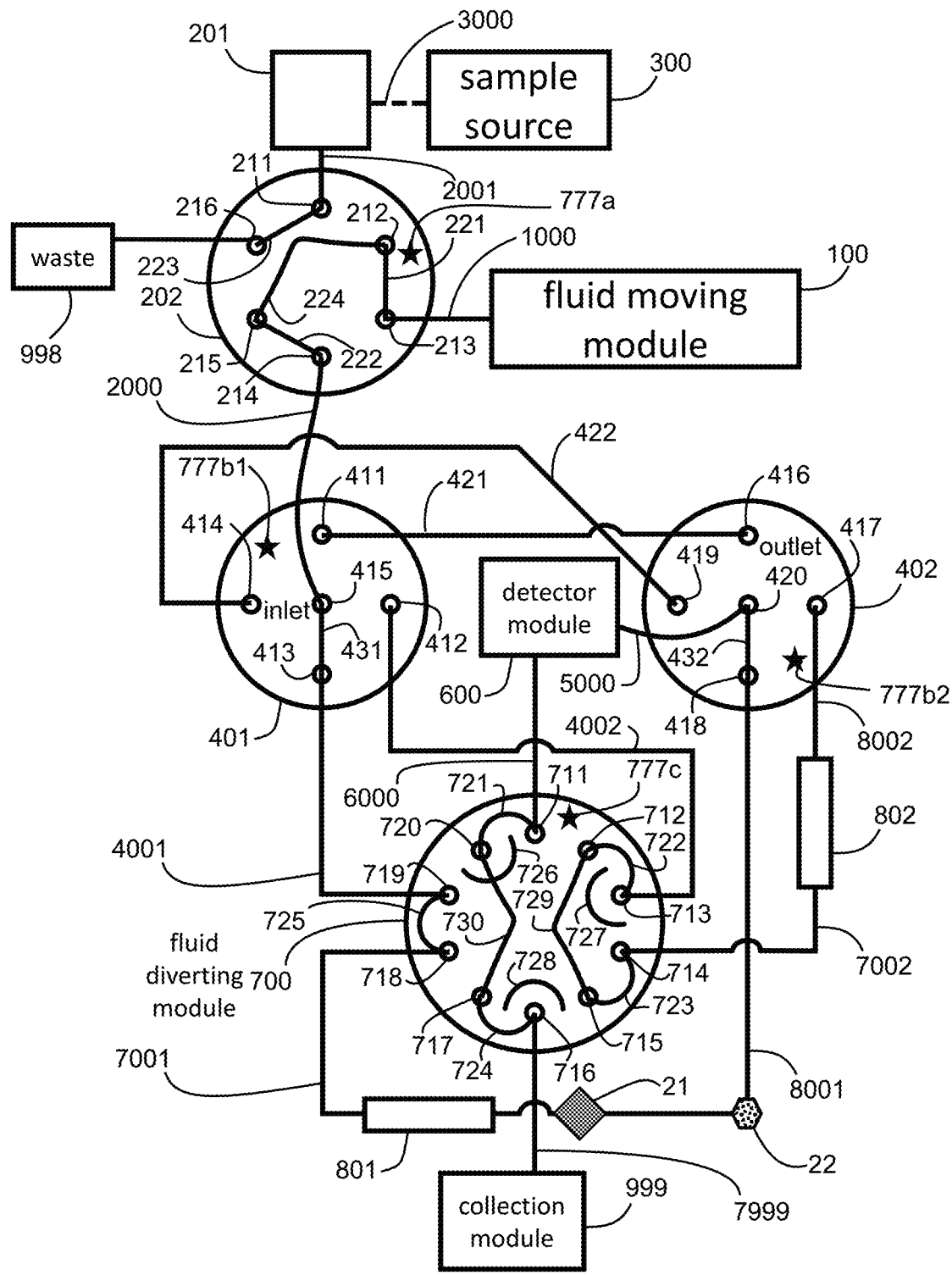
FIG. 10 is a flow diagram of the multidimensional chromatographic assembly of FIG. 1; the sample is separated into two discrete eluent segments by the first chromatographic medium; these segments are referred to as the first and the second analytes hereon; both analytes are in a flow-path downstream of the first chromatographic medium and upstream of the outlet portion of the chromatographic medium selector module and in motion; the second analyte, which is represented by a solid diamond, is behind the first analyte, which is represented by a dotted hexagon.

Referring to FIG. 10, a flow diagram of the multidimensional chromatographic assembly of FIG. 1 is shown.

Referring still to FIG. 10, the positions of all modules are unchanged from the configuration of FIG. 9. Sample 20 is moved through chromatographic medium 801 and separated into two fluidic segments 21 and 22; segments 21 and 22 are referred to as analyte 21 and analyte 22 hereon.

Referring still to FIG. 10, analyte 21, which is shown solid gray diamond, is behind analyte 22, which is shown as dotted black hexagon; both analytes are in motion and in flow-path 8001.

Figure 11:
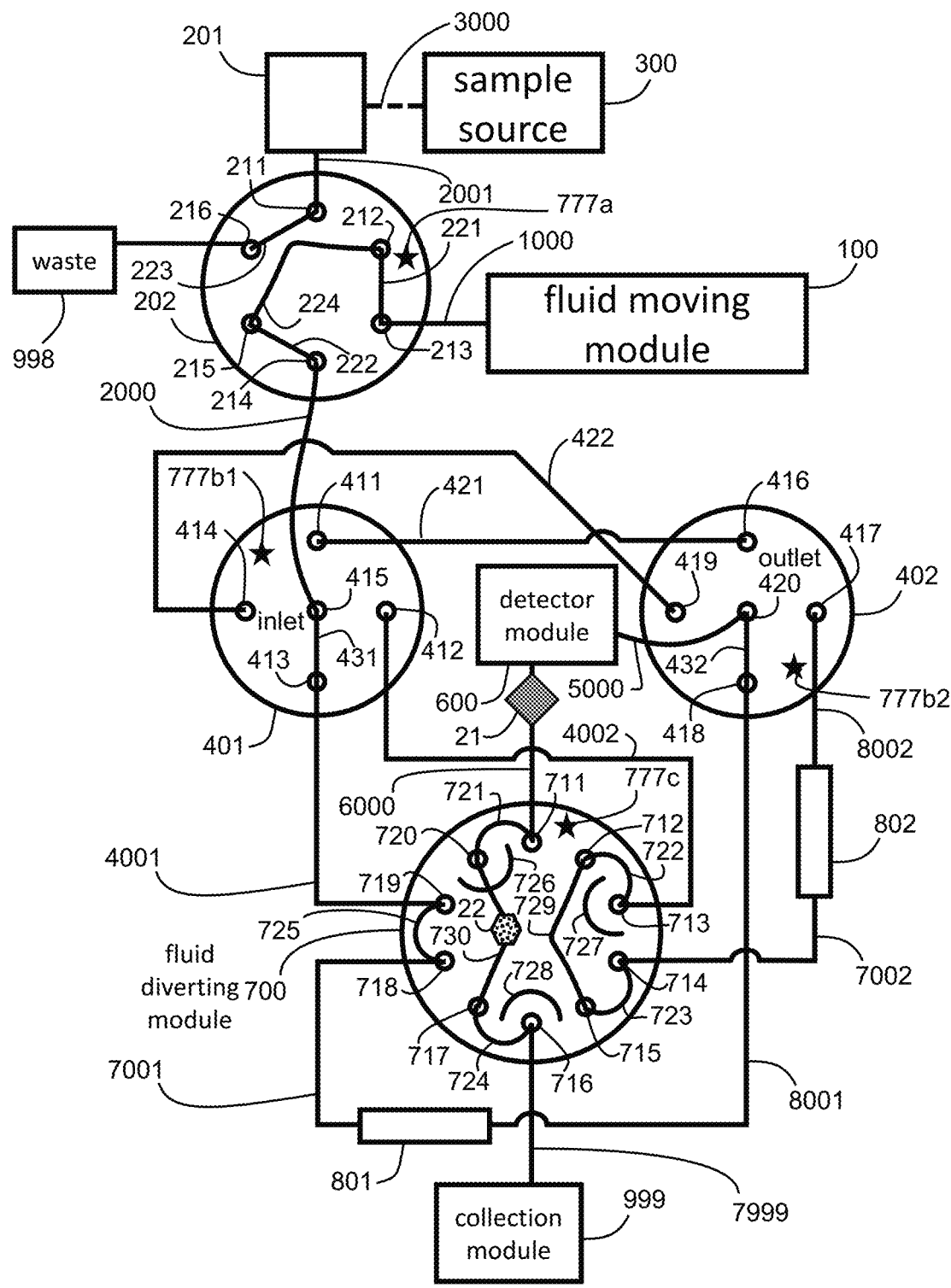
FIG. 11 is a flow diagram of the multidimensional chromatographic assembly of FIG. 1; the first and the second analytes are registered by the detector module in the first dimension portion of the multidimension chromatogram; the present invention further consists of two additional fluid holding compartments (a second and a third), which are mounted on the fluid diverting module; the first analyte is in the first fluid holding compartment and is in motion; the second analyte is in a flow-path downstream of the detector module and upstream of the fluid diverting module and in motion.

Referring to FIG. 11, a flow diagram of the multidimensional chromatographic assembly of FIG. 1 is shown.

Referring still to FIG. 11, analytes 21 and 22 moved past detector module 600. Responses from analytes 21 and 22 are registered by detector module 600. The responses give rise to two separate chromatographic peaks. Analyte 22, which is in fluid holding compartment 730 and in motion, is registered first by detector module 600. The corresponding chromatographic peak is registered as the first peak in the first dimension portion of the multidimension chromatogram of the present invention. Analyte 21, which is in flow-path 6000 and in motion, is registered as the second peak in the first dimension portion of the multidimension chromatogram of the present invention.

Figure 12:
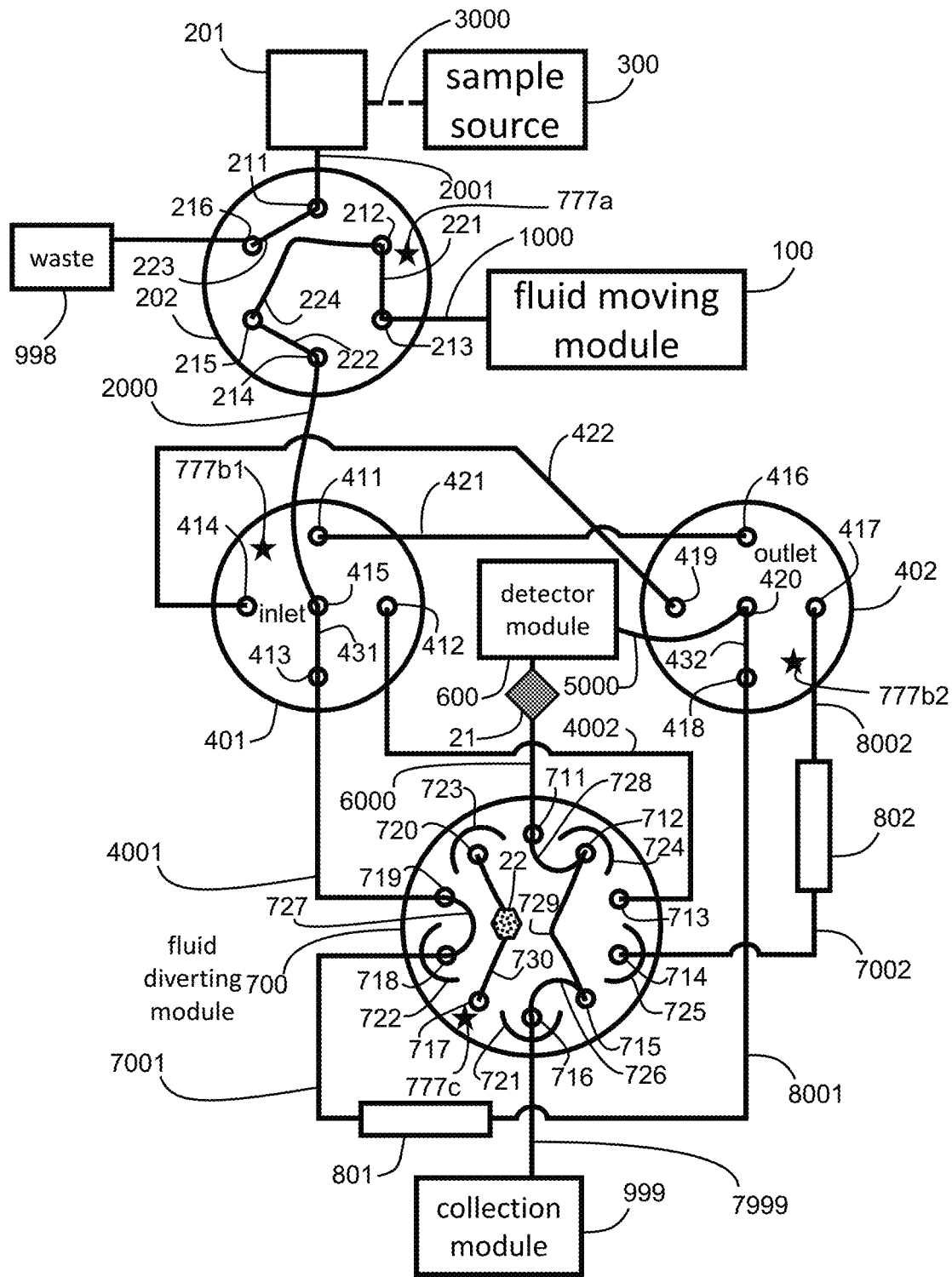
FIG. 12 is a flow diagram of the multidimensional chromatographic assembly of FIG. 1; the fluid diverting module is configured to disengage fluid communication between the first fluid holding compartment and the fluid moving module; the first analyte is isolated in the first fluid holding compartment and is stationary; the second analyte, which is in the flow-path upstream of the fluid diverting module and downstream of the detector module, is in motion and on its way to the collection module via the third fluid holding compartment.

Referring to FIG. 12, a flow diagram of the multidimensional chromatographic assembly of FIG. 1 is shown.

Referring still to FIG. 12, fluid diverting module 700 is moved to a new configuration by 198 degrees clockwise (or 162 degrees counter-clockwise) rotation. The positions of all other modules are unchanged from the configuration of FIG. 11. Asterisk label 777c of the fluid diverting module moved from its previous position (relative to the rotor) to a new position. The movement of fluid diverting module 700 is done in such a manner so that the angular distance between the first and the second positions is the shortest by rotating the rotor clockwise or counter-clockwise. In some representation, the torque applied on the rotor for such movements is adjusted to minimize impact from the movement (compression or decompression) of fluid moving module 100 during the movement of fluid diverting module 700. In some representation, the movement of fluid moving module 100 is momentarily halted during the movement of fluid diverting module 700 from one position to another.

In this configuration, fluid moving module 100 is in fluid communication with collection module 999 via fluid holding compartment 729. Fluid holding compartment 730 is disengaged from all fluid communications. Analyte 22 is isolated in fluid holding compartment 730 and is stationary. Analyte 21 is in flow-path 6000 and in motion.

Referring still to FIG. 12, at this configuration of the present invention, at least one eluent carrying a portion of a sample (the analyte) moves from the first chromatographic medium to the third fluid holding compartment without establishing a fluid communication between the fluid moving module and the second fluid holding compartment.

Referring still to FIG. 12, in this configuration, fluid moving module 100 moves eluent(s) from chromatographic medium 801 to fluid holding compartment 729. There is no fluid communication between fluid moving module 100 and fluid holding compartment 730. This is the second configuration of the multidimensional chromatographic assembly.

Figure 13:
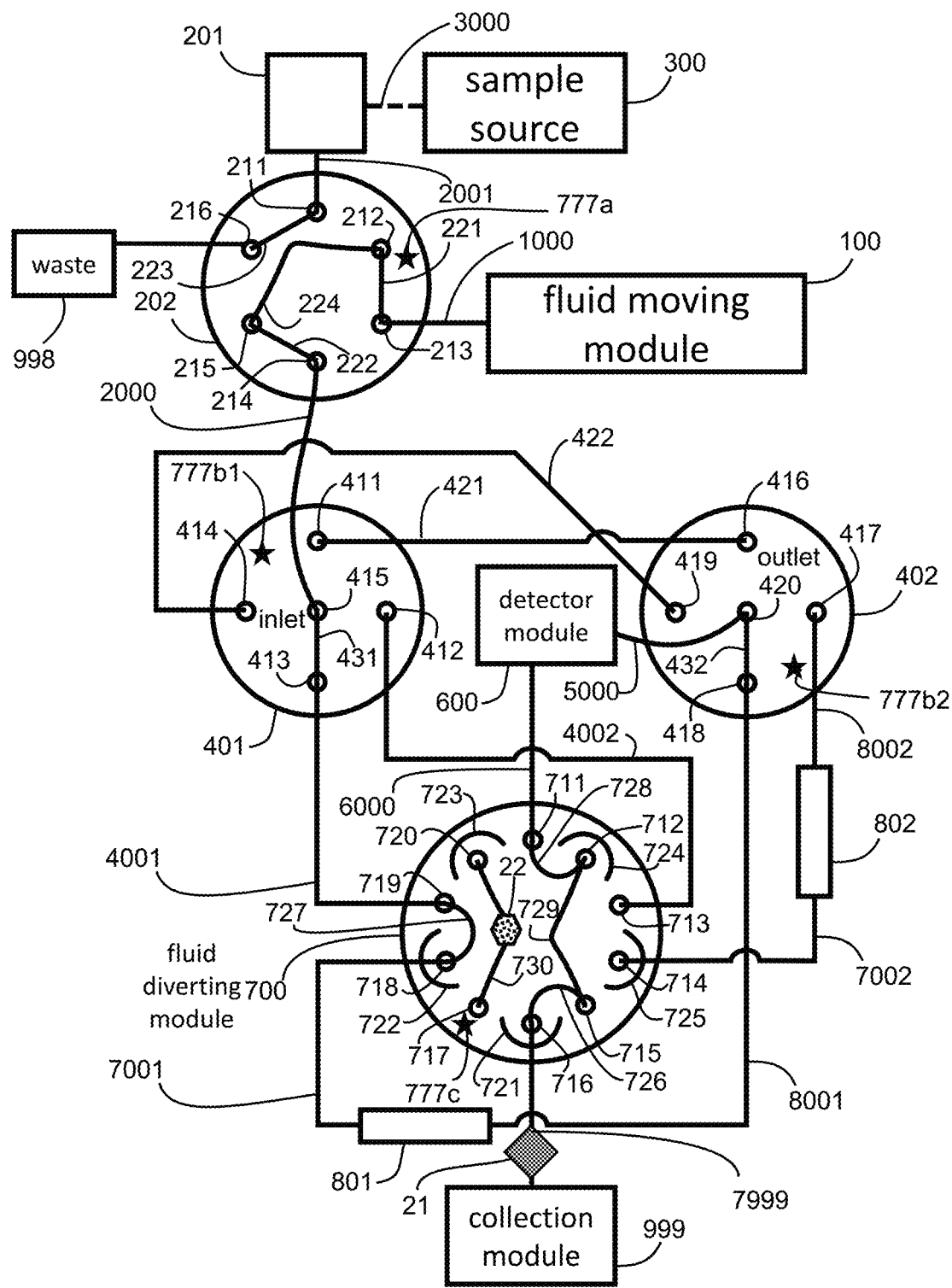
FIG. 13 is a flow diagram of the multidimensional chromatographic assembly of FIG. 1; the fluid moving module moves the second analyte to the collection module via the third fluid holding compartment; the second analyte exits the present invention; the first analyte is stationary in the second fluid holding compartment.

Referring to FIG. 13, a flow diagram of the multidimensional chromatographic assembly of FIG. 1 is shown.

Referring still to FIG. 13, the positions of all modules are from the configuration of FIG. 12. Analyte 21, which was in flow-path 6000 in FIG. 12 and in motion, moves to collection module 999 through fluid holding compartment 729. Analyte 22 remains stationary in fluid holding compartment 730. In some instances, analyte 21 exits the present invention via collection module 999. In some other instances, at least a portion of the analyte 21 is archived in at least one fluid container in collection module 999. In some instances, the archived portion of analyte 21 is re-injected into injector module 200 for a second multidimensional chromatographic analysis.

Referring still to FIG. 13, it is important to note that analyte 22 is held in fluid holding compartment 730 for an unspecified amount of time. During this time, an unspecified amount of fluid moved from fluid moving module 100 to collection module 999 via chromatographic medium 801 and fluid holding compartment 729.

Figure 14:
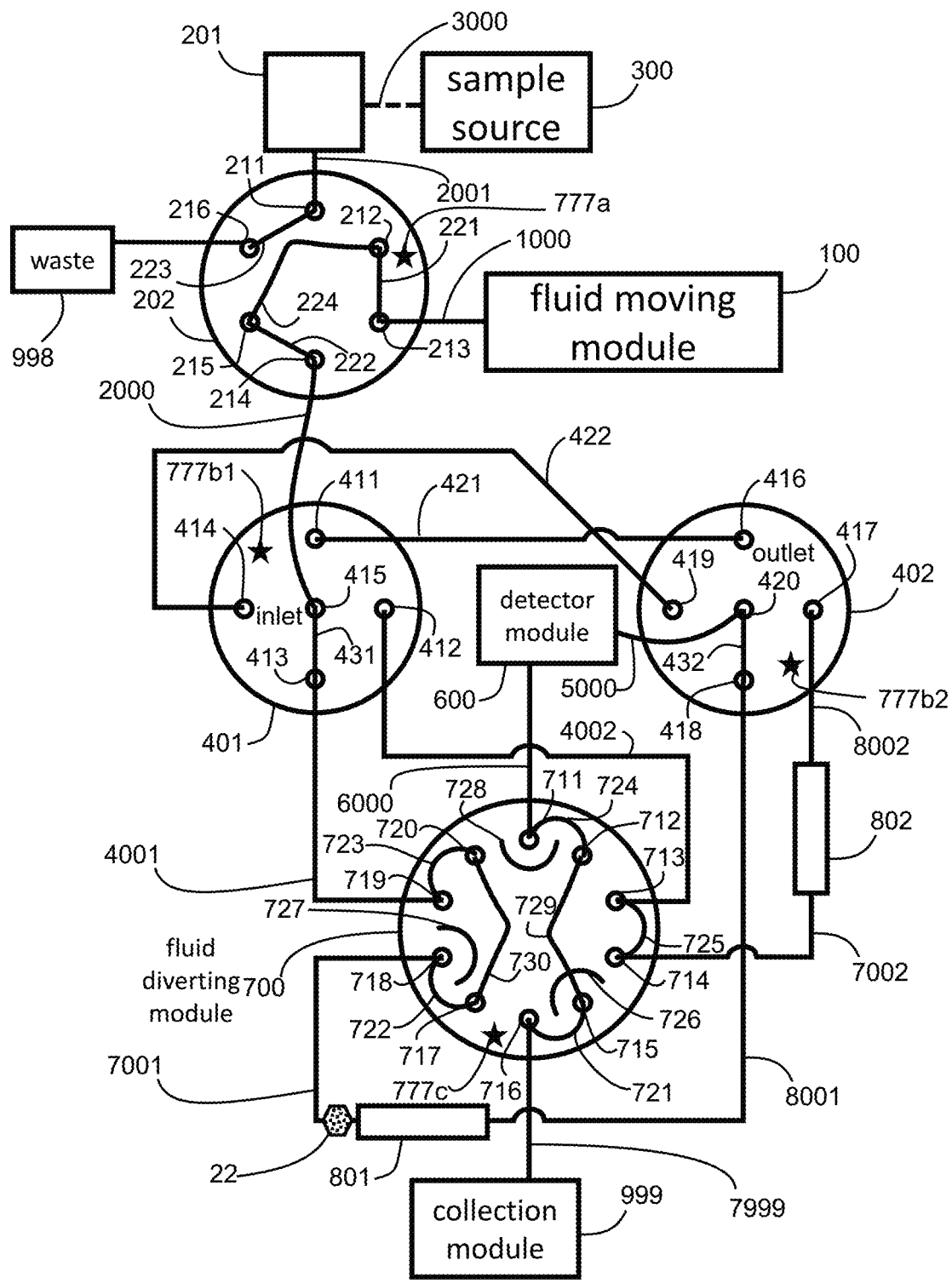
FIG. 14 is a flow diagram of the multidimensional chromatographic assembly of FIG. 1; the fluid diverting module is configured to establish fluid communication between the fluid moving module and the first chromatographic medium via the second fluid holding compartment; the fluid moving module moves the first analyte toward the first chromatographic medium for the first time as a separate entity.

Referring to FIG. 14, a flow diagram of the multidimensional chromatographic assembly of FIG. 1 is shown.

Referring still to FIG. 14, fluid diverting module 700 is moved by 342 degrees clockwise (or 18 degrees counter-clockwise) from the second (the previous) configuration. The positions of all other modules are unchanged in this configuration. Fluid diverting module 700 establishes fluid communication between flow-path 7001, wherein analyte 22 is located and in motion, and fluid moving module 100 via fluid holding compartment 730.

Referring still to FIG. 14, at least one eluent carrying a portion of a sample (the analyte) moves from the first chromatographic medium to the third fluid holding compartment while maintaining a fluid communication between the fluid moving module and the second fluid holding compartment.

Referring still to FIG. 14, fluid moving module 100 moves analyte 22 toward chromatographic medium 801 for a second time.

Referring still to FIG. 14, in this configuration, fluid moving module 100 moves eluent(s) from chromatographic medium 801 to fluid holding compartment 729. Fluid moving module 100 is also in fluid communication with fluid holding compartment 730. This is the third configuration of the multidimensional chromatographic assembly.

Figure 15:
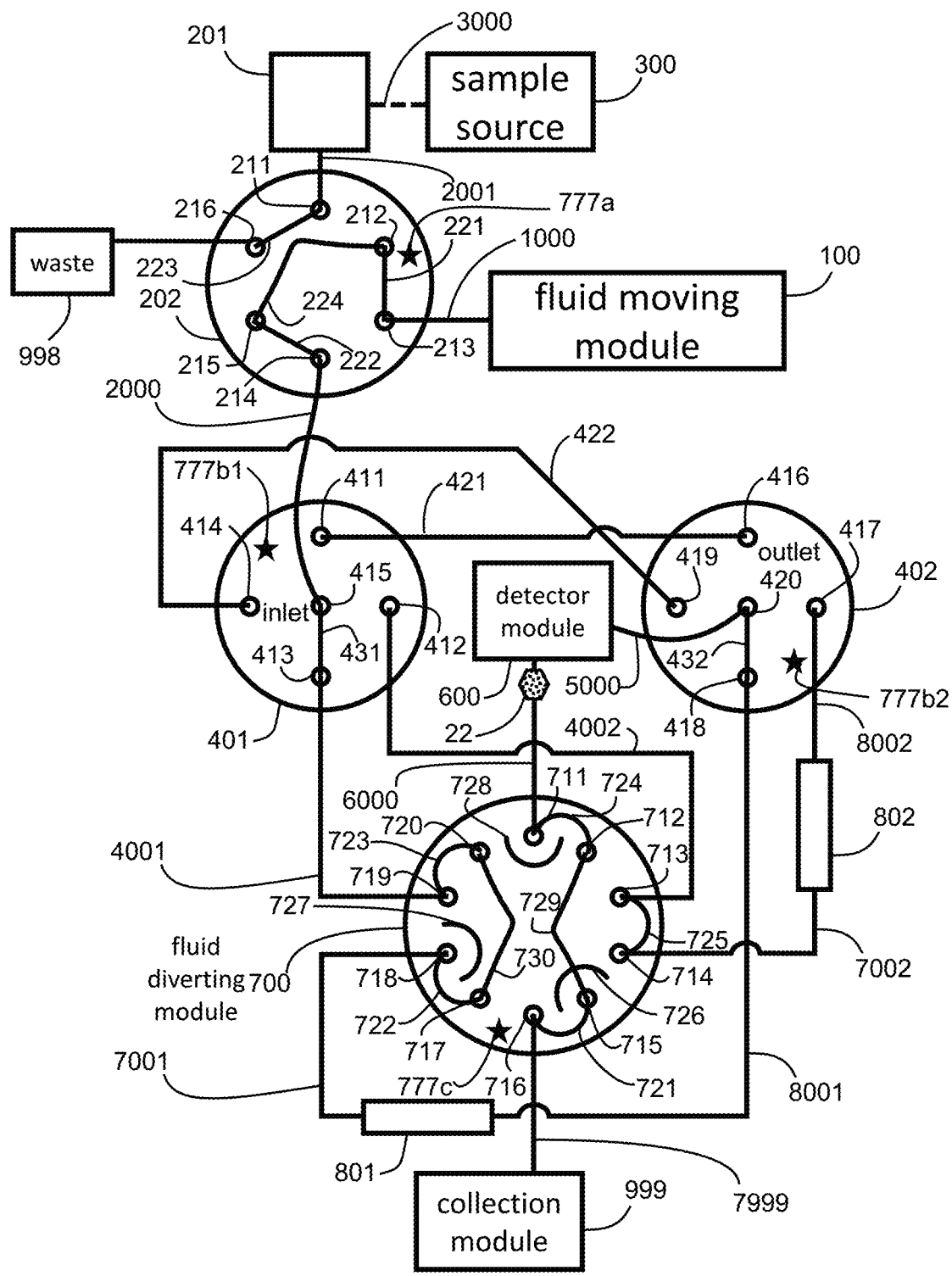
FIG. 15 is a flow diagram of the multidimensional chromatographic assembly of FIG. 1; the first analyte is moved through the first chromatographic medium first and then through the detector module; the first analyte is in the flow-path downstream of the detector module and upstream of the fluid diverting module; the first peak of the first dimension chromatogram is registered by the detector module for the second time in the second dimension portion of the multidimension chromatogram.

Referring to FIG. 15, a flow diagram of the multidimensional chromatographic assembly of FIG. 1 is shown.

Referring still to FIG. 15, the positions of all modules are unchanged from the configuration of FIG. 14. Analyte 22 moves to flow-path 6000, which is downstream of detector module 600. The response from analytes 22 is registered by detector 600 for a second time. The response gives rise to a chromatographic peak in the second dimension portion of the multidimension chromatogram of the present invention.

Figure 16:
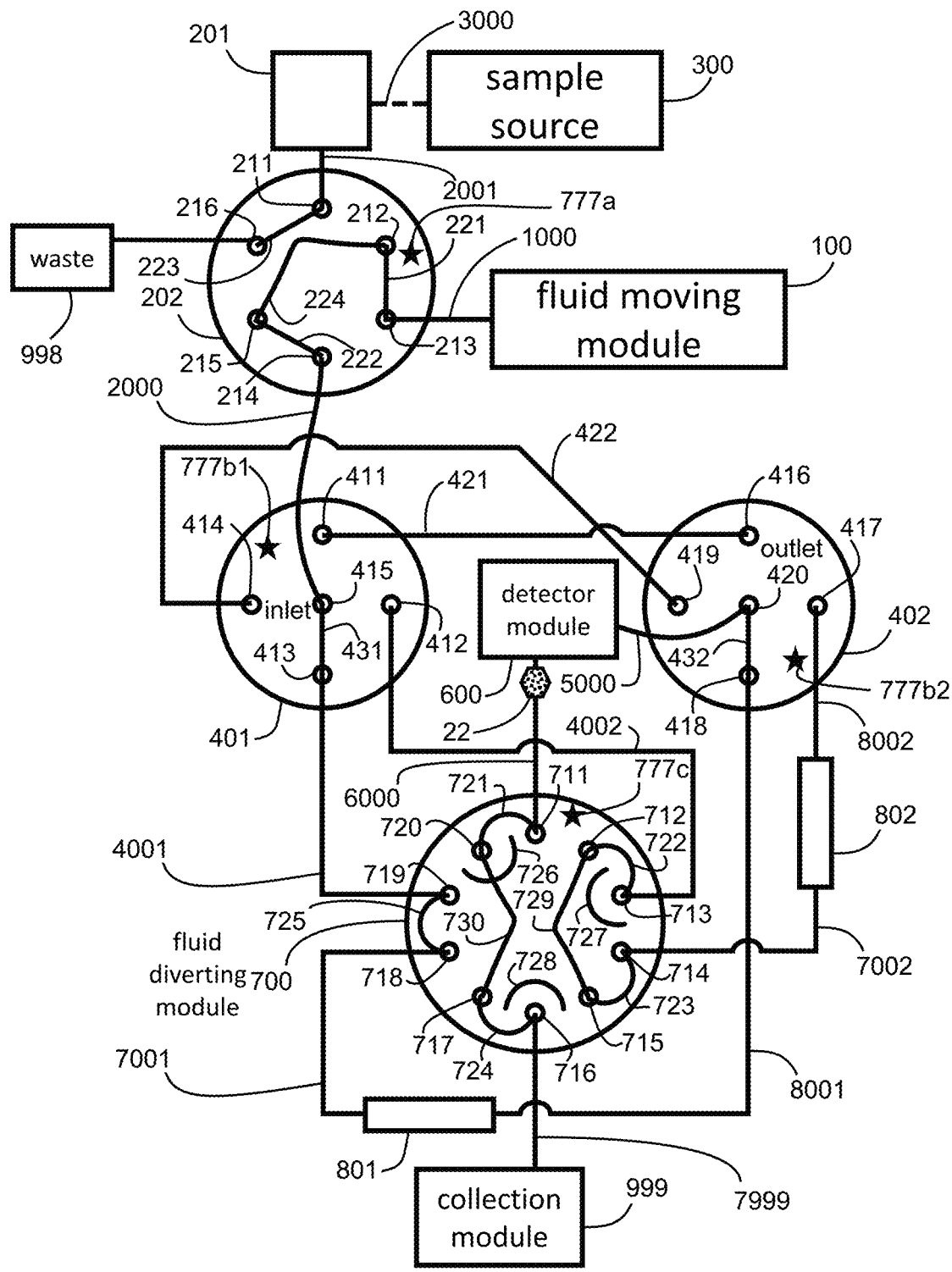
FIG. 16 is a flow diagram of the multidimensional chromatographic assembly of FIG. 1; the fluid diverting module is configured to establish fluid communication between the fluid moving module and the second fluid holding compartment.

Referring to FIG. 16, a flow diagram of the multidimensional chromatographic assembly of FIG. 1 is shown.

Referring still to FIG. 16, fluid diverting module 700 is moved by 180 degrees clockwise or counter-clockwise. The positions of all other modules are unchanged from the configuration of FIG. 15. Fluid diverting module 700 establishes fluid communication between flow-path 6000 and fluid moving module 100 and moves analyte 22 toward collection module 999 via fluid holding compartment 730.

Figure 17:
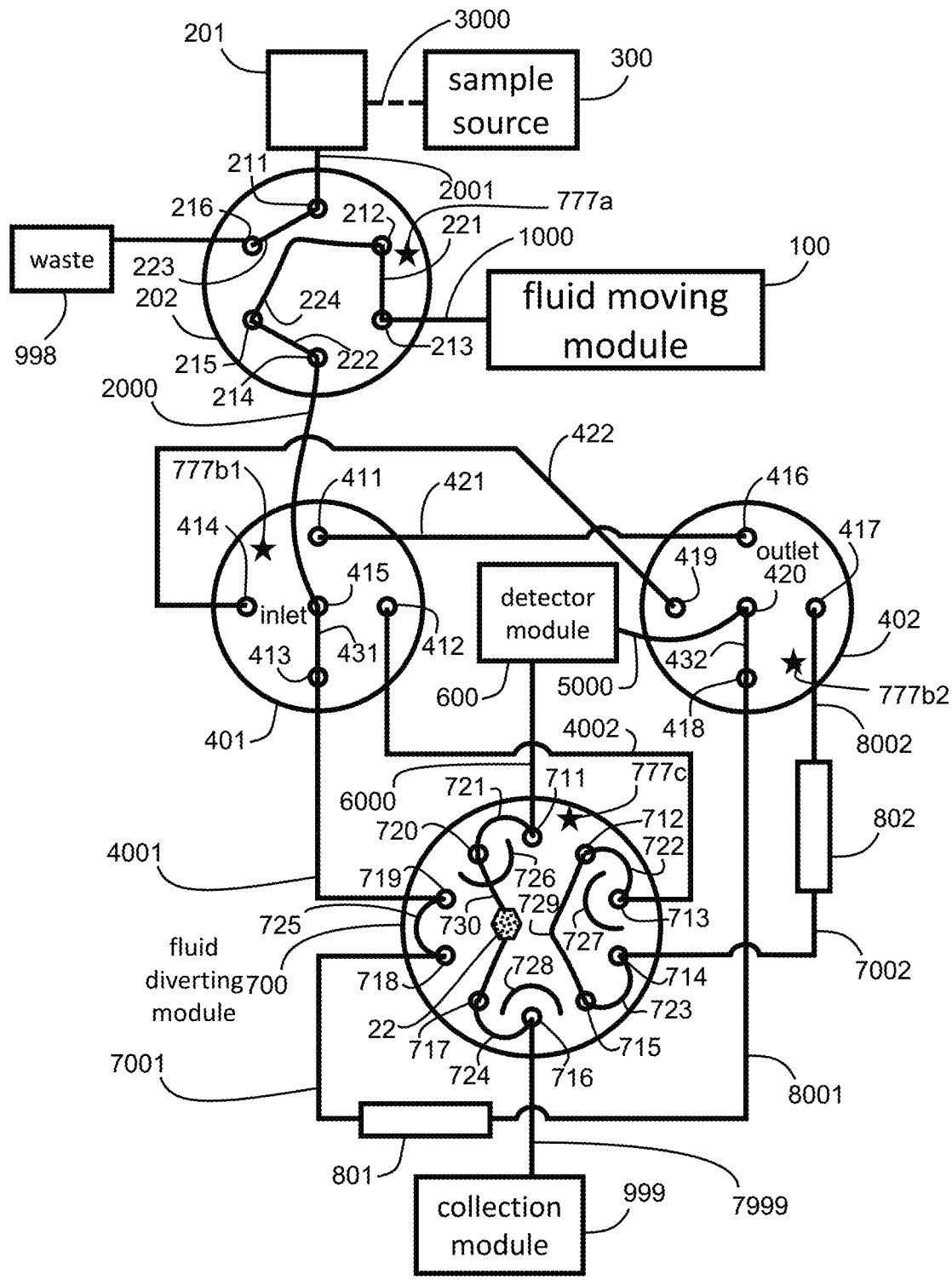
FIG. 17 is a flow diagram of the multidimensional chromatographic assembly of FIG. 1; the fluid moving module moves the first analyte into the second fluid holding compartment; the first analyte is in motion.

Referring to FIG. 17, a flow diagram of the multidimensional chromatographic assembly of FIG. 1 is shown.

Referring still to FIG. 17, analyte 22 is in fluid holding compartment 730 and in motion. The positions of all modules are unchanged from the configuration of FIG. 16.

Figure 18:
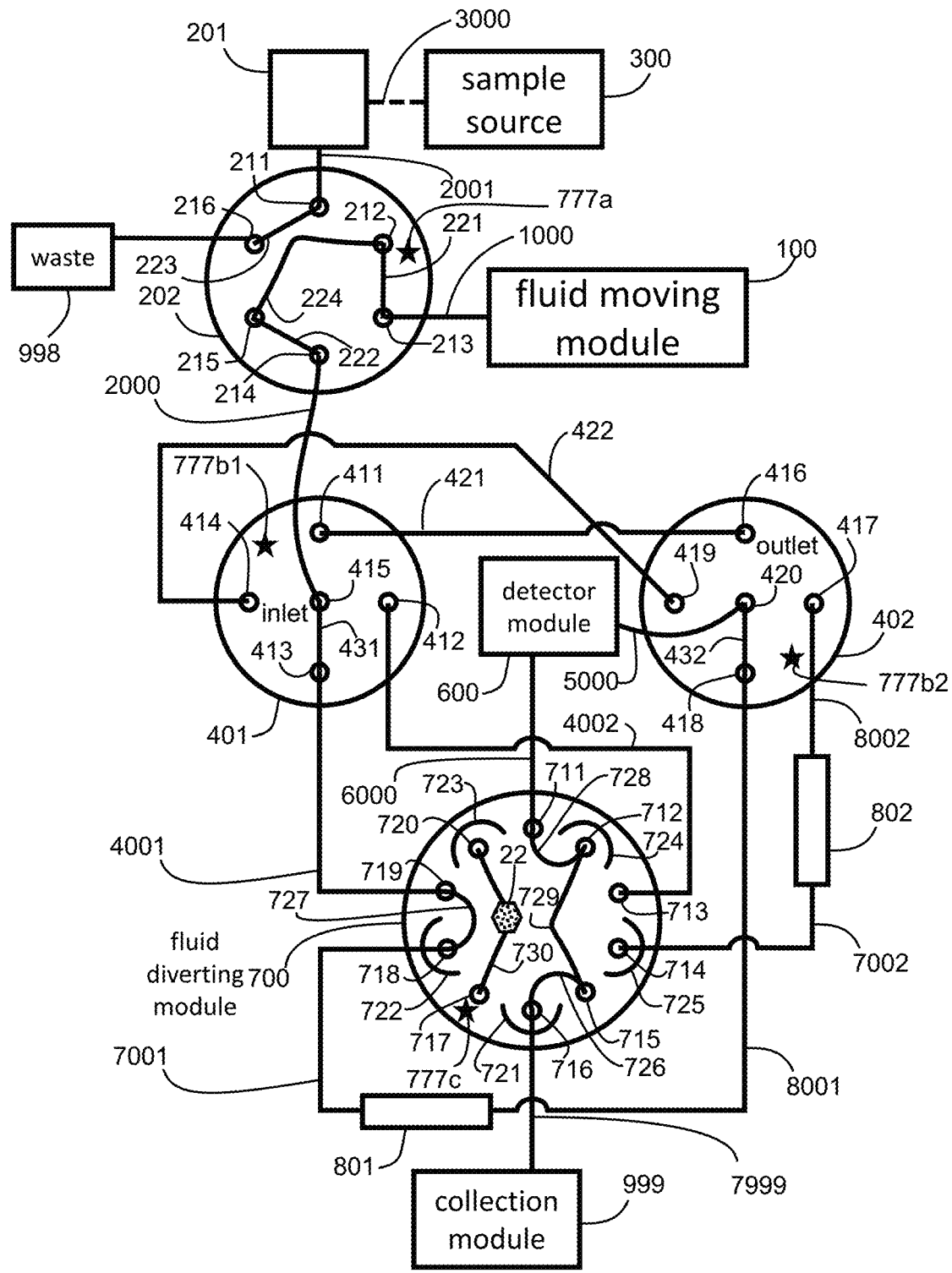
FIG. 18 is a flow diagram of the multidimensional chromatographic assembly of FIG. 1; the fluid diverting module is configured to disengage fluid communication between the second fluid holding compartment and the fluid moving module; the first analyte is isolated in the second fluid holding compartment for the second time and is stationary.

Referring to FIG. 18, a flow diagram of the multidimensional chromatographic assembly of FIG. 1 is shown.

Referring still to FIG. 18, fluid diverting module 700 is moved by 198 degrees clockwise (or 162 degrees counter-clockwise). The positions of all other modules are unchanged from the configuration of FIG. 17. Fluid diverting module 700 establishes fluid communication between fluid moving module 100 and collection module 999 via fluid holding compartment 729. Fluid holding compartment 730 is disengaged from fluid moving module 100; analyte 22 is isolated and stationary.

Referring to FIG. 18, it is important to note that analyte 22 is held in fluid holding compartment 730 for an unspecified amount of time. During this time, an unspecified amount of fluid moved from fluid moving module 100 to collection module 999 via chromatographic medium 801 and fluid holding compartment 729.

Figure 19:
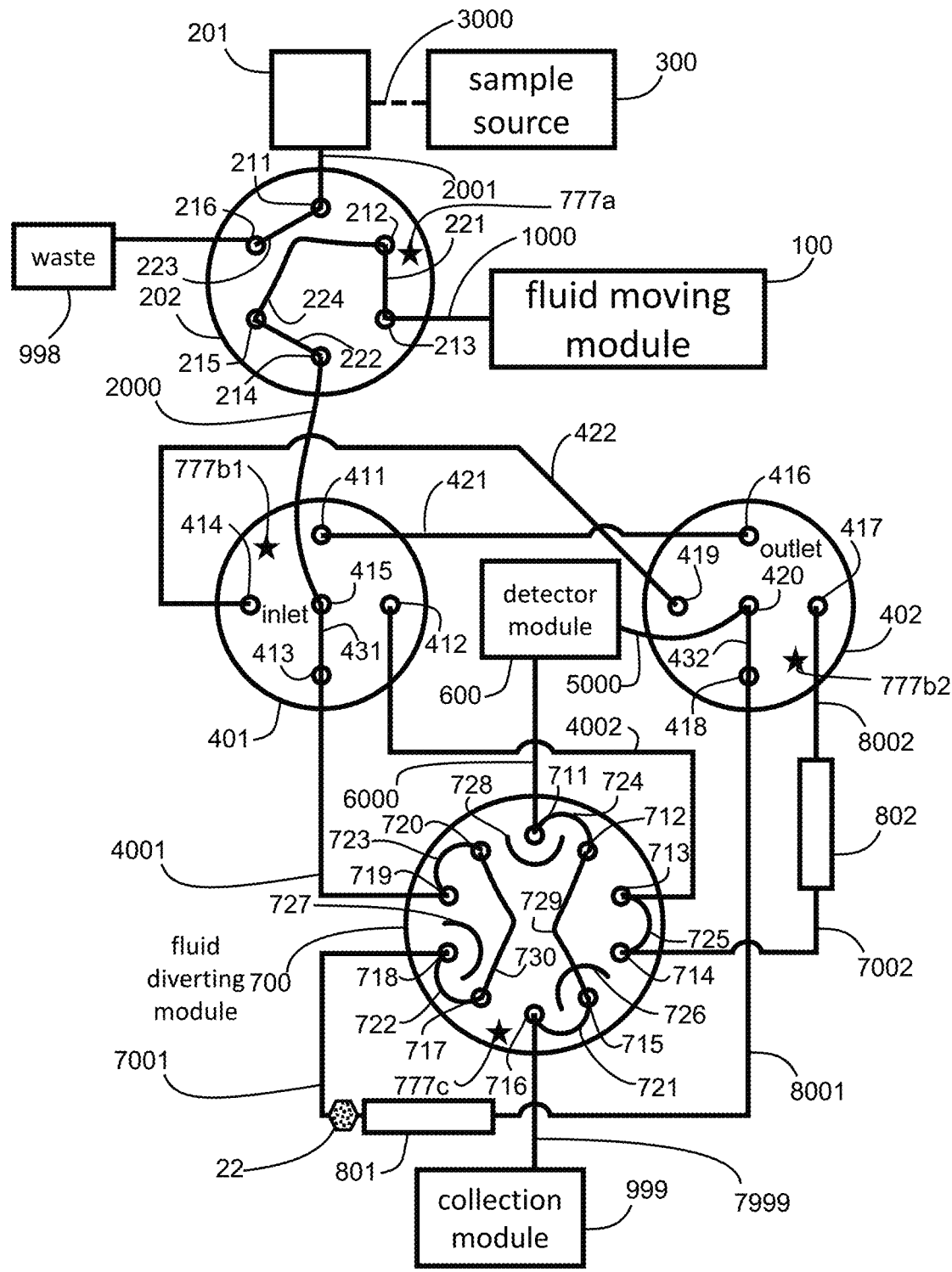
FIG. 19 is a flow diagram of the multidimensional chromatographic assembly of FIG. 1; the fluid diverting module is configured to establish fluid communication between the fluid moving module and the first chromatographic medium via the second fluid holding compartment; the fluid moving module moves the first analyte toward the first chromatographic medium as a separate entity for the second time.

Referring to FIG. 19, a flow diagram of the multidimensional chromatographic assembly of FIG. 1 is shown.

Referring still to FIG. 19, fluid diverting module 700 is moved by 342 degrees clockwise (or 18 degrees counter-clockwise). The positions of all other modules are unchanged from the configuration of FIG. 18.

Referring still to FIG. 19, fluid moving module 100 moves analyte 22 from fluid holding compartment 730 toward chromatographic medium 801.

Figure 20:
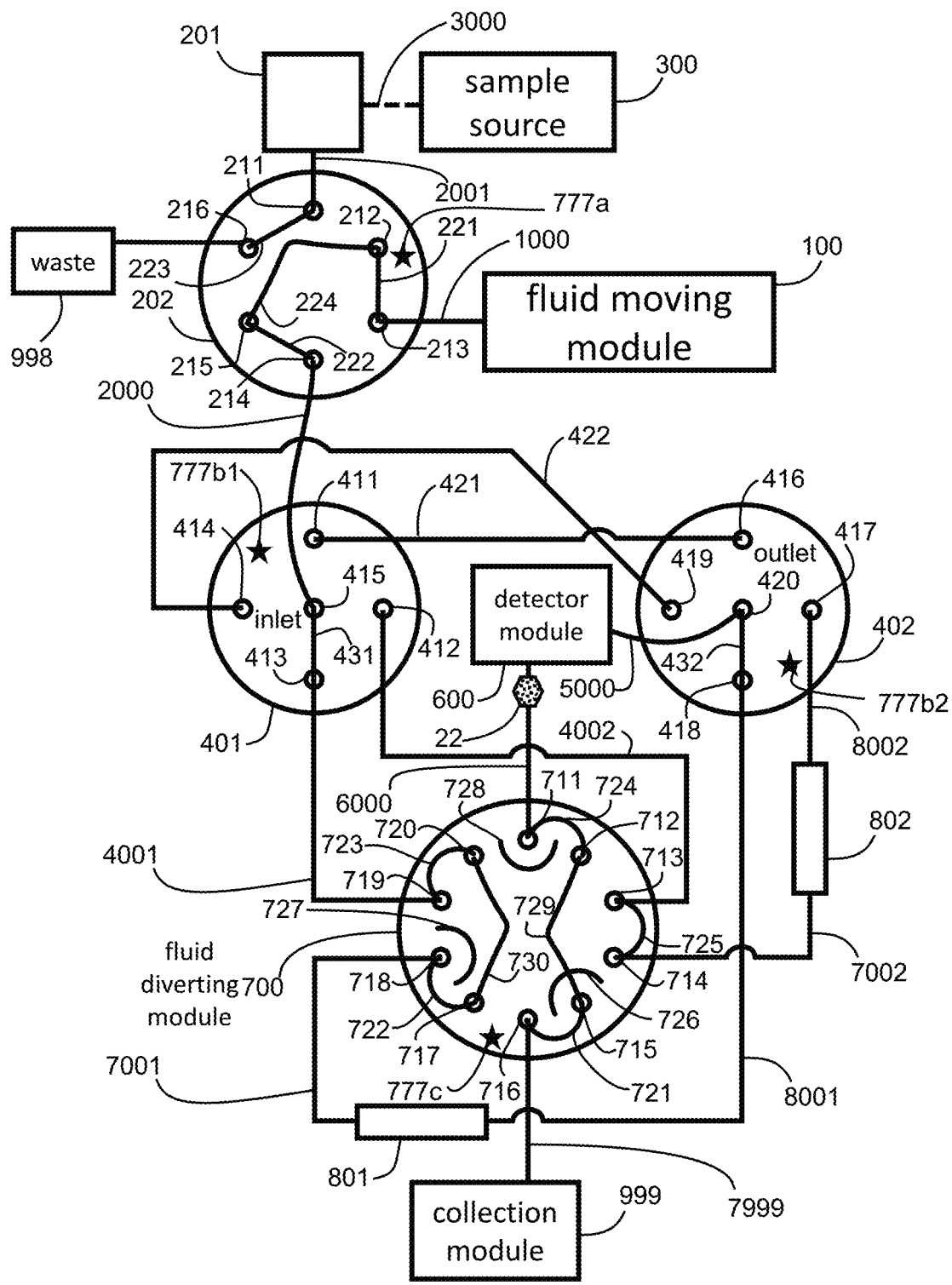
FIG. 20 is a flow diagram of the multidimensional chromatographic assembly of FIG. 1; the first analyte moves through the first chromatographic medium and the detector module; the first analyte is in the flow-path downstream of the detector module and upstream of the fluid diverting module; the first peak of the first dimension chromatogram is registered by the detector module for the third time in the third dimension portion of the multidimension chromatogram

Referring to FIG. 20, a flow diagram of the multidimensional chromatographic assembly of FIG. 1 is shown.

Referring still to FIG. 20, the positions of all modules are unchanged from the configuration of FIG. 19; analyte 22 is in flow-path 6000, which is downstream of detector module 600; analyte 22 is in motion.

Referring still to FIG. 20, response from analytes 22 is registered by detector 600 for the third time. The response gives rise to a chromatographic peak in the third dimension portion of the multidimension chromatogram of the present invention.

Figure 21:
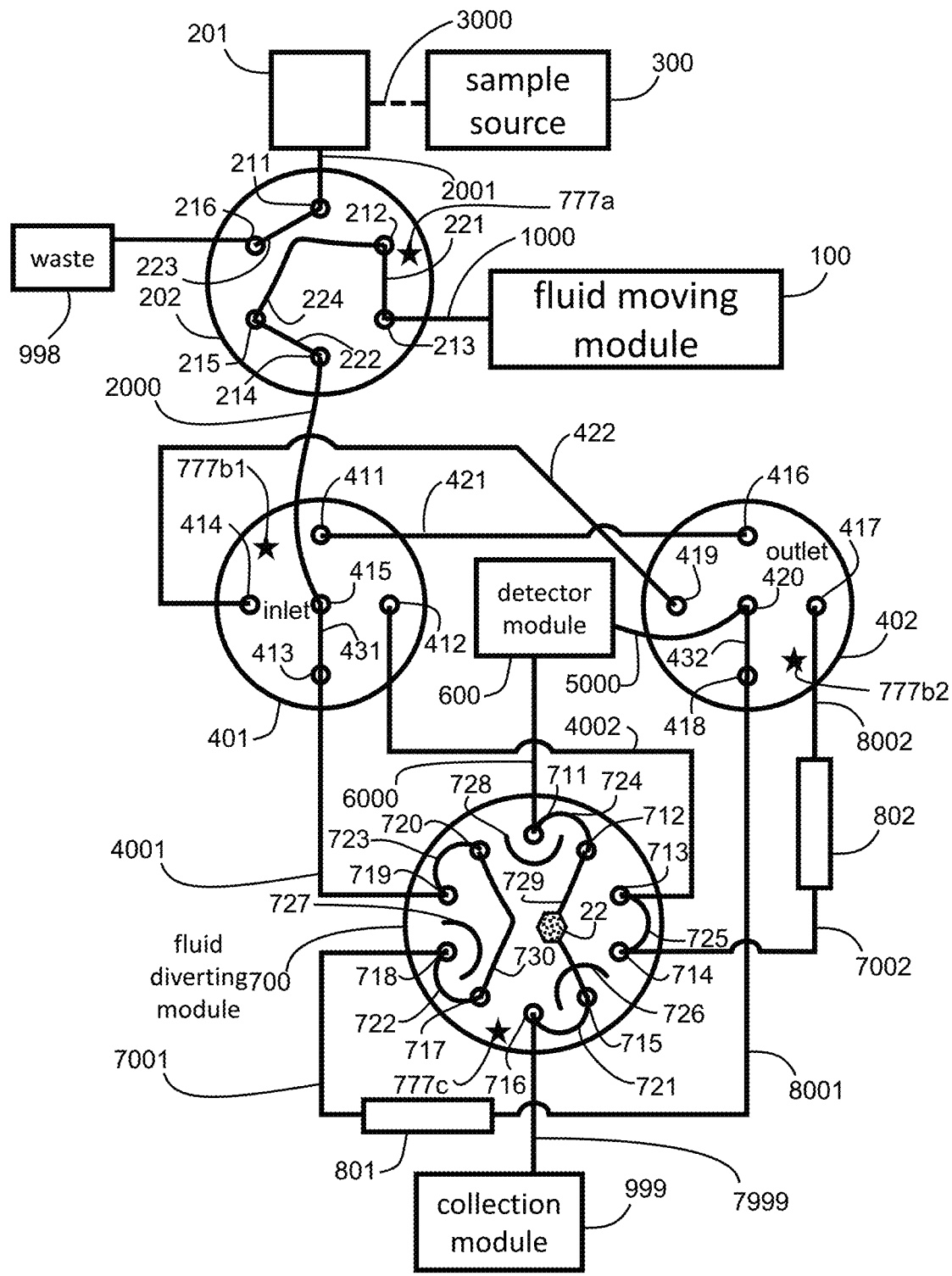
FIG. 21 is a flow diagram of the multidimensional chromatographic assembly of FIG. 1; the first analyte is in the third fluid holding compartment and is in motion.

Referring to FIG. 21, a flow diagram of the multidimensional chromatographic assembly of FIG. 1 is shown.

Referring still to FIG. 21, the positions of all modules are unchanged from the configuration of FIG. 20; analyte 22 is in fluid holding compartment 729 and in motion.

Figure 22:
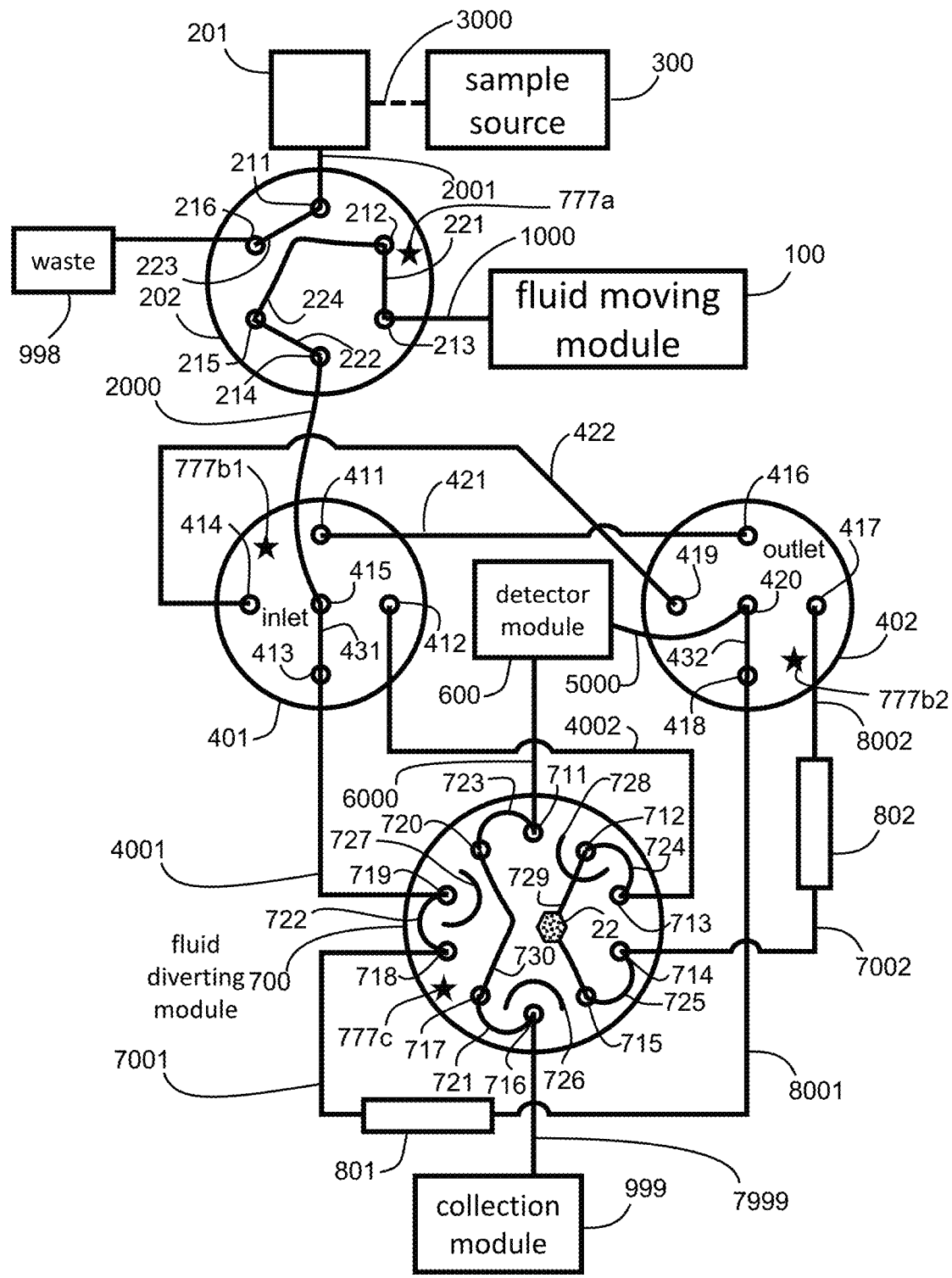
FIG. 22 is a flow diagram of the multidimensional chromatographic assembly of FIG. 1; the fluid diverting module is configured to disengage the first analyte in the third fluid holding compartment from the fluid moving module; the first analyte is stationary in the third fluid holding compartment.

Referring to FIG. 22, a flow diagram of the multidimensional chromatographic assembly of FIG. 1 is shown.

Referring still to FIG. 22, fluid diverting module 700 is moved by 36 degrees clockwise (or 324 degrees counter-clockwise). In this position, fluid moving module 100 is in fluid communication with collection module 999 via fluid holding compartment 730. Fluid moving module 100 is not in fluid communication with fluid holding compartment 729. In other words, analyte 22 is isolated in fluid holding compartment 729 and stationary.

Figure 23:
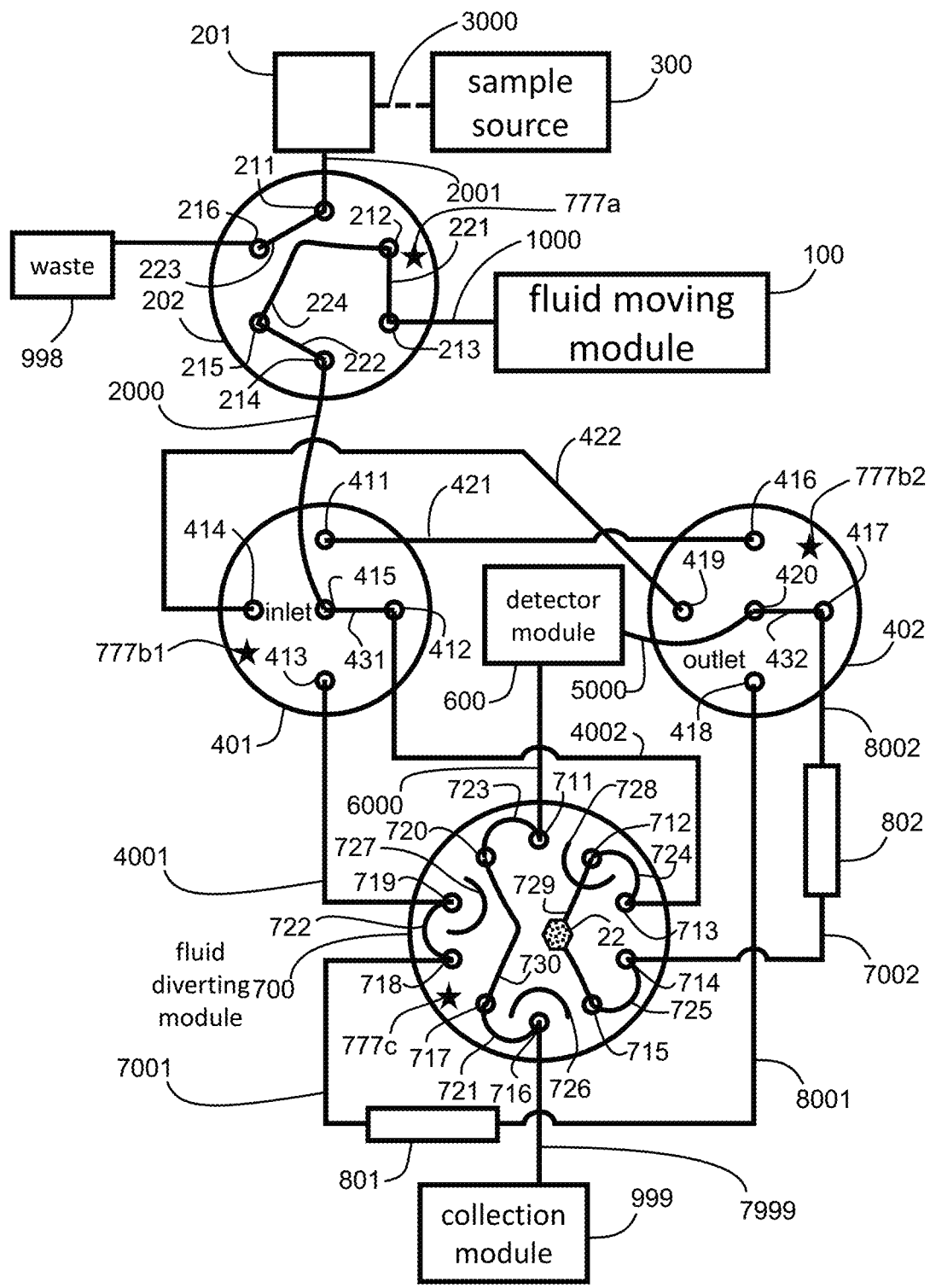
FIG. 23 is a flow diagram of the multidimensional chromatographic assembly of FIG. 1; the chromatographic medium selector module is configured to establish fluid communication between the first analyte and the fluid moving module via the second chromatographic medium.

Referring to FIG. 23, a flow diagram of the multidimensional chromatographic assembly of FIG. 1 is shown.

Referring back to FIG. 1, there are six configurations of the present invention. At the first configuration, a portion of an eluent moves through the first chromatographic medium to the second fluid holding compartment; the third fluid holding compartment is isolated from the fluid moving module. At the second configuration, a portion of an eluent moves through the first chromatographic medium to the third fluid holding compartment; the third fluid holding compartment is isolated from the fluid moving module. At the third configuration, a portion of an eluent moves through the first chromatographic medium to the third fluid holding compartment; the second fluid holding compartment is not isolated from the fluid moving module and experiences the flow of eluent. Similarly, at the fourth configuration, a portion of an eluent moves through the second chromatographic medium to the second fluid holding compartment; the third fluid holding compartment is isolated from the fluid moving module. At the fifth configuration, a portion of an eluent moves through the second chromatographic medium to the third fluid holding compartment; the second fluid holding compartment is isolated from the fluid moving module. Finally, at the sixth configuration, a portion of an eluent moves through the second chromatographic medium to the second fluid holding compartment; the second fluid holding compartment is not isolated from the fluid moving module and experiences the flow of eluent.

Referring still to FIG. 23, inlet module 401 and outlet module 402 are moved to establish fluid communication between fluid moving module 100 and chromatographic medium 802 via fluid holding compartment 729. In other words, fluid moving module 100 moves analyte 22 toward chromatographic medium 802. In some configuration, configuring inlet module 401 and outlet module 402 for the above-mentioned fluid communications means rotating both inlet module 401 and outlet module 402 clockwise 270 degrees (or counter-clockwise 90 degrees) from their previous positions so that flow-paths 431 and 432 establish fluid communication between ports 415 and 420 via ports 412 and 417, respectively. The positions of all other modules are unchanged from the configuration of FIG. 22.

Referring still to FIG. 23, in this configuration, fluid moving module 100 moves eluent(s) from chromatographic medium 802 to fluid holding compartment 729. Fluid moving module 100 is in fluid communication with fluid holding compartment 730. This is the sixth configuration of the multidimensional chromatographic assembly.

Figure 24:
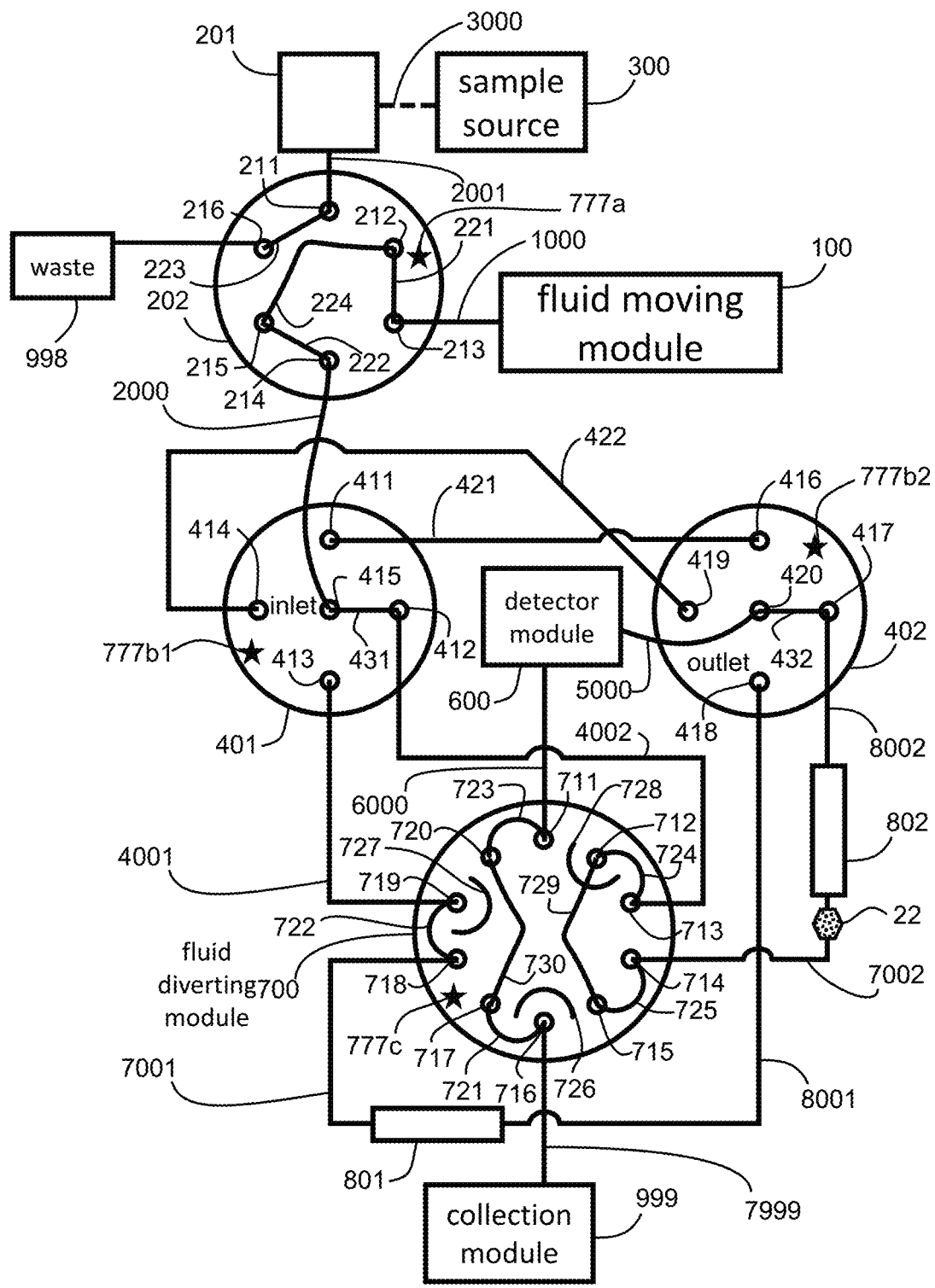
FIG. 24 is a flow diagram of the multidimensional chromatographic assembly of FIG. 1; the fluid moving module moves the first analyte from the third fluid holding compartment toward the second chromatographic medium for the first time.

Referring to FIG. 24, a flow diagram of the multidimensional chromatographic assembly of FIG. 1 is shown.

Referring still to FIG. 24, fluid moving module 100 moves analyte 22 from fluid holding compartment 729 toward the chromatographic medium 802. Analyte 22 is in flow-path 7002 and in motion. The positions of all modules are unchanged from the configuration of FIG. 23.

Figure 25:
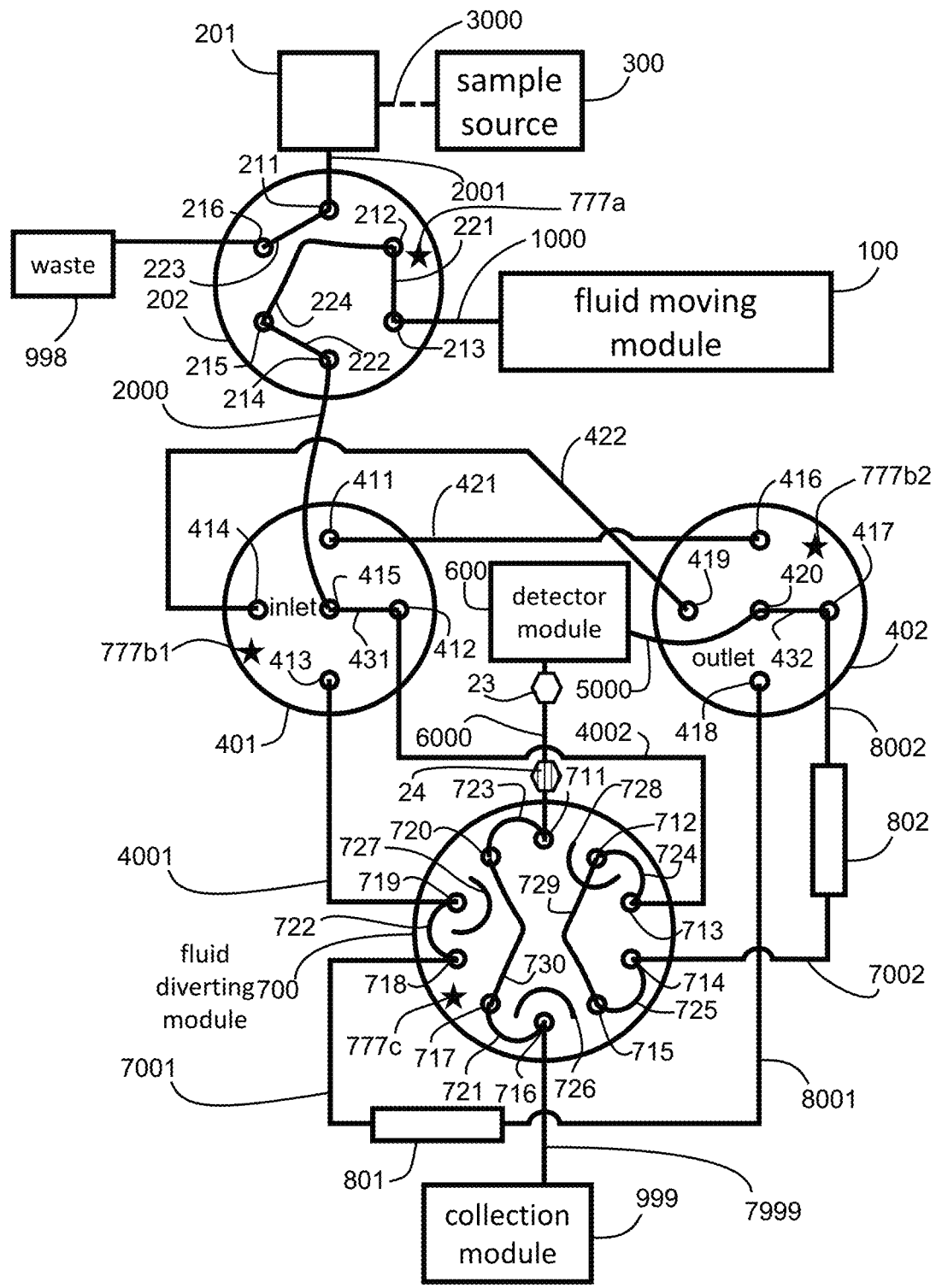
FIG. 25 is a flow diagram of the multidimensional chromatographic assembly of FIG. 1; the first analyte is separated into two new fluidic segments. These segments are termed as the third and the fourth analytes hereon; the third and the fourth analytes are in the flow-path downstream of the detector module and upstream of the fluid diverting module; the fourth analyte, which is represented by a clear hexagon, is behind the third analyte, which is represented by a striped hexagon; the third and the fourth analytes are registered by the detector module in the fourth dimension portion of the multidimension chromatogram.

Referring to FIG. 25, a flow diagram of the multidimensional chromatographic assembly of FIG. 1 is shown.

Referring still to FIG. 25, analyte 22, which is comprised of two fluidic segments (23 and 24), is separated by chromatographic medium 802. Segments 23 and 24 are referred to as analyte 23 and analyte 24, which are shown as clear and striped hexagons, respectively. The positions of all modules are unchanged from the configuration of FIG. 24.

Referring still to FIG. 25, analyte 24 is downstream of analyte 23. Responses from analytes 23 and 24 are registered by detector module 600. The responses give rise to separate chromatographic peaks. Analyte 24 is registered first by detector module 600. The corresponding chromatographic peak is registered as the first peak in the fourth dimension portion of the multidimension chromatogram of the present invention. Analyte 23 is registered as the second peak in the fourth dimension portion of the multidimension chromatogram of the present invention.

Referring still to FIG. 25, in some instances, analyte 24 or 23 or both move to fluid holding compartment 730 post-chromatography.

Figure 26:
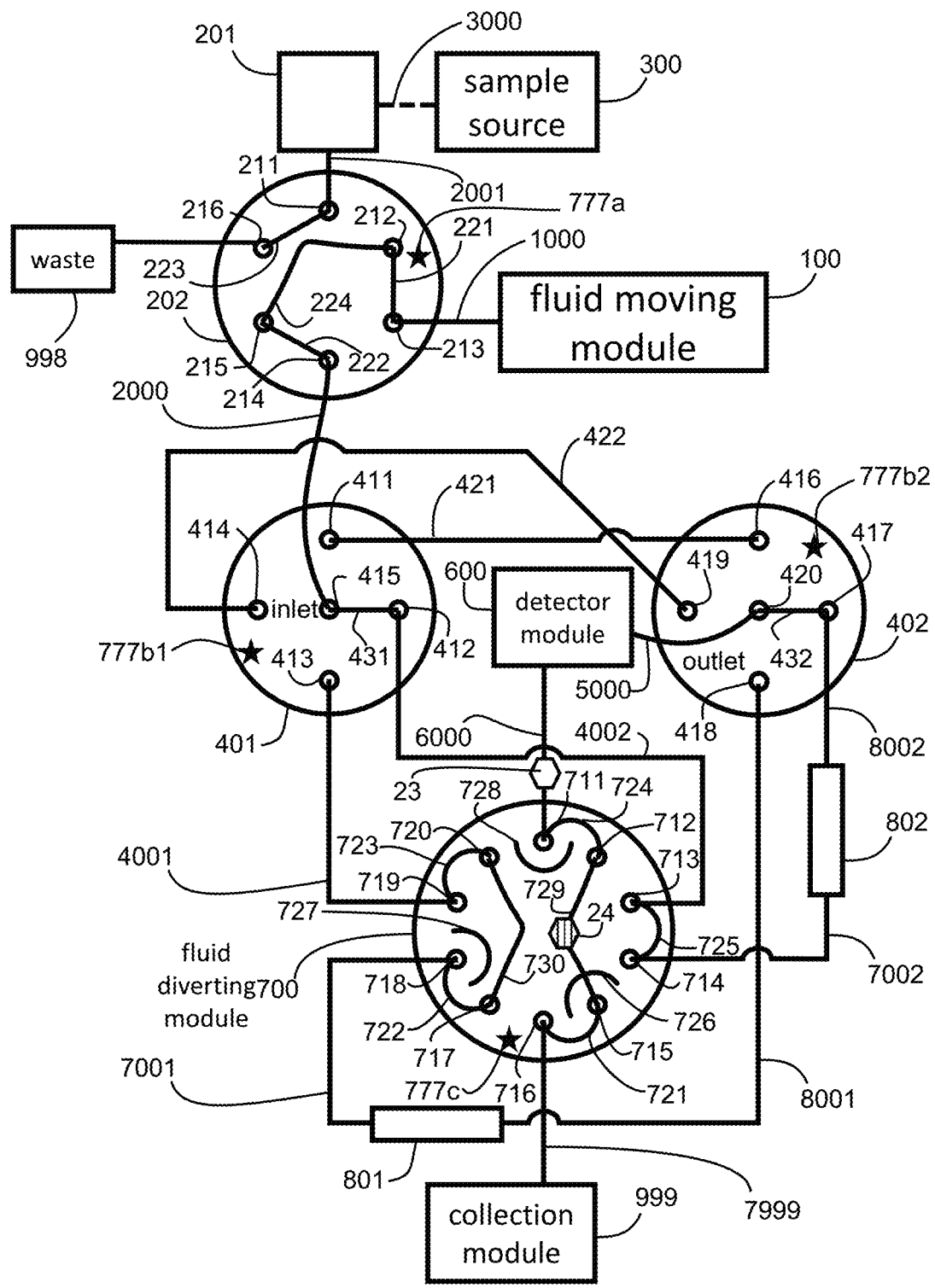
FIG. 26 is a flow diagram of the multidimensional chromatographic assembly of FIG. 1; the fourth analyte is in the flow-path downstream of the detector module and upstream of the fluid diverting module; the third analyte is in the third fluid holding compartment and is in motion.

Referring to FIG. 26, a flow diagram of the multidimensional chromatographic assembly of FIG. 1 is shown.

Referring still to FIG. 26, fluid diverting module 700 is moved by 324 degrees clockwise (or 36 degrees counter-clockwise). The positions of all other modules are unchanged from the configuration of FIG. 25. In this configuration, analyte 24 is in fluid holding compartment 729 and analyte 23 is yet to enter fluid diverting module 700 (specifically, in flow-path 6000). Both analytes are in motion.

Referring still to FIG. 26, in this configuration, fluid moving module 100 moves eluent(s) from chromatographic medium 802 to fluid holding compartment 729. There is no fluid communication between fluid moving module 100 and fluid holding compartment 730. This is the fifth configuration of the multidimensional chromatographic assembly.

Figure 27:
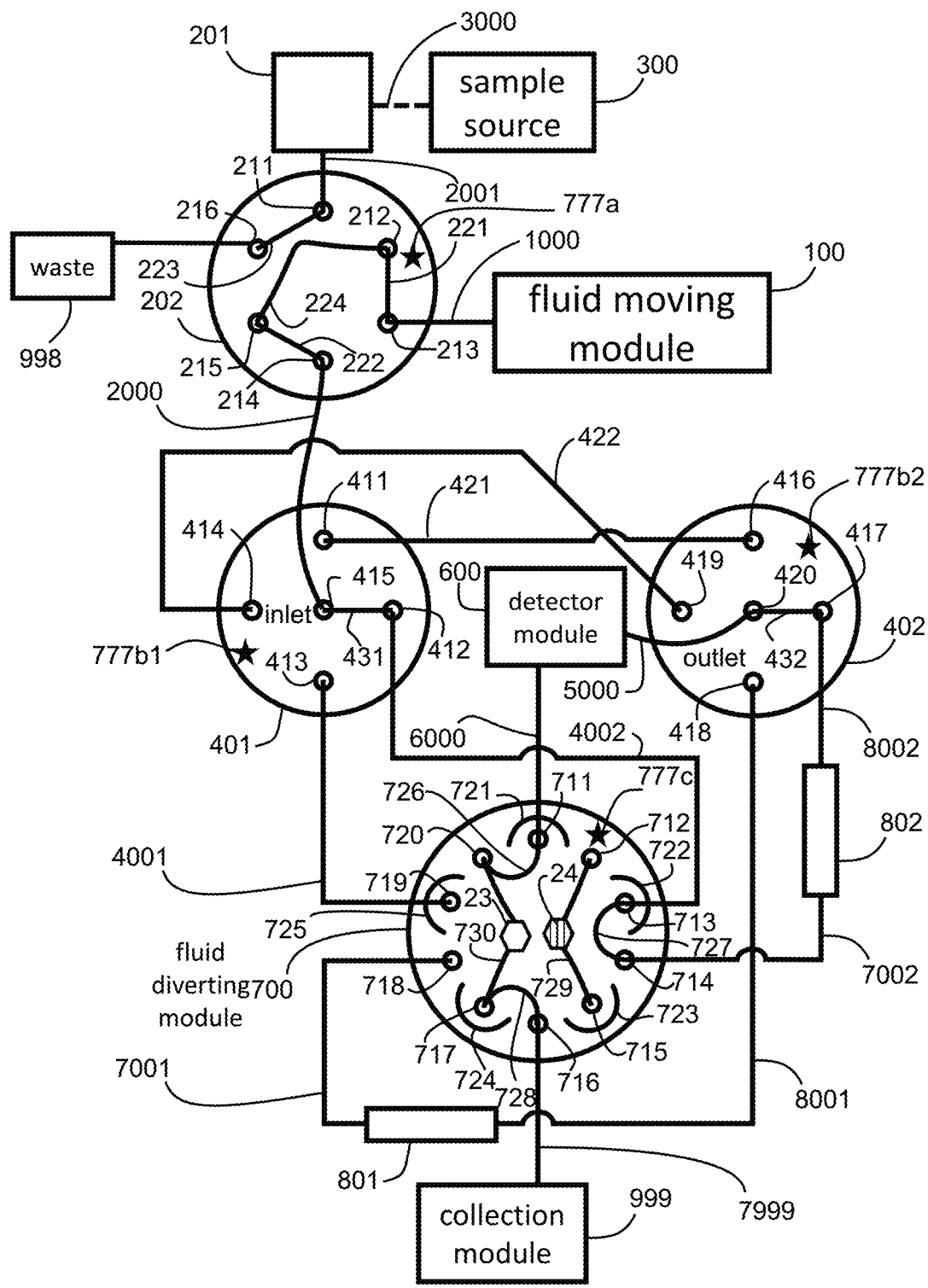
FIG. 27 is a flow diagram of the multidimensional chromatographic assembly of FIG. 1; the fluid diverting module is configured to disengage fluid communication between the third fluid holding compartment and the fluid moving module; the third analyte is isolated in the third fluid holding compartment and is stationary; the fourth analyte, which is in the second fluid holding compartment, is in fluid communication with the fluid moving module via the second chromatographic medium and is in motion.

Referring to FIG. 27, a flow diagram of the multidimensional chromatographic assembly of FIG. 1 is shown.

Referring still to FIG. 27, fluid diverting module 700 is moved by 198 degrees clockwise (or 162 degrees counter-clockwise). The positions of all other modules are unchanged from FIG. 26. Analyte 23 is in fluid holding compartment 730 and in motion. Analyte 24 is isolated in fluid holding compartment 729 and stationary.

Referring still to FIG. 27, in this configuration, fluid moving module 100 moves eluent(s) from chromatographic medium 802 to fluid holding compartment 730. There is no fluid communication between fluid moving module 100 and fluid holding compartment 729. This is the fourth configuration of the multidimensional chromatographic assembly.

Figure 28:
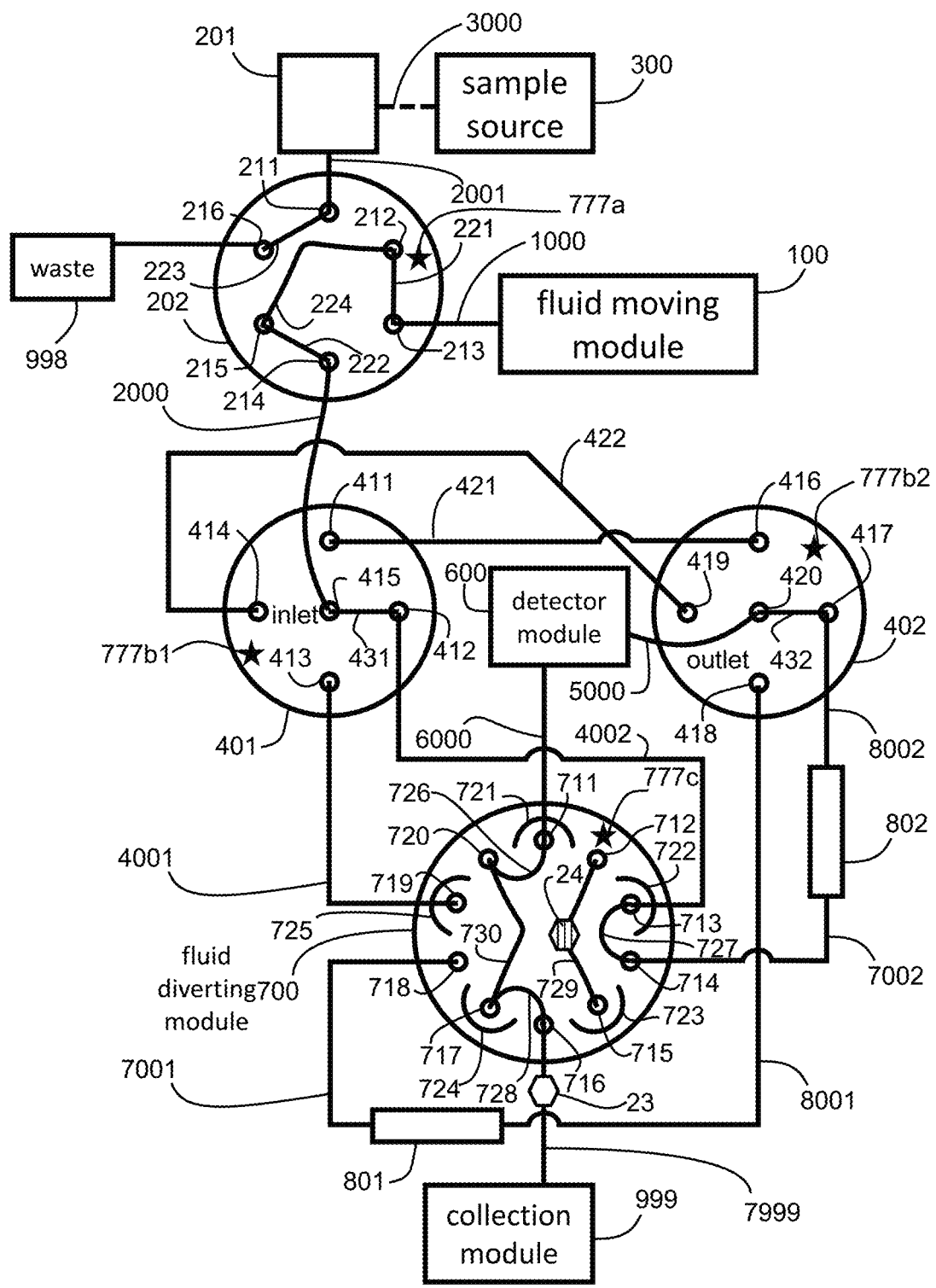
FIG. 28 is a flow diagram of the multidimensional chromatographic assembly of FIG. 1; the fourth analyte exits the present invention via the collection module.

Referring to FIG. 28, a flow diagram of the multidimensional chromatographic assembly of FIG. 1 is shown.

Referring still to FIG. 28, the positions of all modules are unchanged in this configuration. Fluid moving module 100 moves analyte 23 to collection assembly 999. Analyte 23 exits the present invention via collection module 999.

Referring still to FIG. 28, analyte 24 remains stationary in fluid holding compartment 729.

Figure 29:
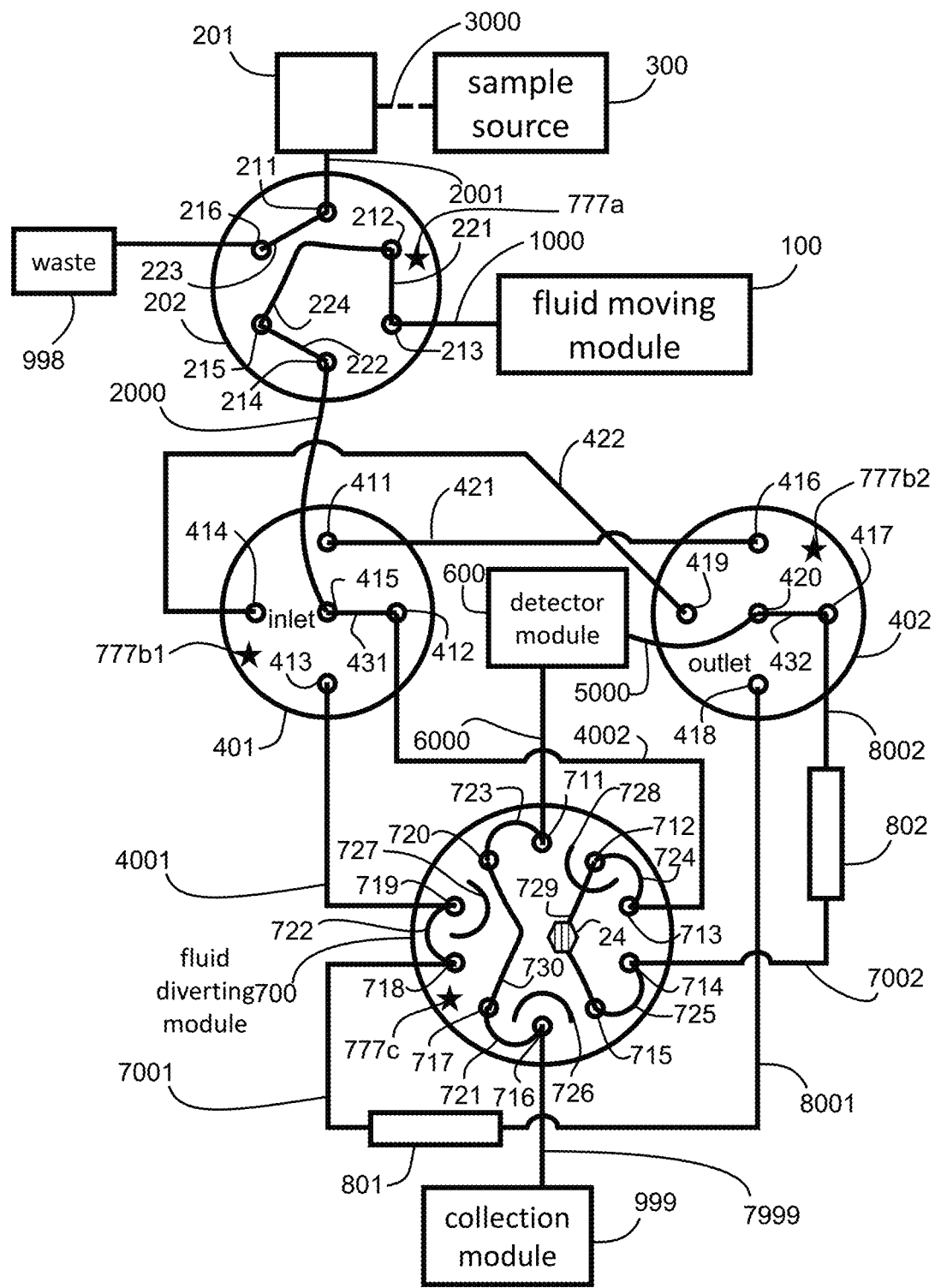
FIG. 29 is a flow diagram of the multidimensional chromatographic assembly of FIG. 1; the fluid diverting module is configured to establish fluid communication between the fluid moving module and the third fluid holding compartment.

Referring to FIG. 29, a flow diagram of the multidimensional chromatographic assembly of FIG. 1 is shown.

Referring still to FIG. 29, fluid diverting module 700 is moved by 198 degrees clockwise (or 162 degrees counterclockwise). The positions of all other modules are unchanged in this configuration. In this configuration, fluid moving module 100 is in fluid communication with detector module 600 via fluid holding compartments 729.

Referring still to FIG. 29, the multidimensional chromatographic assembly is in the sixth configuration.

Figure 30:
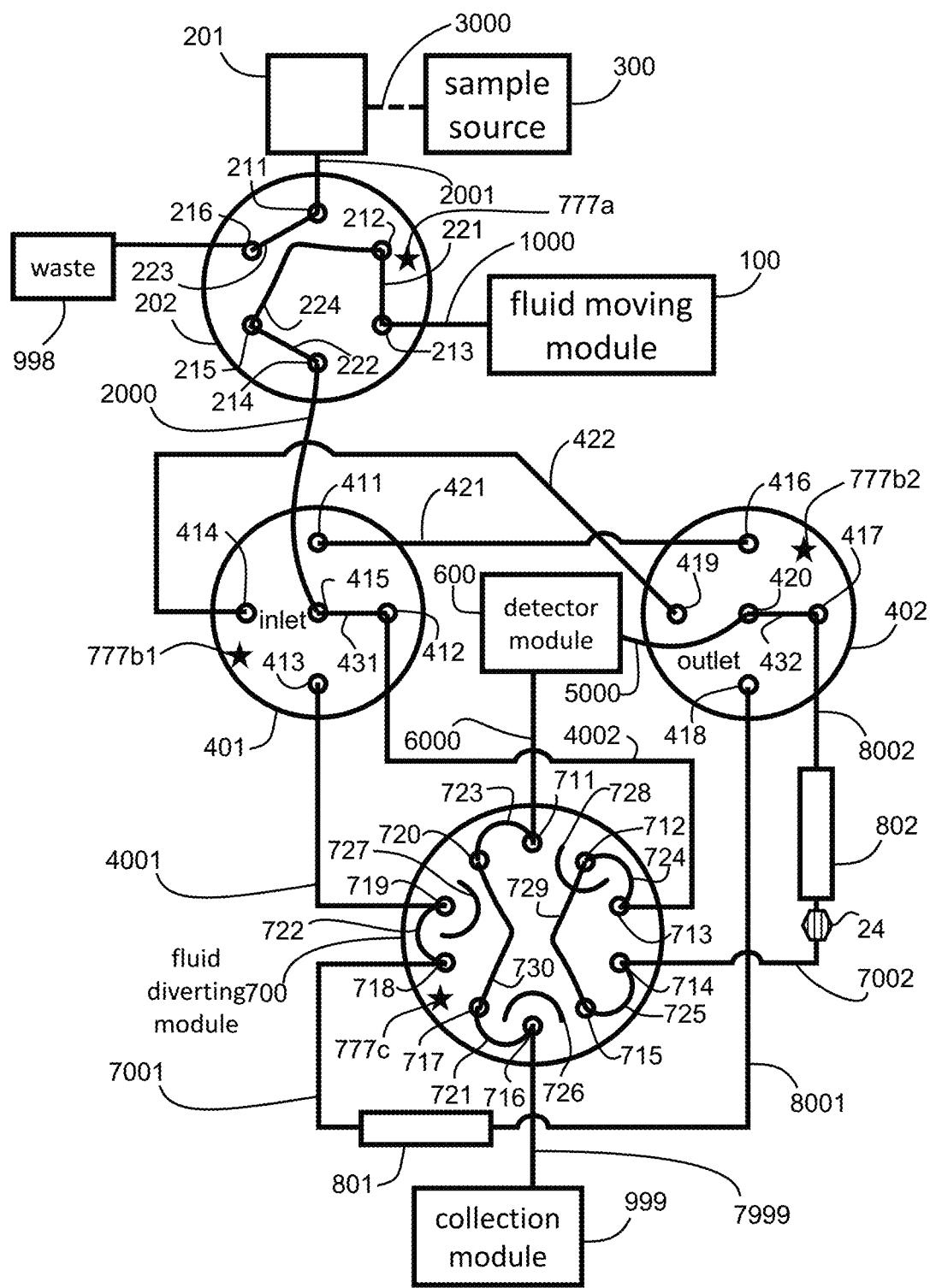
FIG. 30 is a flow diagram of the multidimensional chromatographic assembly of FIG. 1; the fluid moving module moves the third analyte from the third fluid holding compartment toward the second chromatographic medium for the first time as a separate entity.

Referring to FIG. 30, a flow diagram of the multidimensional chromatographic assembly of FIG. 1 is shown.

Referring still to FIG. 30, the positions of all modules are unchanged in this configuration. Fluid moving module 100 moves analyte 24 toward chromatographic medium 802 for the first time. Analyte 24 is in flow-path 7002.

Figure 31:
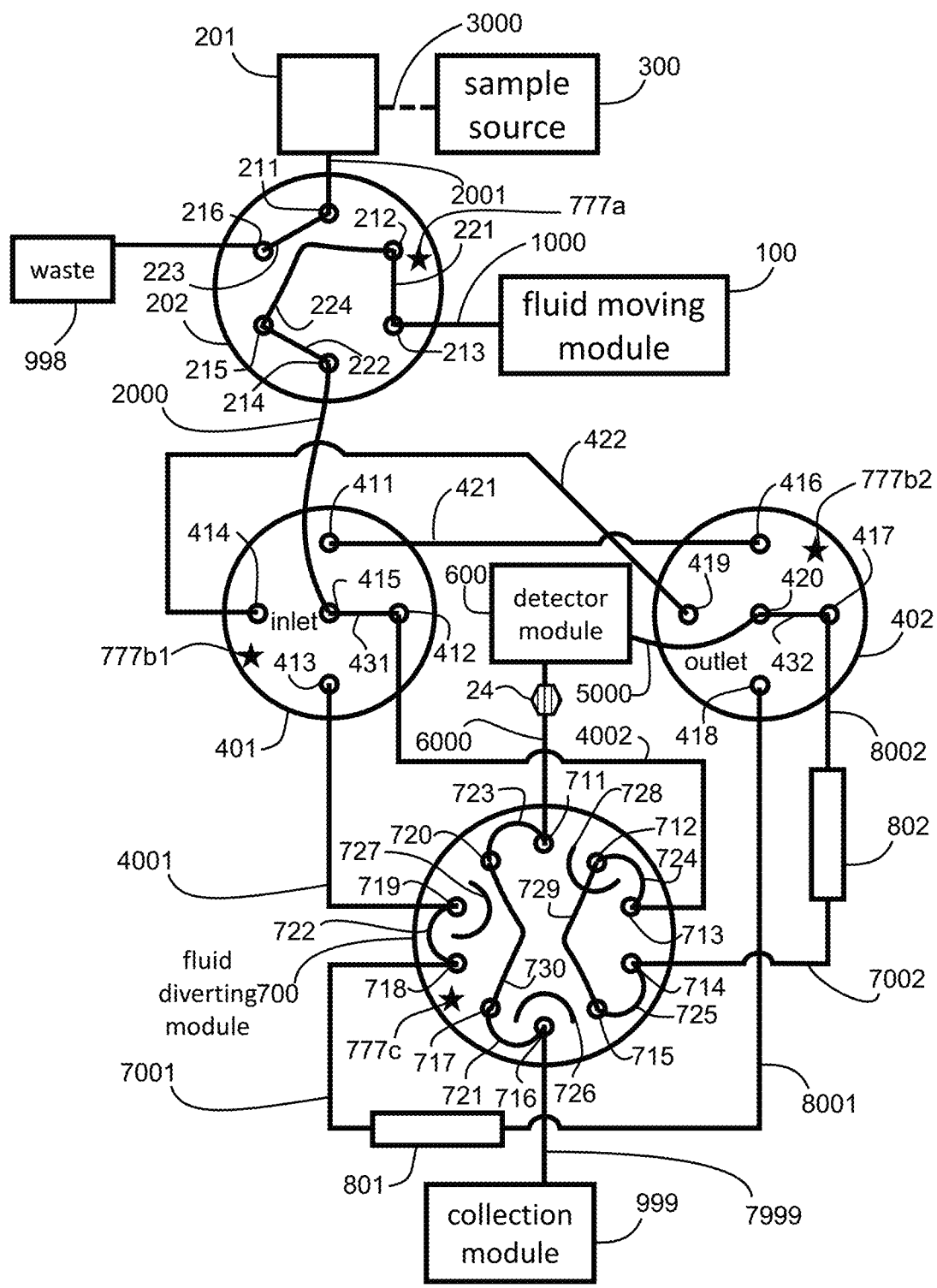
FIG. 31 is a flow diagram of the multidimensional chromatographic assembly of FIG. 1; the third analyte is in the flow-path downstream of the detector module and upstream of the fluid diverting module; the third analyte is registered by the detector assembly in the fifth dimension portion of the multidimension chromatogram.

Referring to FIG. 31, a flow diagram of the multidimensional chromatographic assembly of FIG. 1 is shown.

Referring still to FIG. 31, the positions of all modules are unchanged in this configuration. Fluid moving module 100 moves analyte 24 through chromatographic medium 802 and detector module 600. Analyte 24 is in flow-path 6000, which is downstream of detector module 600.

Referring still to FIG. 31, response from analytes 24 is registered by detector module 600 for the first time as a separate entity. The response gives rise to a chromatographic peak in the fifth dimension portion of the multidimension chromatogram of the present invention.

Figure 32:
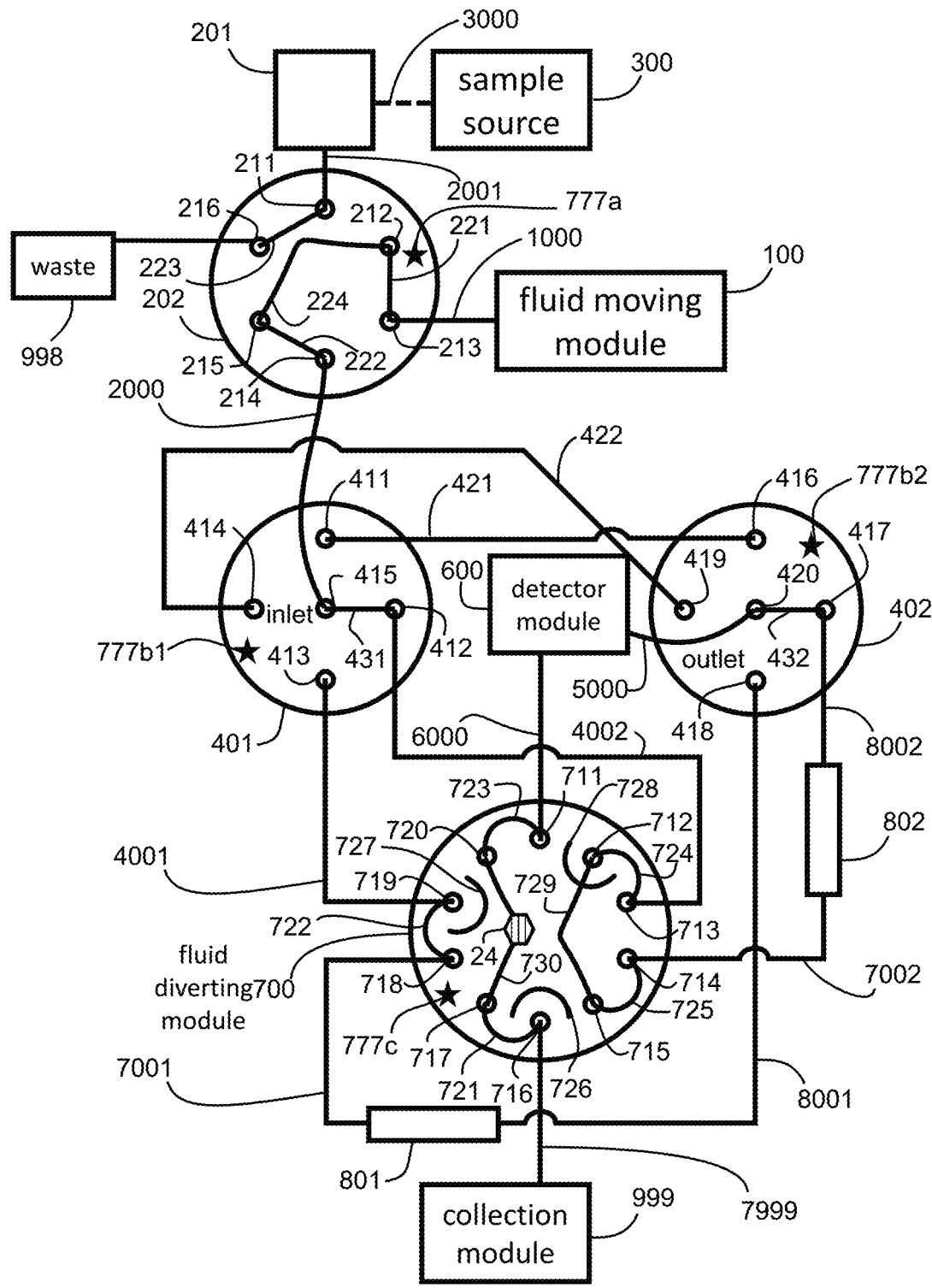
FIG. 32 is a flow diagram of the multidimensional chromatographic assembly of FIG. 1; the third analyte is in the second fluid holding compartment.

Referring to FIG. 32, a flow diagram of the multidimensional chromatographic assembly of FIG. 1 is shown.

Referring still to FIG. 32, analyte 24 is in fluid holding compartment 730 for the first time and is in motion.

Referring still to FIG. 32, in some instances, analyte 24 moves past fluid holding compartment 730 and exits the present invention.

Figure 33:
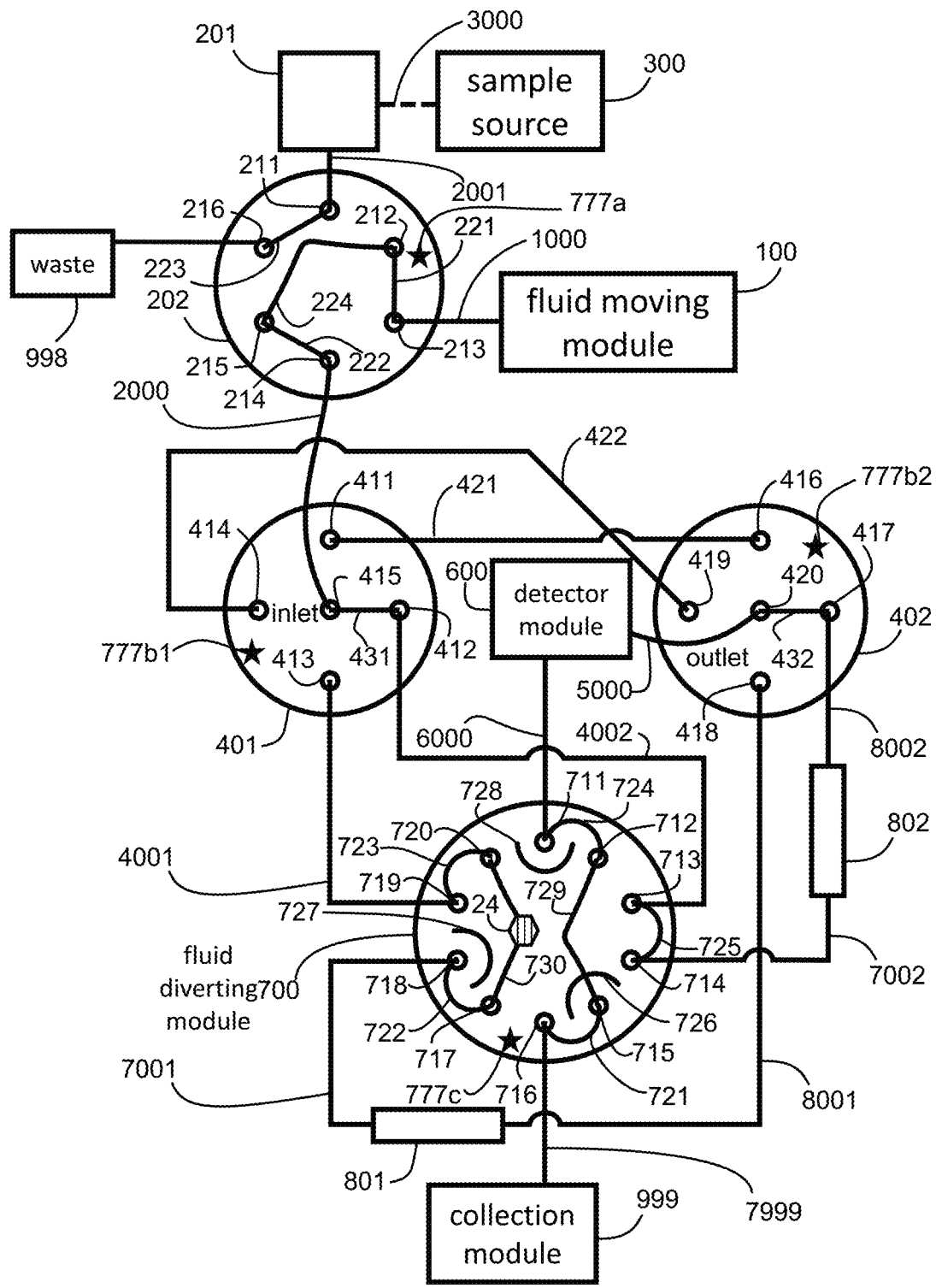
FIG. 33 is a flow diagram of the multidimensional chromatographic assembly of FIG. 1; The fluid diverting module is configured to establish fluid communication between the fluid moving module and the third analyte, which is in the second fluid holding compartment and stationary.

Referring to FIG. 33, a flow diagram of the multidimensional chromatographic assembly of FIG. 1 is shown.

Referring still to FIG. 33, fluid diverting module 700 is moved by 326 degrees clockwise (or 36 degrees counterclockwise). The positions of all other modules are unchanged in this configuration.

Referring still to FIG. 33, analyte 24 is stationary in fluid holding compartment 730, which does not have fluid communication with fluid moving module 100.

Figure 34:
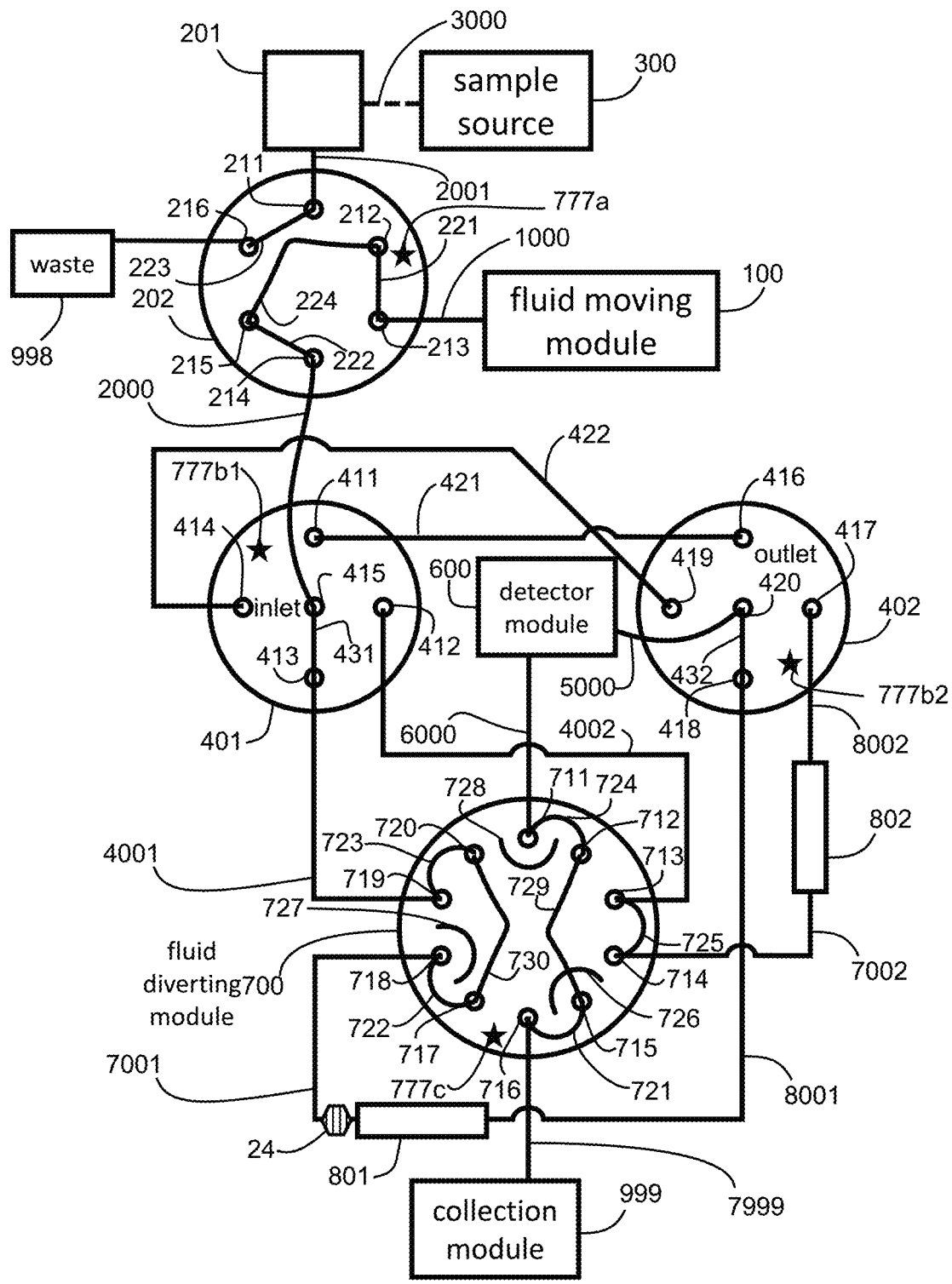
FIG. 34 is a flow diagram of the multidimensional chromatographic assembly of FIG. 1; the chromatographic medium selector module is configured to establish fluid communication between the fluid moving module and the second fluid holding compartment; the fluid moving module moves the third analyte from the second fluid holding compartment toward the first chromatographic medium for the first time as a separate entity.

Referring to FIG. 34, a flow diagram of the multidimensional chromatographic assembly of FIG. 1 is shown.

Referring still to FIG. 34, inlet module 401 and outlet module 402 are moved to establish fluid communication between fluid moving module 100 and chromatographic medium 801 via fluid holding compartment 730. In other words, fluid moving module 100 moves analyte 24, which was in fluid holding compartment 730, toward chromatographic medium 801. The present invention is at the third configuration. In some representation, configuring inlet module 401 and outlet module 402 for the above-mentioned fluid communications means rotating both inlet module 401 and outlet module 402 clockwise 90 degrees (or counterclockwise 270 degrees) from their previous positions so that configurable flow-paths 431 and 432 establish fluid communication between ports 415 and 420 via ports 413 and 418, respectively.

Figure 35:
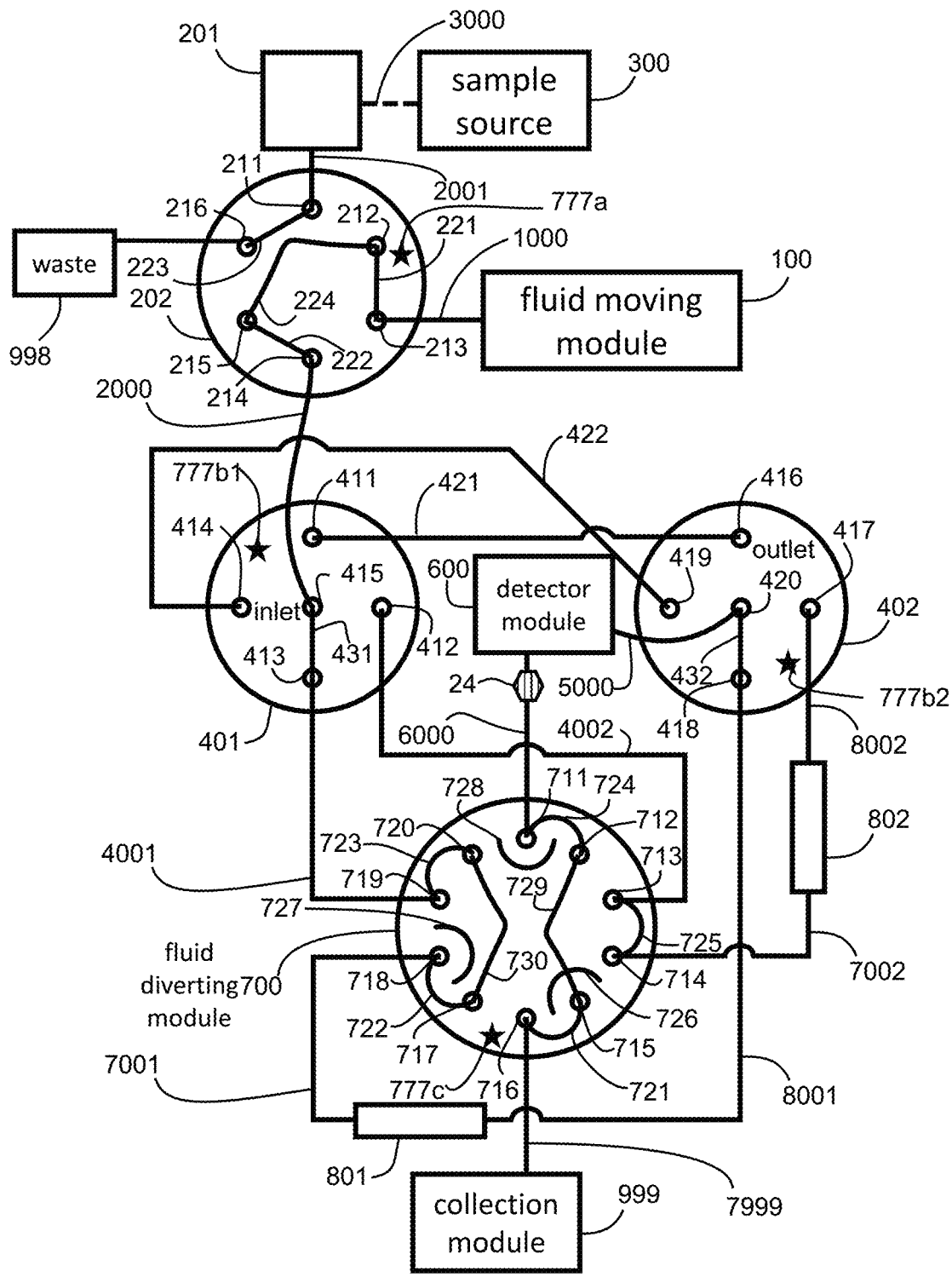
FIG. 35 is a flow diagram of the multidimensional chromatographic assembly of FIG. 1; the third analyte is in the flow-path downstream of the detector module and upstream of the fluid diverting module; the third analyte is registered by the detector module in the sixth dimension portion of the multidimension chromatogram.

Referring to FIG. 35, a flow diagram of the multidimensional chromatographic assembly of FIG. 1 is shown.

Referring still to FIG. 35, the positions of all modules are unchanged in this configuration. Analyte 24 is moved through chromatographic medium 801 for the first time. Analyte 24 is in flow-path 6000, which is downstream of detector module 600.

Referring still to FIG. 35, response from analyte 24 is registered by detector module 600 for the second time. The response gives rise to a chromatographic peak in the sixth dimension portion of the multidimension chromatogram of the present invention.

Figure 36:
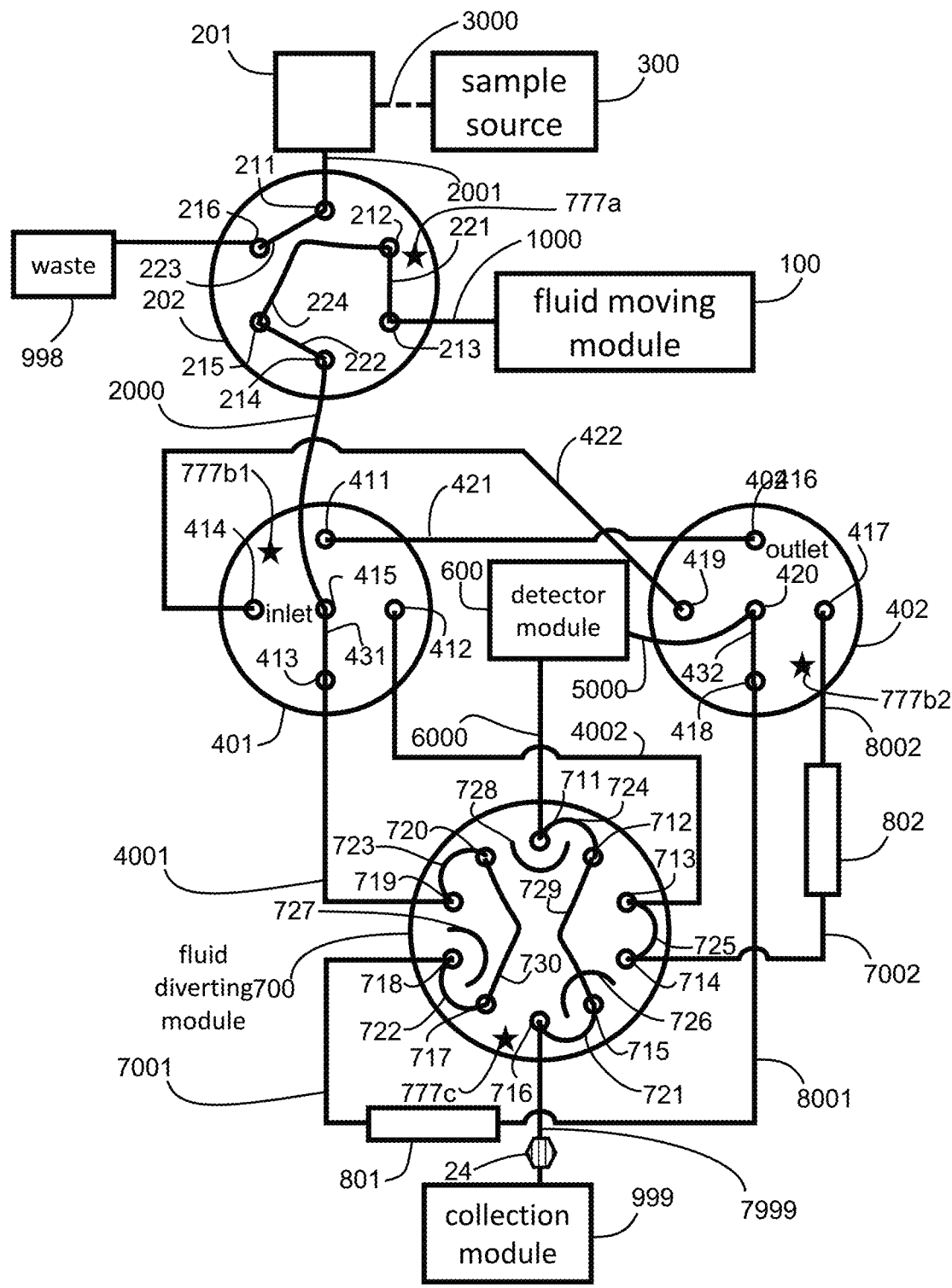
FIG. 36 is a flow diagram of the multidimensional chromatographic assembly of FIG. 1; the fluid moving module moves the third analyte to the collection module via the third fluid holding compartment; the third analyte exits the present invention.

Referring to FIG. 36, a flow diagram of the multidimensional chromatographic assembly of FIG. 1 is shown.

Referring still to FIG. 36, analyte 24 exits the present invention via fluid holding compartment 729.

Figure 37:
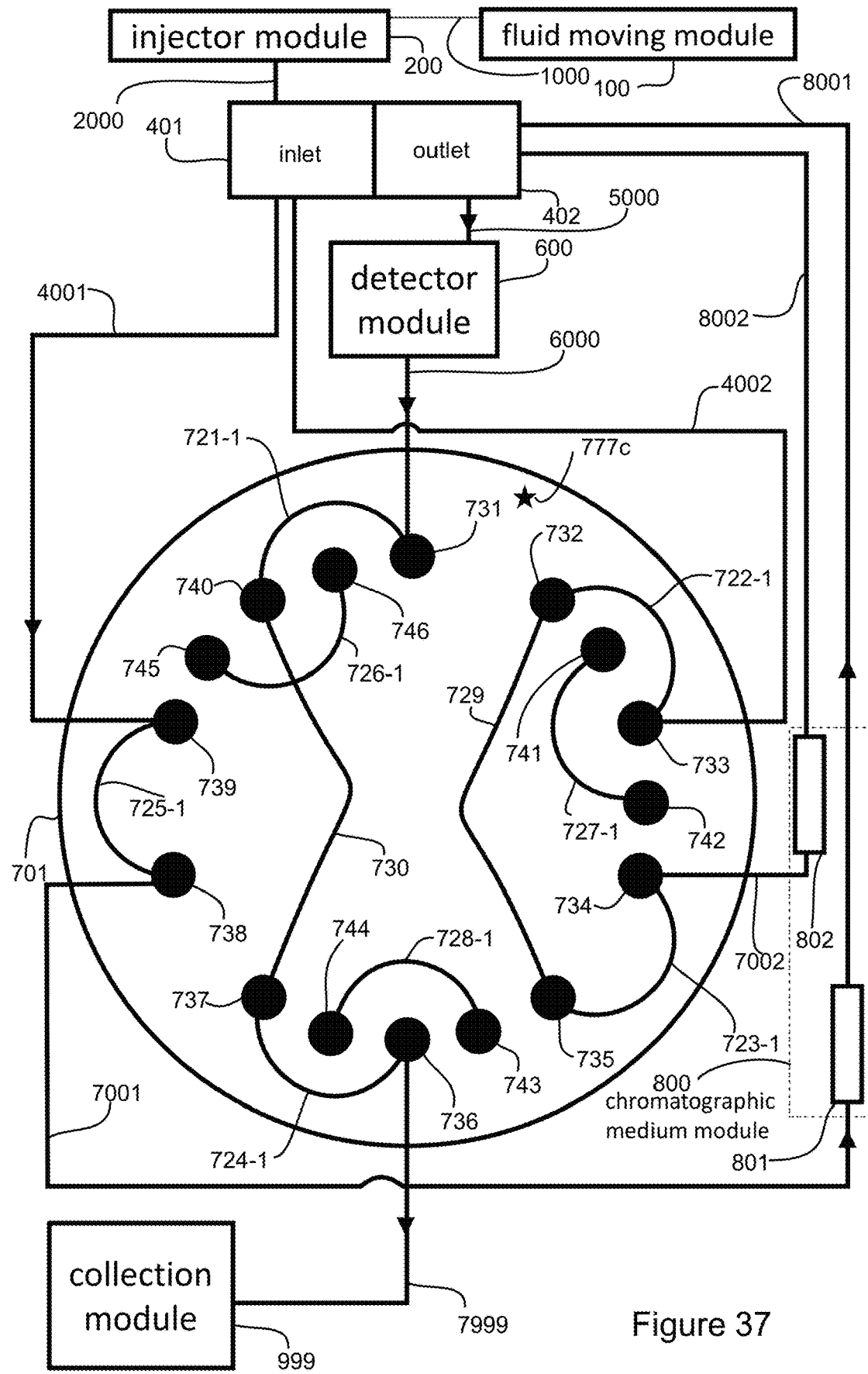
FIG. 37 is a flow diagram of a multidimensional chromatographic assembly that includes a fluid diverting module wherein the geometric dimension of the movable flow-path on the rotor is not uniform; all movable flow-paths have two distinct parts: two termini and a connecting coplanar groove; the geometric dimensions of the termini are larger than that of the connecting groove.

Referring to FIG. 37, a flow diagram of a multidimensional chromatographic assembly that includes a fluid diverting module (701) wherein both termini of movable flow-paths have footprints larger than that the groove connecting them. It is important to note that, during the movement of the rotor, both termini completely disengage from the ports of the stator. When the termini re-establish fluid communication with the same or another set of ports, the overlap of the footprints between a terminus and a port is critical for fluid communication. Larger footprint of the terminus increases tolerance in rotational inaccuracy during the configurational movement of the rotor.

Referring still to FIG. 37, the entire portion of the groove and both termini of any movable flow-path are located on the interfacial plane where the rotor meets the stator. Termini of movable flow-paths are shown as solid black circles. Ports of the stator are under termini 731, 732, 733, 734, 735, 736, 737, 738, 739, and 740 and not visible. Also, termini 741, 742, 743, 744, 745, and 746 are not aligned with any port in the shown position.

Referring back to FIG. 5, all eight movable flow-paths on the rotor (721, 722, 723, 724, 725, 726, 727 728) are uniformly wide throughout. Ports under flow-paths 721, 722, 723, 724, and 725 are shown as clear circles. The footprint of a terminus of a flow-path is same as that of the port it is overlapping with. The alignment of the port with the terminus relies on exact degree of rotation of fluid diverting module 700.

Referring to FIGS. 5 and 37, ports 711 and 720 are connected by flow-path 721 in FIG. 5 and the same ports are connected by terminus 740, groove 721-1, and terminus 731 in FIG. 37. The footprint of termini 740 and 731 is larger than ports 711 and 720, which is why they are not visible in FIG. 37.

Referring to still FIGS. 5 and 37, ports 712 and 713 are connected by flow-path 722 in FIG. 5. The same ports are connected by terminus 732, groove 722-1, and terminus 733 in FIG. 37. Similarly, ports 714 and 715 are connected by terminus 734, groove 723-1, and terminus 735 in FIG. 37, and so on.

Referring back to FIG. 37, the footprint of terminus 731 is large so that the requirement for rotational accuracy to establish necessary fluid communications between port 711 and terminus 731 in FIG. 37 is less. It is important to note that the circular disposition of the contacting footprints (for example, terminus 731 and port 711, which is right underneath and not visible in FIG. 37) are for the demonstration purposes only and do not specifically limit a set of claimed geometric dispositions for the invention. In some representation, the footprint of the port or the termini has geometric shapes other than circles. Similarly, in some representation, the footprint of the port is larger than that of the contacting terminus.

Figure 38:
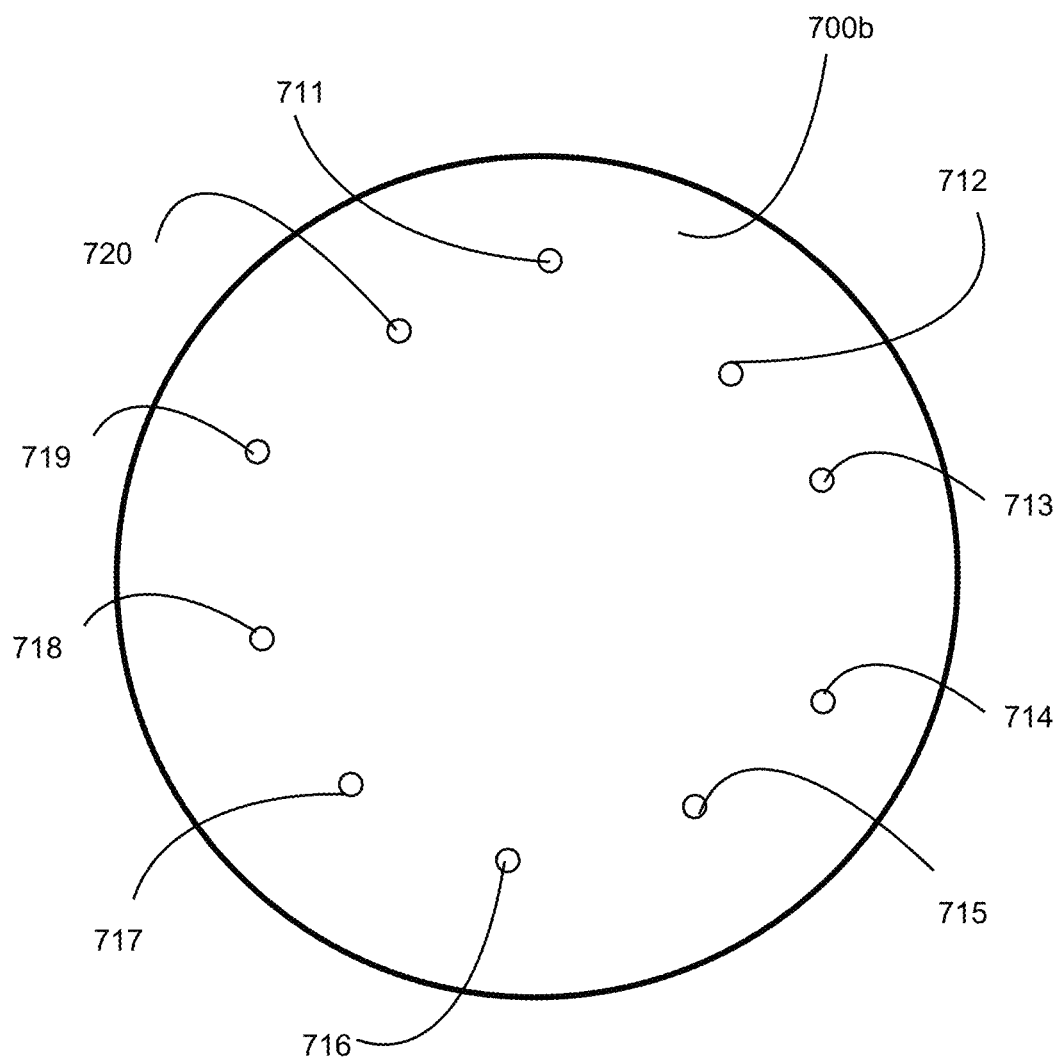
FIG. 38 is a bottom-up view of the stationary portion (the stator) of a fluid diverting module of the multidimensional chromatographic assembly of FIG. 1.
Figure 39:
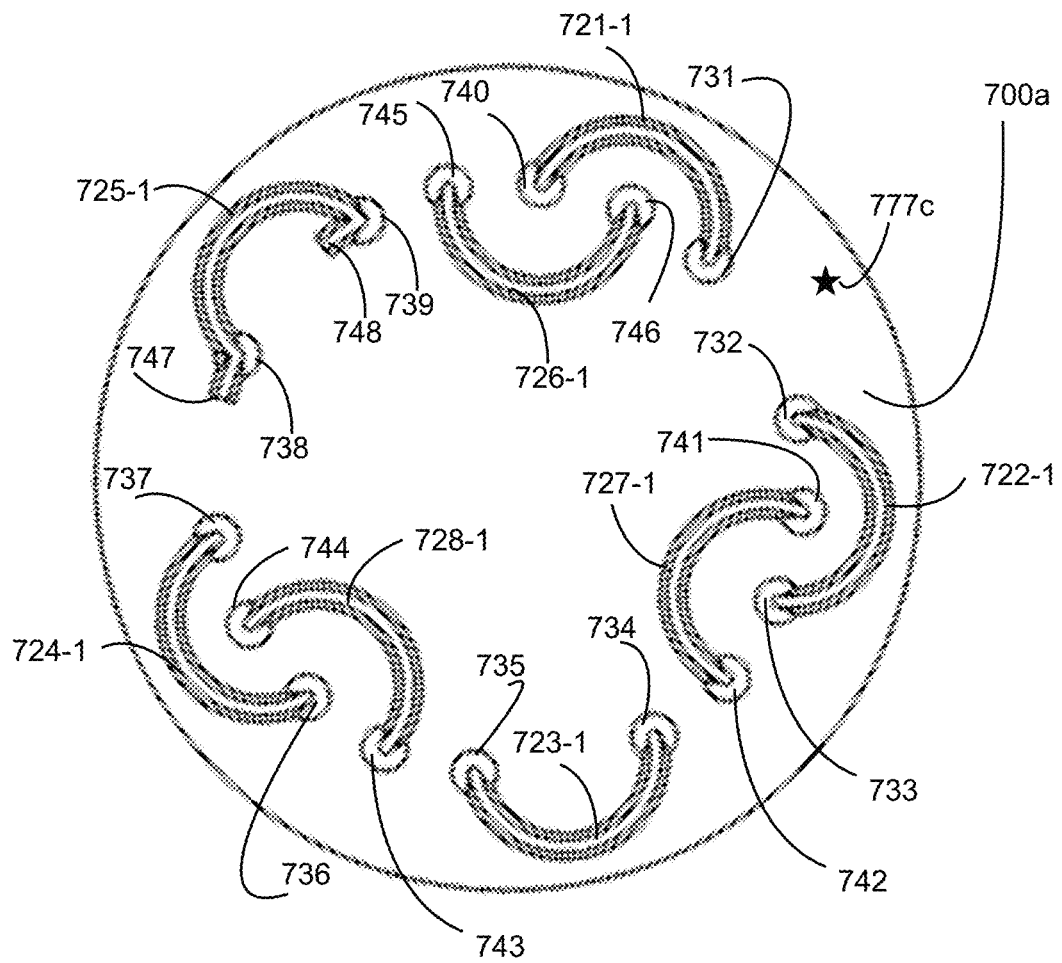
FIG. 39 is a top-down view of the configurable portion (the rotor) of a fluid diverting module wherein at least one movable flow-path of the rotor has the end-portions elongated at both termini.

Referring to FIGS. 38 and 39, the fluid diverting module of multidimensional chromatographic assembly of FIG. 1, wherein the rotor of the fluid diverting module includes at least one movable flow-path that has grooves elongated at both termini is shown.

Referring to FIG. 38, the bottom-up view of the stator (700b) is shown. The stator has ten ports (711 to 720).

Referring to FIG. 39, the top-down view of the rotor (700a) is shown. The rotor comprises eight trenches representing movable flow-paths. Each flow-path comprises two termini and a connecting coplanar groove. Flow-path bearing groove 725-1 includes two elongated portions 747 and 748.

Figure 40:
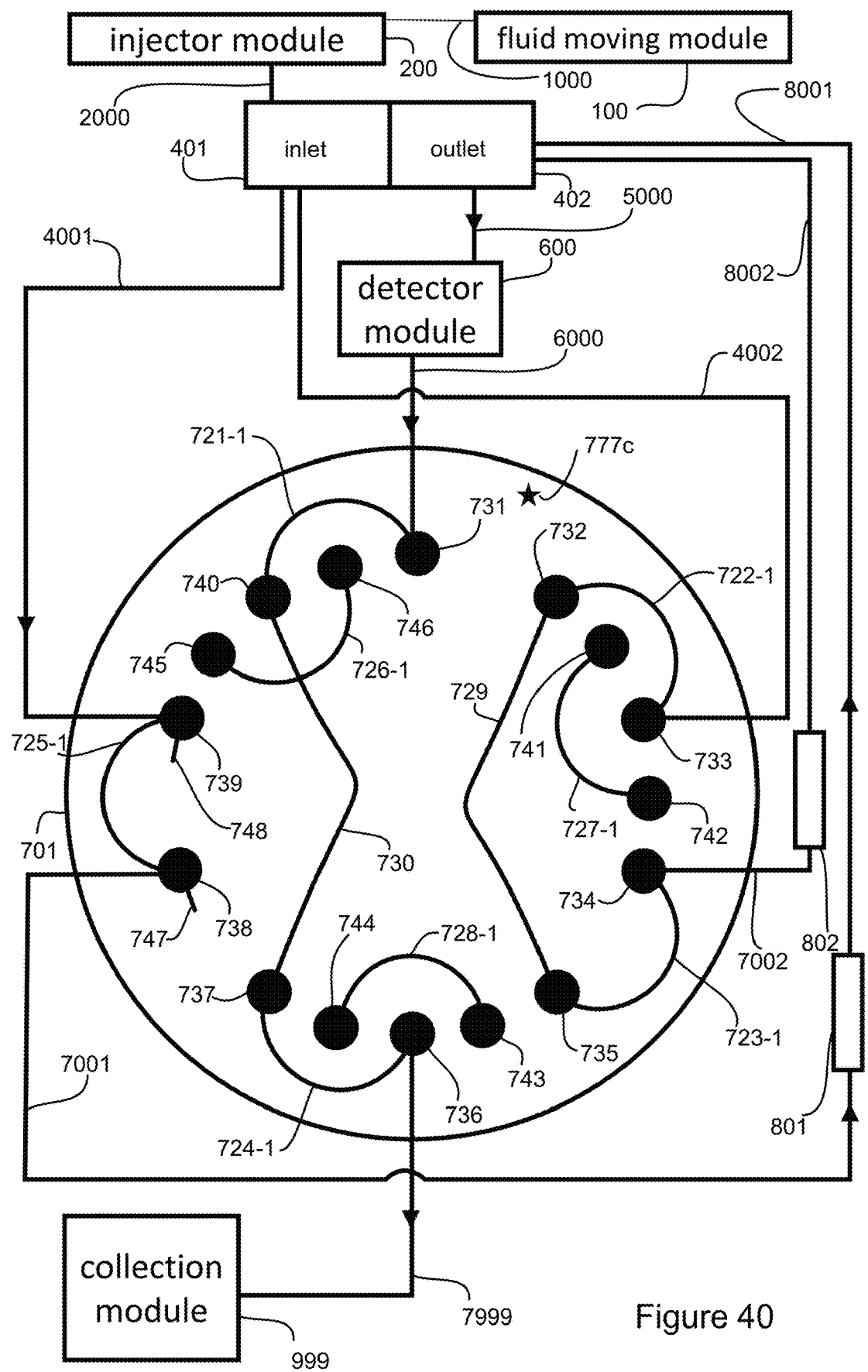
FIG. 40 is a flow diagram of the multidimensional chromatographic assembly that uses the rotor of FIG. 39; the fluid diverting module is configured to establish fluid communication between the fluid moving module and the first chromatographic medium via the second fluid holding compartment.

Referring to FIG. 40, a flow diagram of the multidimensional chromatographic assembly that uses the rotor of FIG. 39 is shown.

Referring still to FIG. 40, grooves of the flow-paths on the rotor (721-1, 722-1, 723-1, 724-1, 725-1, 726-1, 727-1, and 728-1) are shown. Groove 725-1, which connects ports 718 and 719 (not visible) by termini 738 and 739, is further elongated at both termini; the elongated portions (747 and 748) are etched on the rotor at the interfacial plane where the rotor meets the stator along the circle wherein all termini (731 through 746) lie. Specifically, elongated portions 747 and 748 are etched in a counter-clockwise manner. In other words, the flow-path bearing the elongated portions is not symmetrical.

Referring to FIGS. 5 and 40, termini 738 and 739 overlap with ports 718 and 719, respectively. Ports 718 and 719 are right underneath termini 738 and 739, which is why they are not visible in FIG. 40. Ports are visible in FIG. 5.

Referring back to FIG. 40, fluid moving module 100 is in fluid communication with fluid holding compartment 730 via chromatographic medium 801.

Figure 41:
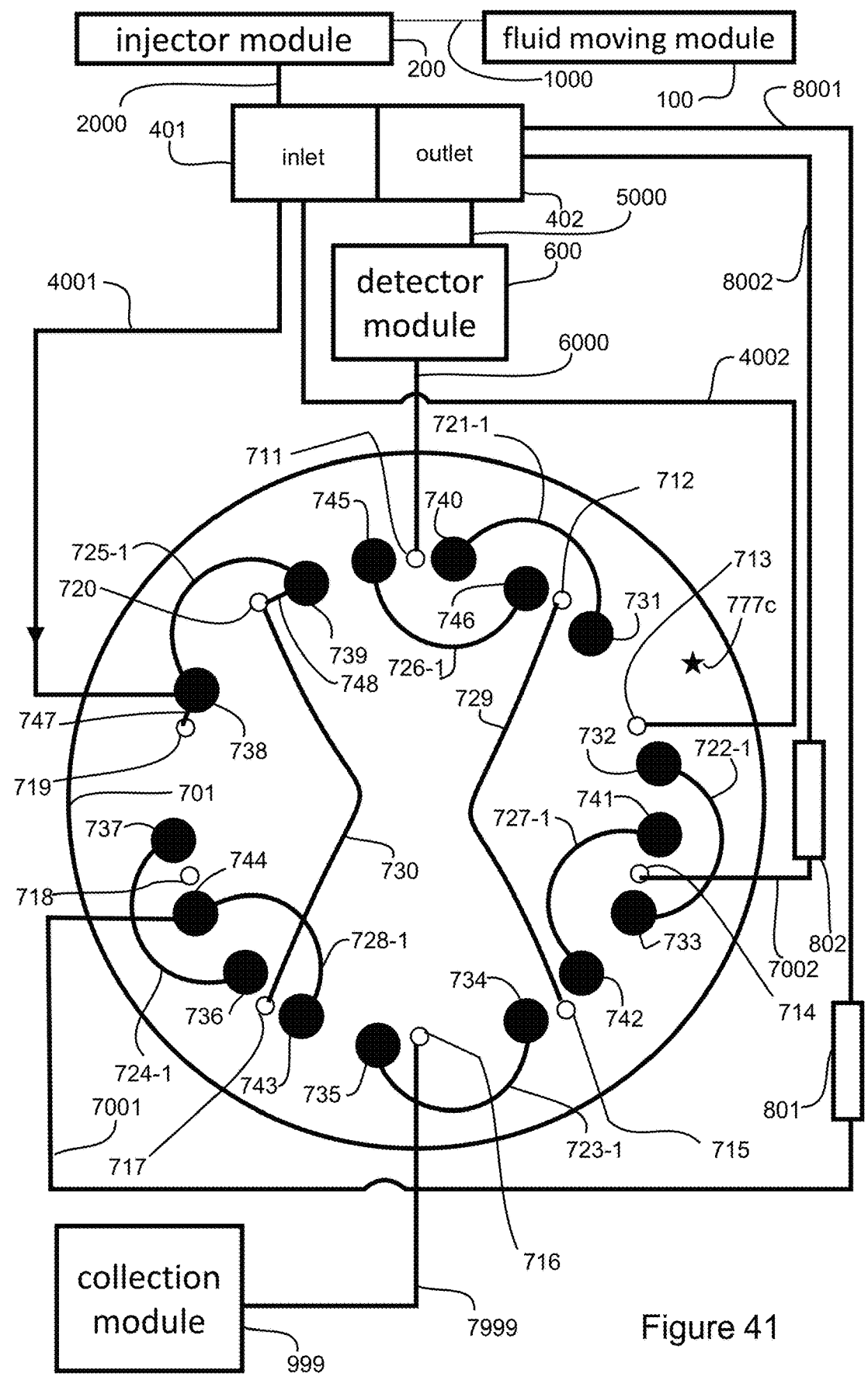
FIG. 41 is a flow diagram of the multidimensional chromatographic assembly that uses the rotor of FIG. 39; the fluid diverting module is configured to establish fluid communication between the fluid moving module and the second fluid holding compartment through the elongated portions; the other end of the second fluid holding compartment is disengaged from the downstream flow-path (dead-ended).

Referring to FIG. 41, a flow diagram of the multidimensional chromatographic assembly that uses the rotor of FIG. 39 is shown.

Referring still to FIG. 41, fluid diverting module 701 is moved by 45 degrees clockwise (or 315 degrees counter-clockwise) from the configuration of FIG. 40 to establish fluid communication between fluid moving module 100 and fluid holding compartment 730 using elongated portions 747 and 748, respectively. All ports (711 through 720) are visible (clear circles). In this representation, the terminal ends of the elongated portions meet ports 719 and 720; the other ends of the elongated portions meet groove 725-1.

Referring still to FIG. 41, in this representation, only one end of fluid holding compartment 730 is in contact with a flow-path on the rotor. The other end is disengaged from any flow-path downstream at port 717. In other words, fluid holding compartment 730 is dead-ended. It is important to note that fluid holding compartment 730 has no fluid communication with chromatographic medium 801 in this position. This allows fluid moving module 100 to advance forward or retract backward to compress or decompress, respectively, fluids in fluid holding compartment 730.

Referring still to FIG. 41, this is a new configuration (the seventh) wherein a portion of an eluent is moved by the fluid moving module to a dead-ended wall so the pressure of the fluid in the said flow-path is manipulated.

Figure 42:
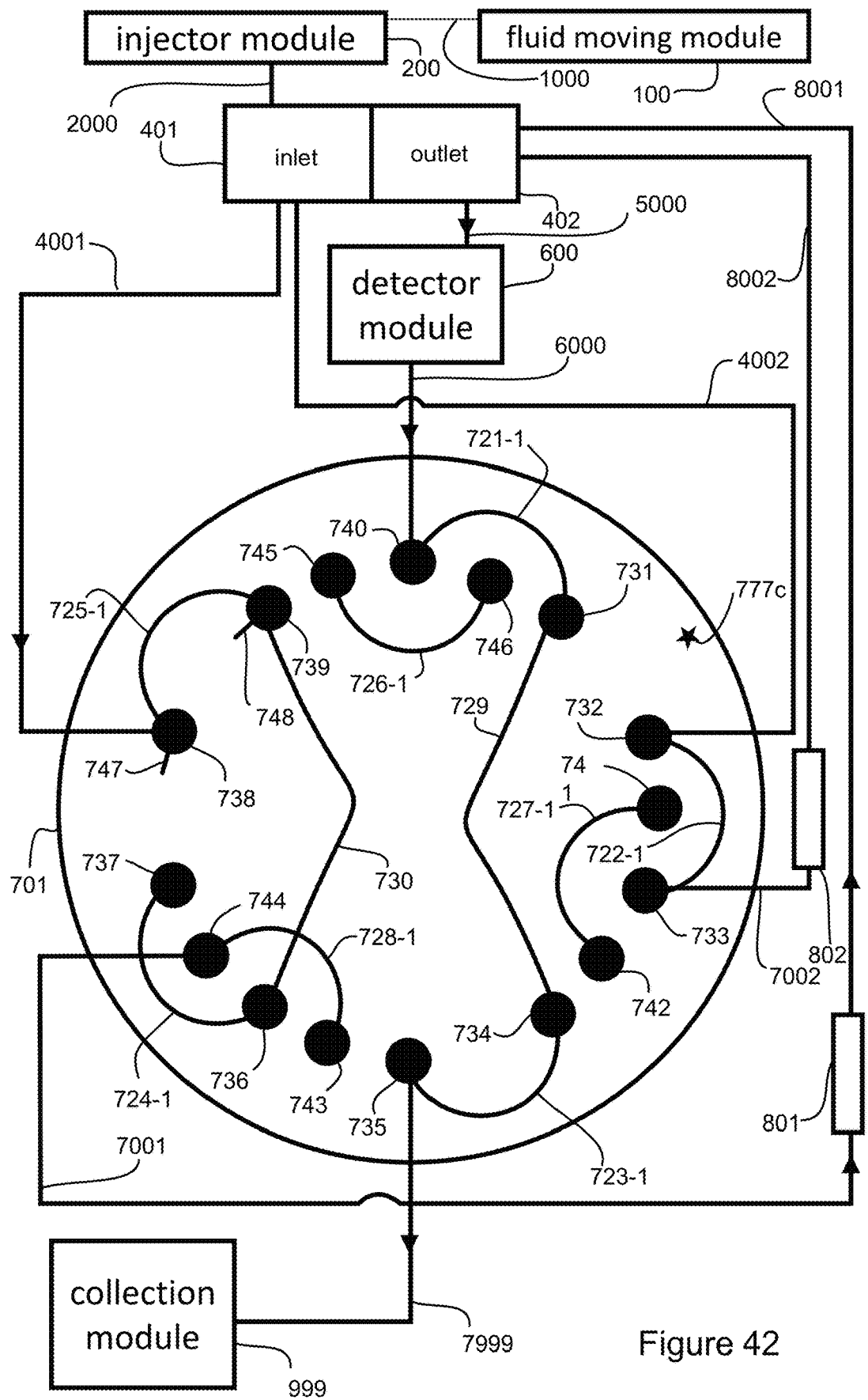
FIG. 42 is a flow diagram of the multidimensional chromatographic assembly that uses the rotor of FIG. 39; the fluid diverting module is configured to establish fluid communication between the fluid moving module and the second fluid holding compartment; the fluid from the second fluid holding compartment moves toward first chromatographic medium.

Referring to FIG. 42, a flow diagram of the multidimensional chromatographic assembly that uses the rotor of FIG. 39 is shown.

Referring still to FIG. 42, fluid diverting module 701 is moved by 9 degrees counter-clockwise from the configuration of FIG. 41 so that fluid moving module 100 establishes fluid communication with chromatographic medium 801 through fluid holding compartment 730.

Referring to FIGS. 41 and 42, pressure of the fluid inside fluid holding compartment 730 is modulated in FIG. 41 so that when the fluid of fluid holding compartment comes in contact with chromatographic medium 801 in FIG. 42, the pressure fluctuation is minimal.

Referring back to FIG. 42, flow-path 725-1, which includes elongated portions 747 and 748, is upstream of fluid holding compartment 730, which contains the injectable for chromatographic medium 801. The dead-volume from the elongated portions do not impact the geometric integrity of the injectable prior to the injection.

Figure 43:
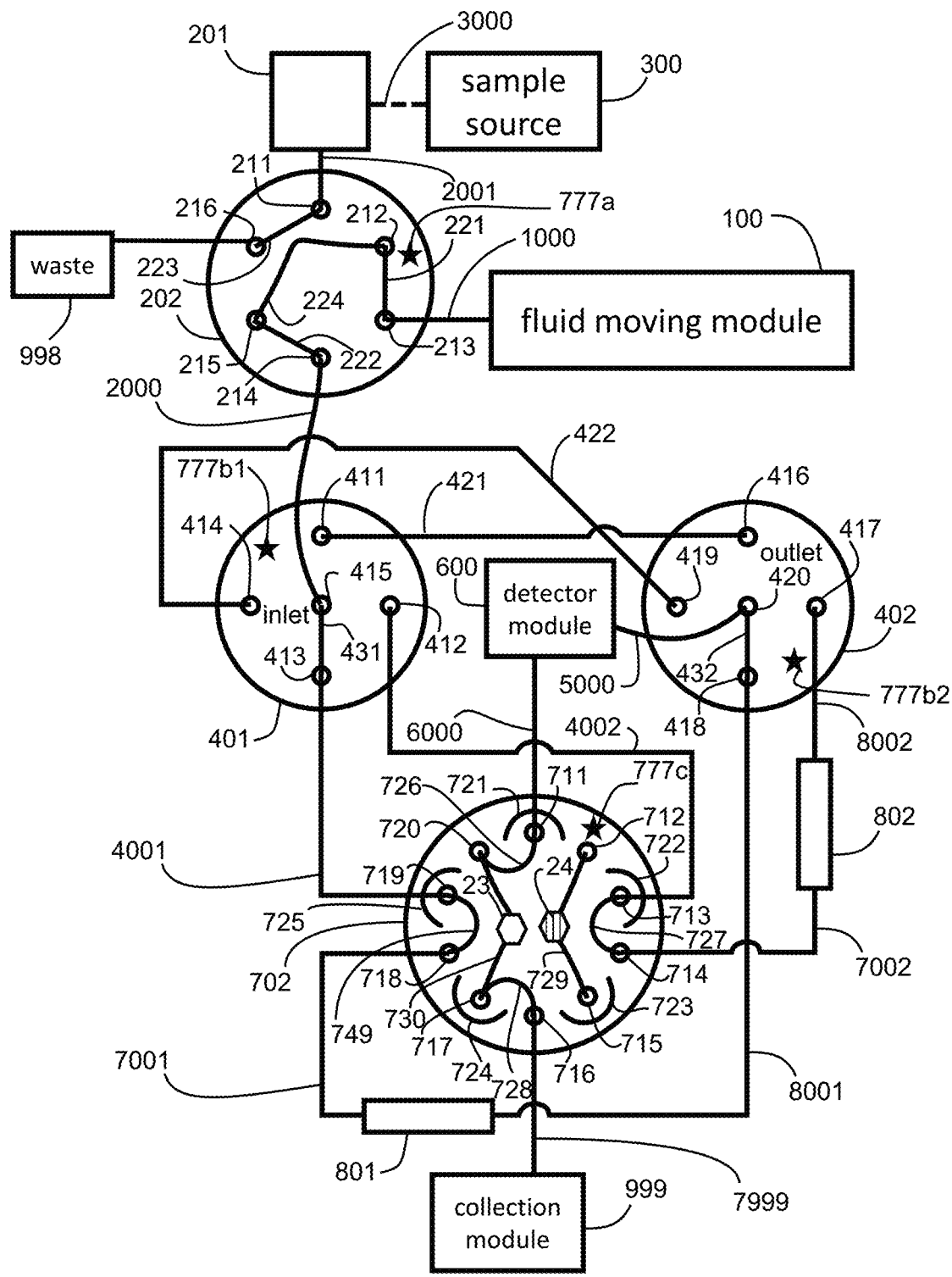
FIG. 43 is a flow diagram of the multidimensional chromatographic assembly that uses a rotor with nine movable flow-paths; the fluid moving module is in fluid communication with the first chromatographic medium.

Referring to FIG. 43, a flow diagram of the multidimensional chromatographic assembly of FIG. 1 is shown; the rotor of fluid diverting module 702 comprises nine movable flow-paths (721, 722, 723, 724, 725, 726, 727, 728, and 749). Flow-paths 726 to 728, and 749 are curved on the rotor at the interfacial plane between the stator and the rotor of fluid diverting module 702. The termini of individual flow-paths (726 to 728, and 749) are located on a circle (defined by the ports on the rotor) and the spatial disposition of the individual grooves fall inside the circle. Flow-paths 721 to 725 are also curved on the rotor at the interfacial plane between the stator and the rotor of fluid diverting module 702. The termini of individual flow-paths (721 to 725) are located on the same circle and the spatial disposition of individual grooves fall outside the circle.

Referring to FIGS. 22 and 43, fluid diverting module 702 of FIG. 43 is moved by 144 degrees clockwise (or 216 degrees counter-clockwise) from the configuration of fluid diverting module 700 shown in FIG. 22. Fluid diverting module 702 in FIG. 43 establishes fluid communication between fluid moving module 100 and fluid holding compartment 730 via chromatographic medium 801. Fluid holding compartment 729 is disengaged from all fluid communications. Analyte 24 is isolated in fluid holding compartment 729 and is stationary. Analyte 23, which is in fluid holding compartment 730, is in fluid communication with fluid moving module 100 and is in motion.

Referring still to FIGS. 22 and 43, in both configurations (for fluid diverting module 700 in FIG. 22 and for fluid diverting module 702 in FIG. 43) fluid holding compartment 729 isolates analyte (analyte 22 in FIG. 22 and analyte 24 in FIG. 43), which is stationary in the fluid moving compartment. The dead-volume of the eluent(s) contacting analyte 22 (the contacting eluent(s)) in FIG. 22 spans from port 413 of inlet module 401 to port 418 of outlet module 402. On the other hand, the contacting eluent(s) around analyte 24 in FIG. 43 spans from port 712 to port 715. The dead-volume of the contacting eluent(s) in FIG. 43 is significantly less than that in FIG. 22. Consequently, isolated analyte in fluid holding compartment 729 has the opportunity to diffuse into a lesser volume of fluid during isolation.

Figure 44:
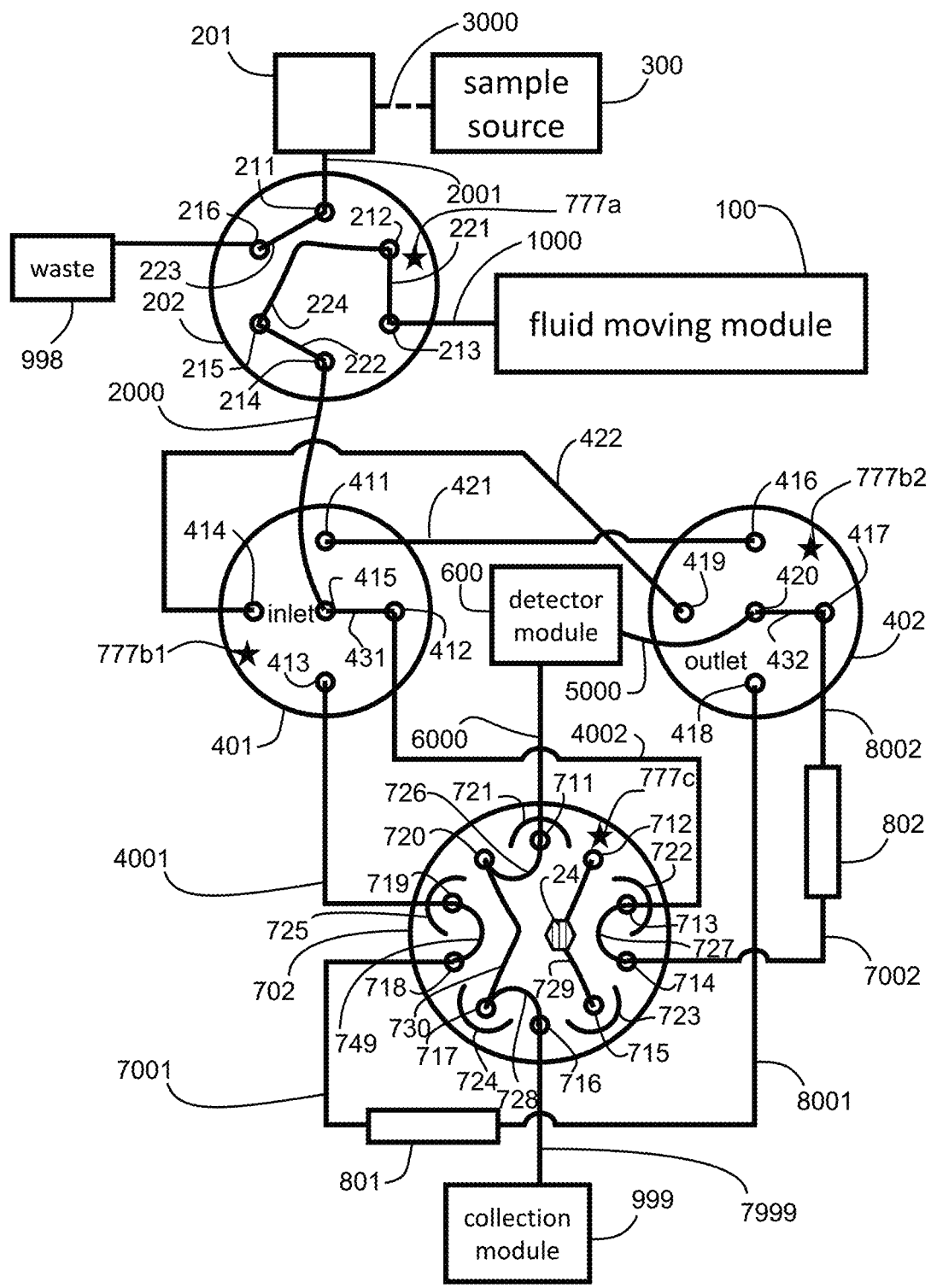
FIG. 44 is a flow diagram of the multidimensional chromatographic assembly of FIG. 43; the fluid moving module is in fluid communication with the third chromatographic medium.

Referring to FIG. 44, a flow diagram of the multidimensional chromatographic assembly of FIG. 43 is shown. Inlet module 401 and outlet module 402 are moved by 90 degrees counter-clockwise from the configuration in FIG. 43. Port 415 of the inlet module is in fluid communication with port 412 and port 420 of the outlet module is in fluid communication with port 417. Fluid moving module 100 is in fluid communication with fluid holding compartment 730 via chromatographic medium 802.

Referring still to FIG. 44, fluid holding compartment 729 is disengaged from all fluid communications. Analyte 24 is isolated in fluid holding compartment 729 and stationary. Analyte 23, which is in fluid holding compartment 730, is in fluid communication with fluid moving module 100 and is in motion.

Referring still to FIG. 44, fluid moving module 100 establishes fluid communication with chromatographic medium 802 bypassing fluid holding compartment 729, which holds analyte 24. Fluid in flow-path 7002, which is immediately upstream of chromatographic medium 802 is replaced with eluent(s) appropriate for proceeding chromatographic run of analyte 24 through chromatographic medium 802. When the eluent(s) of the proceeding chromatographic condition differ from that of the preceding chromatographic condition, fluid diverting module 702 is configured to divert eluent(s) in flow-path 7002 ahead of the proceeding chromatographic run.

Referring still to FIG. 44, there are two fluid segments of the eluent(s) contacting analyte 24 inside fluid holding compartment 729. The first segment spans between port 712 and the interface of the eluent(s) contacting analyte 24. The second segment spans between analyte 24 and port 715. These two portions contain eluent(s) from the preceding chromatographic conditions.

Figure 45:
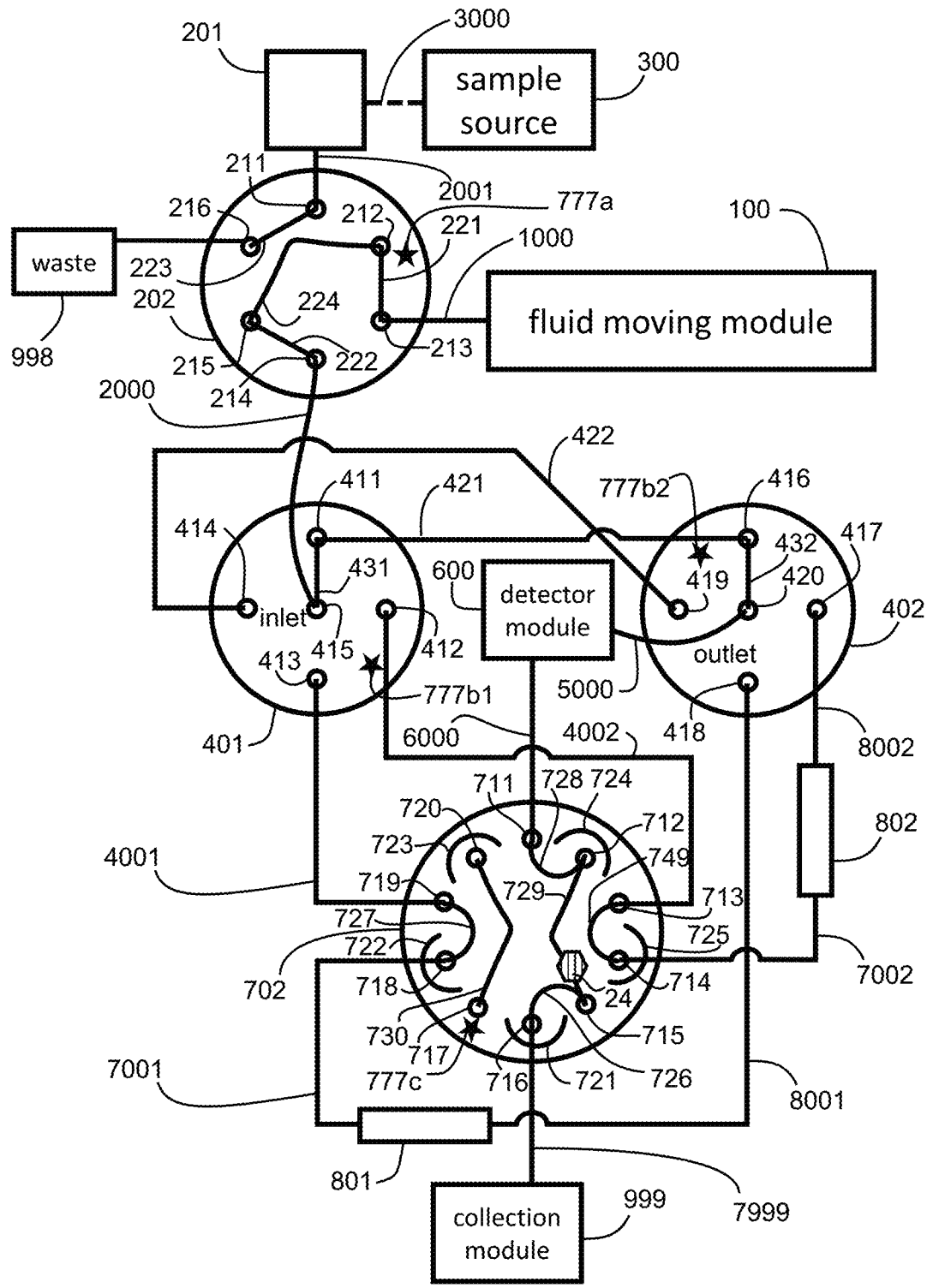
FIG. 45 is a flow diagram of the multidimensional chromatographic assembly of FIG. 43; the fluid moving module is neither in fluid communication with the first nor the second chromatographic medium.

Referring to FIG. 45, a flow diagram of the multidimensional chromatographic assembly of FIG. 43 is shown. Fluid diverting module 702 is moved by 180 degrees clockwise or counter-clockwise.

Referring still to FIG. 45, inlet module 401 and outlet module 402 are moved by 90 degrees counter-clockwise from the configuration in FIG. 44. Port 415 of the inlet module is in fluid communication with port 411 and port 420 of the outlet module is in fluid communication with port 416. Ports 411 and 416 are connected by flow-path 421. Fluid moving module 100 is in fluid communication with fluid holding compartment 729. Neither chromatographic medium 801 nor chromatographic medium 802 is in fluid communication with fluid moving module 100. Fluid moving module 100 moves analyte 24 toward collection module 999 in this configuration. In this configuration, fluid moving module 100 moves analyte 24 immediately upstream of port 715 thereby rejecting most of the fluid downstream of analyte 24 during isolation step.

Referring still to FIG. 45, when the eluent(s) of the proceeding chromatographic condition differ from that of the preceding chromatographic condition, fluid diverting module 702 is configured to divert eluent(s) of the second segments to collection module 999, which is waste in this instance.

Figure 46:
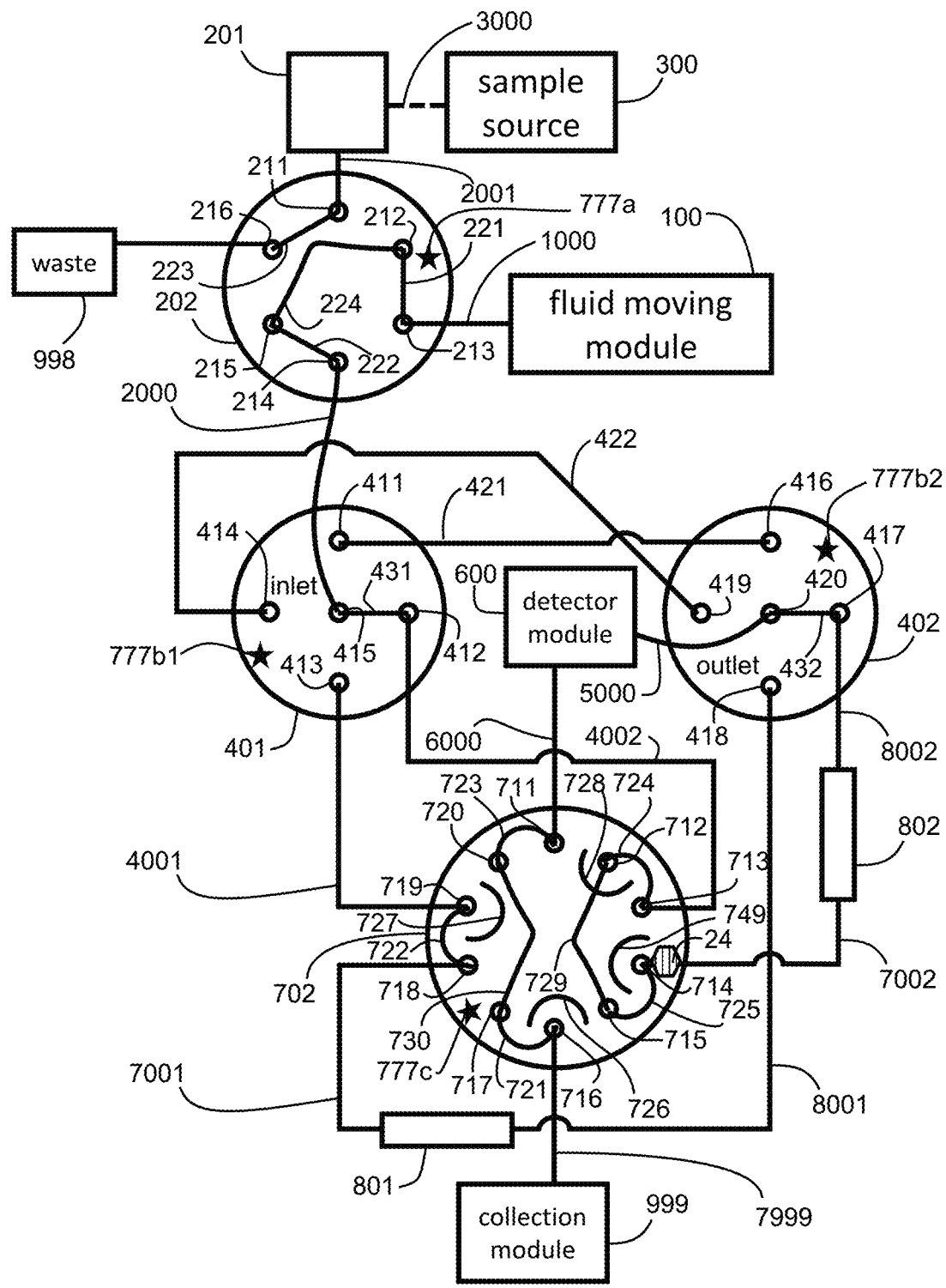
FIG. 46 is a flow diagram of the multidimensional chromatographic assembly of FIG. 43; the fluid moving module is in fluid communication with the second chromatographic medium; fluid diverting module is configured to disengage fluid communication between the third fluid holding compartment and the fluid moving module; the third analyte is isolated in the third fluid holding compartment and is stationary.

Referring to FIG. 46, a flow diagram of the multidimensional chromatographic assembly of FIG. 43 is shown. Fluid diverting module 702 is moved by 18 degrees clockwise (or 342 degrees counter-clockwise). Also, inlet module 401 and outlet module 402 are moved by 90 degrees clockwise to establish fluid communication between fluid moving module 100 and chromatographic medium 802 via fluid holding compartment 729. Fluid moving module 100 moves analyte 24 from fluid holding compartment 729 to flow-path 7002.

Figure 47:
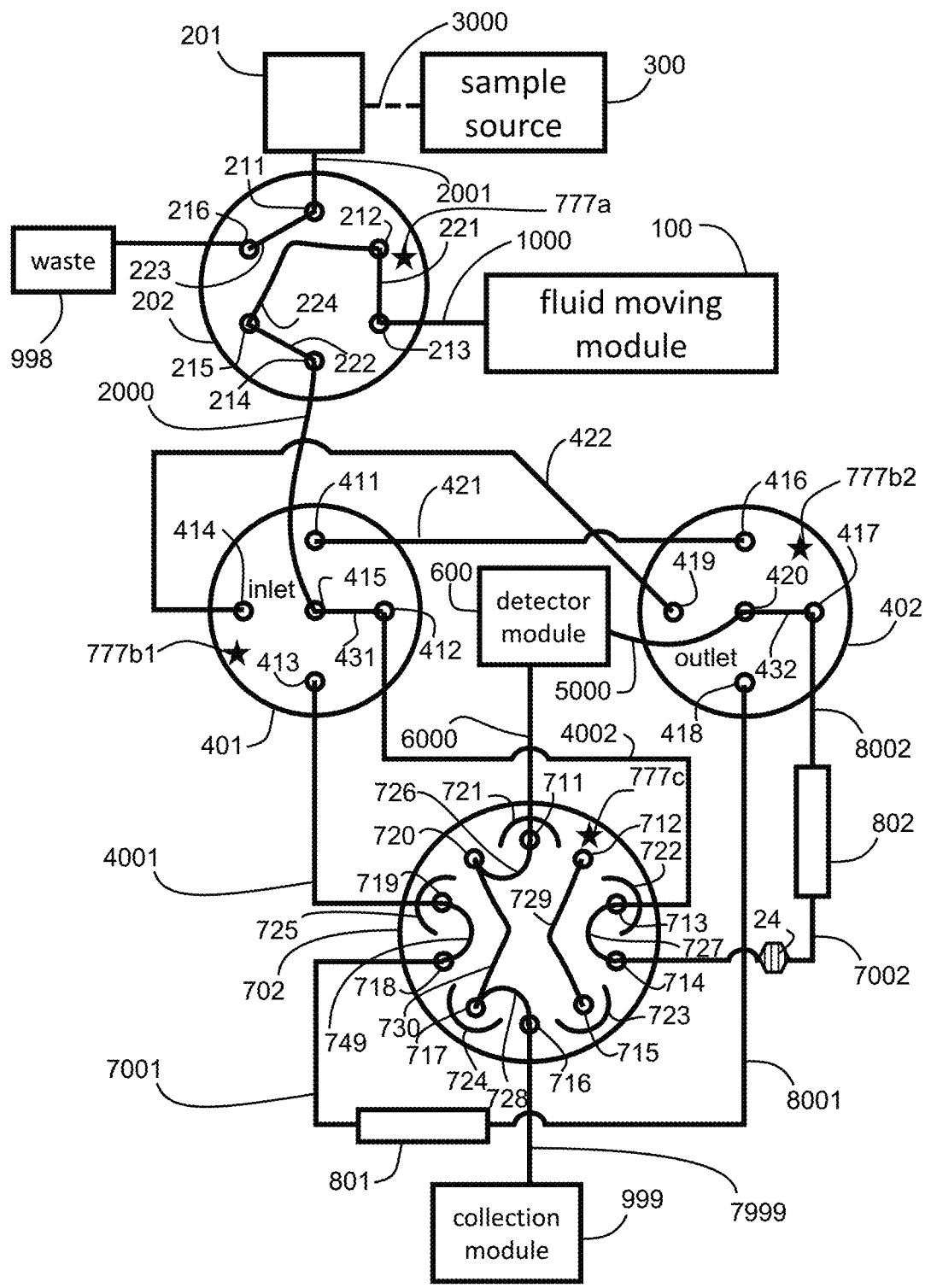
FIG. 47 is a flow diagram of the multidimensional chromatographic assembly of FIG. 43; the fluid moving module is in fluid communication with the second chromatographic medium; fluid diverting module is configured to move the third analyte through the second chromatographic medium.

Referring to FIG. 47, a flow diagram of the multidimensional chromatographic assembly of FIG. 43 is shown. Fluid diverting module 702 is moved by 162 degrees clockwise (or 198 degrees counter-clockwise) to establish fluid communication between fluid moving module 100 and chromatographic medium 802 bypassing fluid holding compartment 729. Fluid moving module 100 moves analyte 24 inside flow-path 7002 toward chromatographic medium 802. The segment behind analyte 24 does not enter flow-path 7002.

Referring to FIGS. 44, 45, 46 and 47, segments before and after analyte 24 do not enter chromatographic medium 802. Only analyte 24 enters chromatographic medium 802.

The invention claimed is:

1. A multidimensional chromatographic assembly comprising:
   a) at least a two-configuration injector module, which receives a sample in a fluid holding compartment (a first) from the first (load) configuration of the injector module and sends the sample to a chromatographic medium selector module from the second (inject) configuration using at least one eluent from a fluid moving module located upstream of the injector module;
   b) a chromatographic medium module, which comprises two independent flow-paths consisting of at least one chromatographic medium in each and receives the sample in one of the two flow-paths from the chromatographic medium selector module;
   c) a detector module, which receives chromatographed portion(s) of the sample from the chromatographic medium module and measures at least one attribute of the portion(s) in a flow-cell, which is a part of the detector module;
   d) a multi-configuration fluid diverting module, which is situated downstream of the chromatographic medium module and upstream of the detector module, and equipped with at least two fluid holding compartments (a second and a third) on the stationary portion of the fluid diverting module (the stator) and at least eight flow-paths on the movable portion of the fluid diverting module (the rotor) for receiving chromatographed portion(s) of the sample from the chromatographic medium module, isolating the portion(s) in either the second or the third fluid holding compartment while moving the remaining portion(s) of the chromatographed sample through one of the two flow-paths of the chromatographic medium module, and sending the isolated portion either to the detector module in an iterative manner or to a collection module downstream of the fluid diverting module; and
   e) a controller, which receives data from the detector module and sends instructions to the modules of the multidimensional chromatographic assembly.

2. The multidimensional chromatographic assembly of claim 1, wherein each flow-path of the movable portion of the fluid diverting module (rotor) comprises two termini, which lie on a circular perimeter on the interfacial plane where the rotor meets the stator, and a connecting coplanar groove, spatial disposition of which is either concave or convex to the circular perimeter with only the termini intercepting the perimeter.

3. The multidimensional chromatographic assembly of claim 2, wherein the rotor of the fluid diverting module comprises eight movable flow-paths, five of which bear respective grooves convex to the circular perimeter and the remaining three bear respective grooves concave to the circular perimeter, or vice versa.

4. The multidimensional chromatographic assembly of claim 2, wherein the rotor of the fluid diverting module comprises nine movable flow-paths, five of which bear respective grooves convex to the circular perimeter and the remaining four bear respective grooves concave to the circular perimeter, or vice versa.

5. The multidimensional chromatographic assembly of claim 2, wherein the footprint of the termini of at least one flow-path is larger than that of the groove connecting the termini.

6. The multidimensional chromatographic assembly of claim 2 further comprising elongated portions, which are coplanar to the groove and disposed concentrically to the axis of rotation of the rotor of the fluid diverting module, either at one terminus or at both termini of at least one flow-path on the rotor.

7. The multidimensional chromatographic assembly of claim 6 further comprising a seventh configuration, wherein the fluid moving module moves a chromatographing eluent through the second or the third fluid holding compartment against a dead-ended terminus at the other end of the fluid holding compartment in question.

8. The multidimensional chromatographic assembly of claim 1, wherein the chromatographic medium selector module includes an inlet module, which receives the sample from the injector module and sends the sample to one of the chromatographic media of the chromatographic medium module, and an outlet module, which receives at least a chromatographed portion of the sample from the fluid diverting module and sends the portion to the detector module.

9. The multidimensional chromatographic assembly of claim 8, wherein the inlet and the outlet modules are located on a singular physical embodiment of the chromatographic medium selector module.

10. The multidimensional chromatographic assembly of claim 8, wherein the inlet and the outlet modules of the chromatographic medium selector module are directly connected by at least one flow-path that allows a chromatographing eluent from the fluid moving module to move from the inlet module to the outlet module bypassing the fluid diverting module and the chromatographic medium module.

11. The multidimensional chromatographic assembly of claim 1, wherein the flow-cell of the detector module tolerates pressure no more than 870 psi.

12. The multidimensional chromatographic assembly of claim 1, wherein the collection module is equipped with a means that moves at least a chromatographed portion of the sample from the fluid diverting module to at least one fluid holding container in the collection module.

13. The multidimensional chromatographic assembly of claim 12, wherein the collection module is equipped with a heat-transfer device for modulating temperature of the collected portion in the fluid holding container(s).

14. The multidimensional chromatography assembly of claim 1, wherein the chromatographic medium selector module and the fluid diverting module collectively adopt at least six configurations:
   a) the first configuration, wherein the eluent carrying the sample moves from the first chromatographic medium to the second fluid holding compartment without establishing fluid communication between the fluid moving module and the third fluid holding compartment;
   b) the second configuration, wherein the eluent carrying the sample moves from the first chromatographic medium to the third fluid holding compartment without establishing fluid communication between the fluid moving module and the second fluid holding compartment;
   c) the third configuration, wherein the eluent carrying the sample moves from the first chromatographic medium to the third fluid holding compartment while maintaining fluid communication between the fluid moving module and the second fluid holding compartment;
   d) the fourth configuration, the eluent carrying the sample moves from the second chromatographic medium to the second fluid holding compartment without establishing fluid communication between the fluid moving module and the third fluid holding compartment;
   e) the fifth configuration, the eluent carrying the sample moves from the second chromatographic medium to the third fluid holding compartment without establishing fluid communication between the fluid moving module and the second fluid holding compartment; and
   f) the sixth configuration, wherein the eluent carrying the sample moves from the second chromatographic medium to the second fluid holding compartment while maintaining fluid communication between the fluid moving module and the third fluid holding compartment.

15. A method of performing a multidimensional analysis using the multidimensional chromatographic assembly of claim 1 comprising:
   a) moving at least one chromatographing eluent through the injector module, the chromatographic medium selector module, the fluid diverting module, the detector module, and the collection module in sequence using the fluid moving module;
   b) configuring the injector module to move to the load configuration;
   c) injecting a sample to the first fluid holding compartment;
   d) configuring the injector module to move to the inject configuration;
   e) configuring the chromatographic medium selector module and the fluid diverting module so that the sample of the first fluid holding compartment moves to the detector module via a chromatographic medium (a first) of the chromatographic medium module;
   f) moving the sample through the first chromatographic medium using the chromatographing eluent;
   g) measuring at least one attribute of at least one chromatographed portion of the sample in the detector module;
   h) moving at least a portion of the chromatographed sample to the second fluid holding compartment;
   i) configuring the fluid diverting module so that at least a portion of the portion that arrived in the second fluid holding compartment in step (h) is isolated in the second fluid holding compartment; and
   j) moving the remaining chromatographed portion(s) of the sample to the collection module via the first chromatographic medium and the third fluid holding compartment.

16. The method of claim 15 further comprising configuring the fluid diverting modules to move the portion isolated in the second fluid holding compartment to the detector module via the first chromatographic medium for a second time.

17. The method of claim 15 further comprising configuring the fluid diverting modules to move the portion isolated in the second fluid holding compartment to the detector module via the second chromatographic medium for a first time.

18. The method of claim 16 or 17 further comprising:
   k) configuring the fluid diverting module to move a portion of the chromatographed sample to the second or the third fluid holding compartment via the detector module;

l) configuring the fluid diverting module so that the portion that arrived at the second or at the third fluid holding compartment is isolated in the second or the third fluid holding compartment, respectively; and m) moving the remaining portion(s) of step (k) to the collection module via the third or the second fluid holding compartment, respectively.

19. The method of claim 18 further comprising:

n) recirculating the portion of step (l) through the first or the second chromatographic medium for a multiple number of times;

o) measuring the same or at least one other attribute each time the portion passes through the flow-cell; and p) releasing the portion through the collection module after at least one attribute of the sample is analyzed at least twice.

20. The method of claim 19, wherein a portion of the chromatographed portion is sent to at least one fluid holding container inside the collection module.

21. The method of claim 20, wherein the portion in the fluid holding container is injected back into the multidimensional chromatographic assembly of claim 1 via the injection module using a means.

22. The method of claim 20, wherein the temperature of the collection module is controlled by a heat-transfer device in the collection module.

23. The method of claim 20, wherein a fluid handling device adds at least one other chemical agent to the portion in the fluid holding container.

24. The method of claim 15, wherein configuring of the fluid diverting module is done from the controller based on the measurements in step (15.g).

25. The method of claim 15, wherein configuring of the fluid diverting module is set by the controller prior to injecting in step (15.c).

26. The method of claim 15, wherein the concentration of an analyte in the sample is at least 0.1 gram per 10 millilitres of the sample and the volume of the sample of is less than 2% of the individual volumes of the chromatographic media.

27. The method of claim 15 further comprising configuring the fluid diverting module of claim 10:

A) configuring the fluid diverting module to a position wherein one of the two fluid holding compartments of the fluid diverting module is connected to the fluid moving module upstream and closed (dead-ended; not connected to any flow-path downstream);

B) moving forward or retracting the fluid moving module until the pressure of the sample trapped inside the aforementioned fluid holding compartment is increased or reduced depending on the pressure of the chromatographic medium to be used in the subsequent step, respectively; and C) configuring the fluid diverting module to establish fluid communication between the fluid moving module and the chromatographic medium that is in fluid communication with the aforementioned fluid holding compartment.

* * * * *